(12) United States Patent
Bursaux et al.

(10) Patent No.: US 7,581,904 B2
(45) Date of Patent: Sep. 1, 2009

(54) PIPELAYING VESSEL

(75) Inventors: Gabriel Andre Bursaux, Marseille (FR); David Alexander Cowie, Inverurie (GB); Gordon Spencer Harvey, Banchory (GB); Stewart Kenyon Willis, Aboyne (GB); Malcolm John Goss, Aberdeen (GB); Malcolm Bowie, Peterculter (GB); Thomas Gibson Welsh, Aboyne (GB); Lee Karl Rolf, Mackstead (GB)

(73) Assignee: Stolt Offshore Limited, a UK corporation, Bucksburn, Aberdeen (GB)

( * ) Notice: Subject to any disclaimer, the term of this patent is extended or adjusted under 35 U.S.C. 154(b) by 228 days.

(21) Appl. No.: 10/544,046

(22) PCT Filed: Jan. 30, 2004

(86) PCT No.: PCT/GB2004/000398

§ 371 (c)(1), (2), (4) Date: May 22, 2006

(87) PCT Pub. No.: WO2004/068012

PCT Pub. Date: Aug. 12, 2004

(65) Prior Publication Data

US 2007/0258772 A1 Nov. 8, 2007

(30) Foreign Application Priority Data

Jan. 31, 2003 (GB) ................... 0302279.5

(51) Int. Cl.
*F16L 1/12* (2006.01)
(52) U.S. Cl. ................. 405/166; 405/168.3; 405/168.4; 405/169

(58) Field of Classification Search .................. 405/158, 405/166, 168.1–168.4, 169
See application file for complete search history.

(56) References Cited

U.S. PATENT DOCUMENTS 3,372,461 A * 3/1968 Tesson .................... 405/168.3

(Continued)

FOREIGN PATENT DOCUMENTS

GB 2283554 5/1995

(Continued)

*Primary Examiner*—Frederick L Lagman
(74) *Attorney, Agent, or Firm*—Browning Bushman P.C.

(57) ABSTRACT

There is disclosed a variety of arrangements for laying of rigid pipe from reeled storage and/or on-board welding fabrication. Thirteen independent aspects of the invention are identified. In one particular arrangement (FIGS. 3a-3b), a tilting lay tower (106) having two travelling clamps (210, 220) is provided centrally on a pipelay vessel with a radius control arch (140) pivotable to receive rigid pipe from either port or starboard lay paths. A vertical axis reel or carousel (104) is provided, within an arrangement of curved take-off arms (130, 134) and a large radius curved wall (128). By these means, pipe can be loaded onto the carousel either clockwise or anti-clockwise, and can be supplied to the lay tower via the port or starboard lay path. Continuous rigid product fabricated by a selection of welding lines (112, 114, 116) at the port side can be guided around the large radius wall either for reeling onto the carousel or for direct feeding to the lay tower. A stinger 110 at the starboard side can be used for on-loading of prefabricated pipe. A pipe elevator (150) can erect larger pipe stalks (double- or quad-joints) from deck level for welding within the tower. Flexible product can be stored within an inner compartment (1042) of the carousel and laid via the same tower. The vessel may be a reversible conversion of a FPSO.

36 Claims, 35 Drawing Sheets

U.S. PATENT DOCUMENTS

| | | | |
|---|---|---|---|
| 3,630,461 A | 12/1971 | Sugasti | |
| 3,641,778 A | 2/1972 | Gibson | |
| 3,680,342 A * | 8/1972 | Mott et al. | 405/168.3 |
| 3,712,100 A | 1/1973 | Key et al. | |
| RE28,410 E * | 5/1975 | Cox et al. | 405/168.3 |
| 4,260,287 A * | 4/1981 | Uyeda et al. | 405/168.3 |
| 4,345,855 A | 8/1982 | Uyeda et al. | |
| 4,647,253 A * | 3/1987 | Jacobson et al. | 405/168.1 |
| 4,659,253 A * | 4/1987 | Jacobson | 405/166 |
| 4,917,540 A | 4/1990 | Recalde | |
| 5,836,719 A | 11/1998 | Martin et al. | |
| 5,975,802 A | 11/1999 | Willis | |
| 6,361,250 B1 | 3/2002 | de Varax | |
| 6,371,694 B1 | 4/2002 | de Varax et al. | |
| 6,446,663 B2 | 9/2002 | Francis | |
| 6,554,538 B2 * | 4/2003 | Stockstill | 405/168.3 |
| 6,761,506 B2 * | 7/2004 | De Lang et al. | 405/168.3 |
| 2003/0118409 A1 * | 6/2003 | Lang et al. | 405/168.3 |
| 2005/0036842 A1 * | 2/2005 | Stockstill | 405/168.3 |
| 2006/0188341 A1 * | 8/2006 | Stockstill | 405/168.3 |

FOREIGN PATENT DOCUMENTS

| | | |
|---|---|---|
| GB | 2296956 | 7/1996 |
| GB | 2329603 | 3/1999 |
| GB | 2364758 A | 2/2002 |
| GB | 2370335 A | 6/2002 |
| WO | WO 00/05525 | 2/2000 |
| WO | WO 03/004915 | 2/2003 |

* cited by examiner

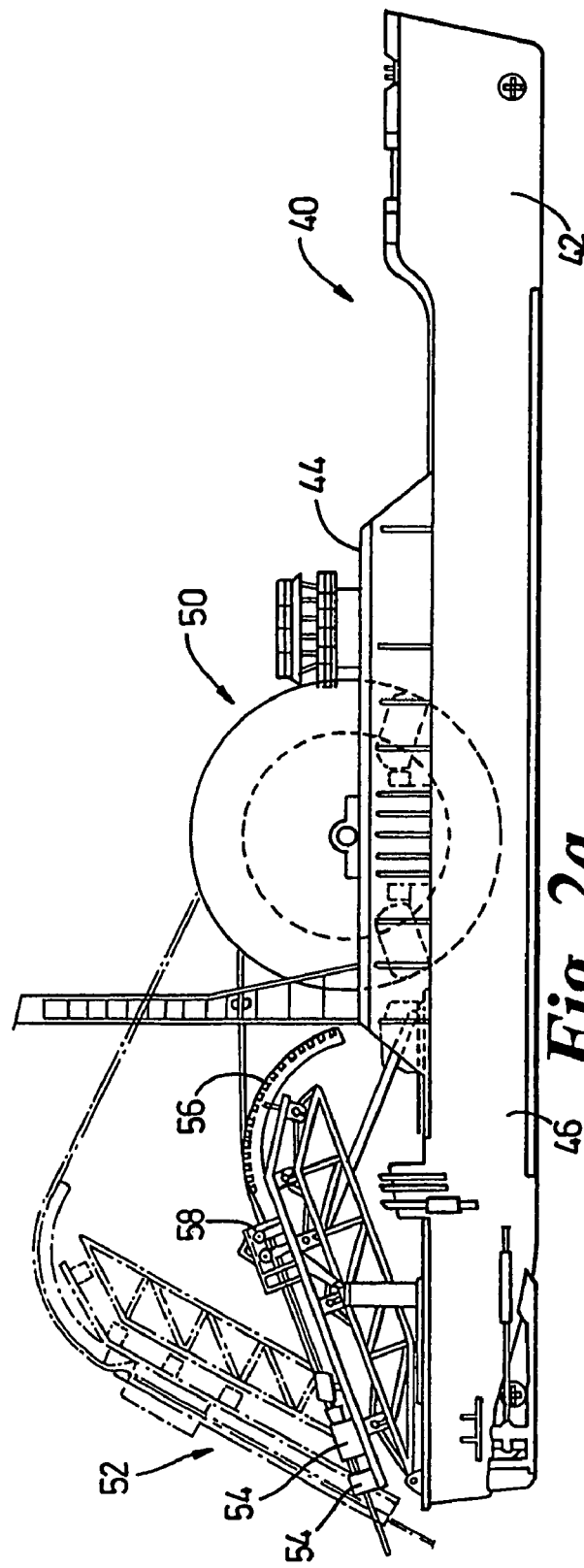
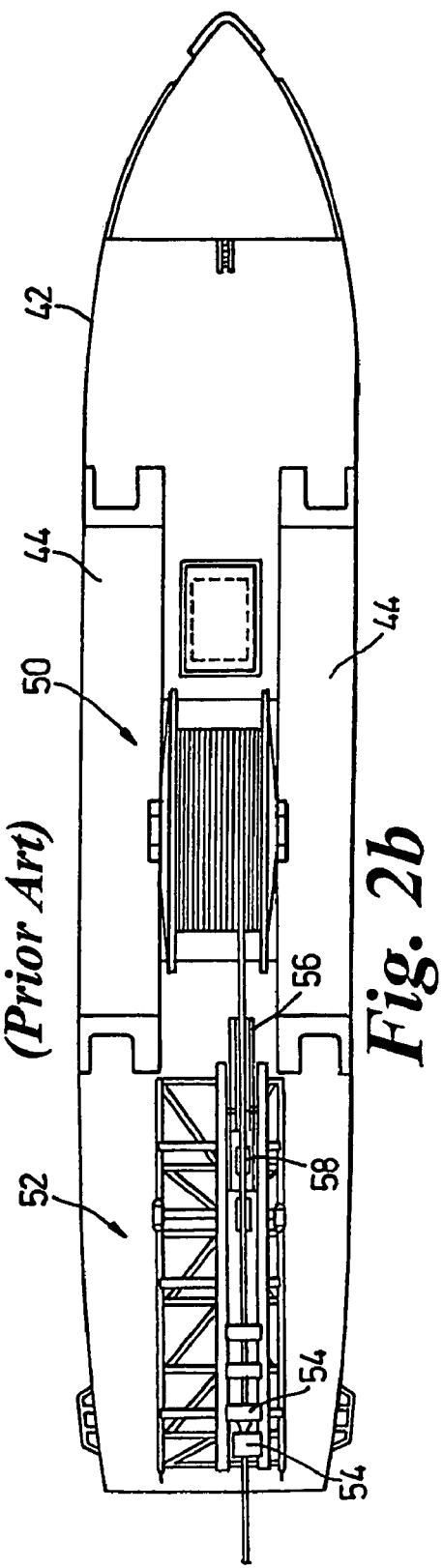
Fig. 2a (Prior Art)
Fig. 2b

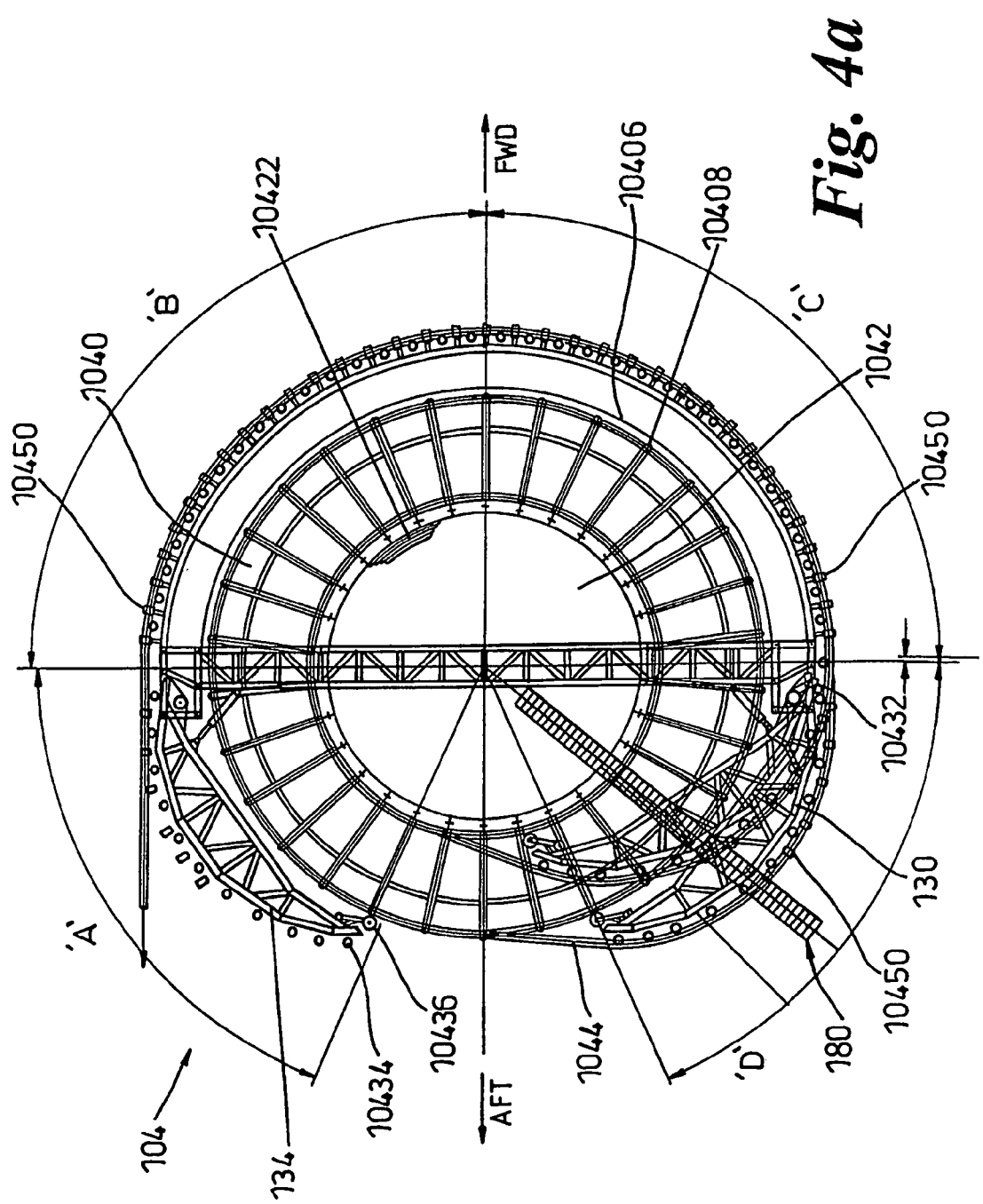

210, 220

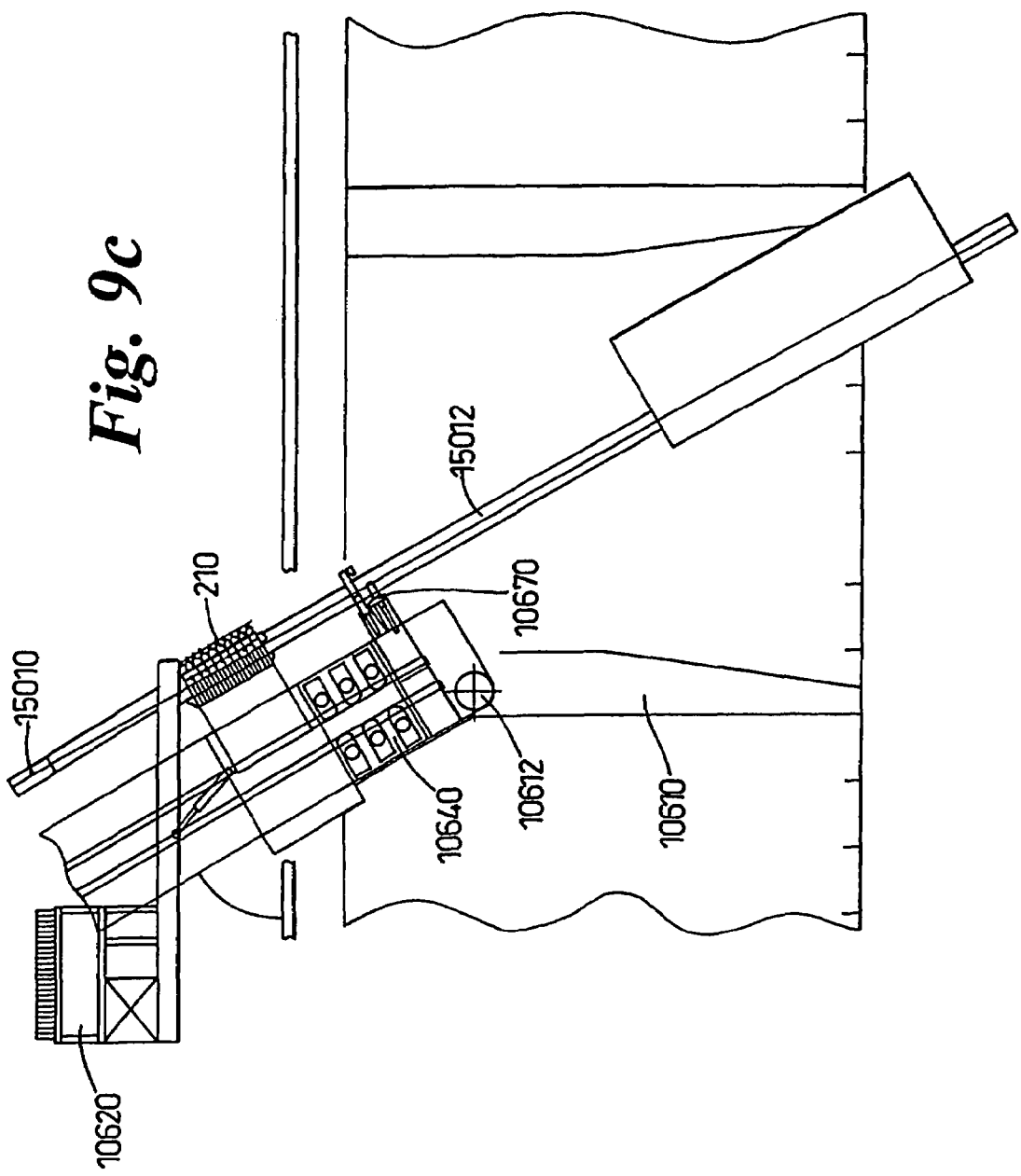

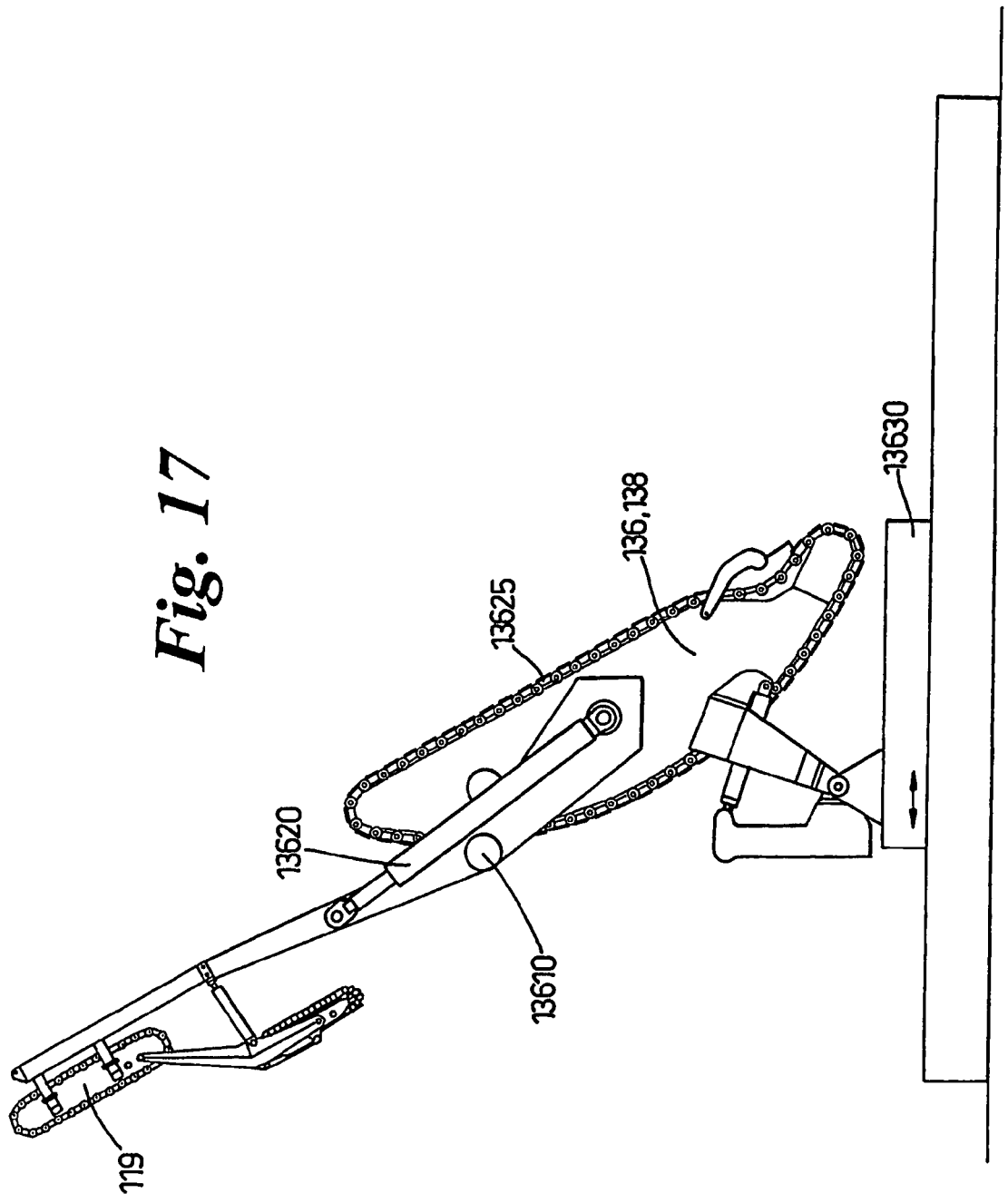

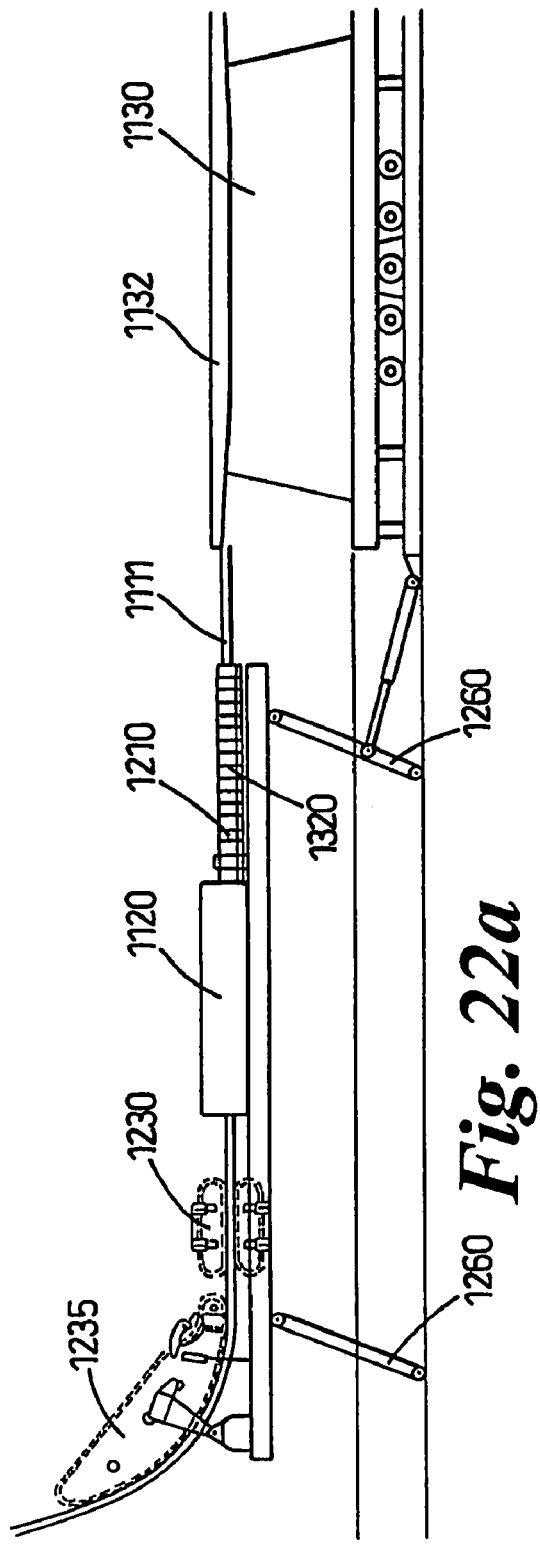
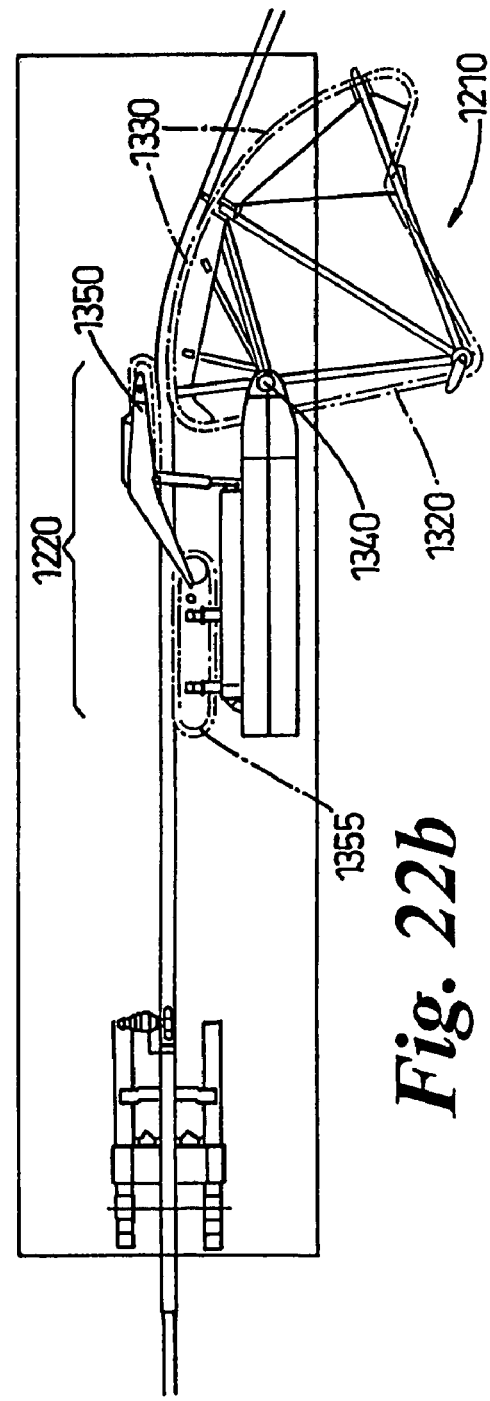
Fig. 22a
Fig. 22b

PIPELAYING VESSEL

The present invention relates to methods and apparatus for laying elongate articles from a vessel, in particular but not limited to the laying a variety of elongate articles such as pipe and power cable from an offshore pipelaying vessel.

There are increasing requirements in the offshore industry for laying to the seabed a variety of different articles from a single vessel. Also, the waters in which the laying is taking place are getting deeper, and more remote from base. If it is not possible to lay different types of articles with a single vessel then a number of different ones are required, with an obvious impact on cost and logistics. Furthermore, there are other circumstances where a single vessel is necessary, such as laying in combination different articles, such as a telecommunications cable coupled to an oil pipeline.

Pipeline is laid either by forming a pipeline out of sections, which are welded together on the deck of the vessel and progressively fed into the sea, or by unreeling from a spool containing flexible pipeline. The spools have to be very large due to limitations in bend radius of the pipeline. Clearly pipeline of smaller diameter can be bent more acutely, allowing smaller reels to be used, where appropriate. Some articles are insufficiently rigid for them to be stored in a reel, or too heavy to be stored in a large horizontal-axis reel, requiring instead storage in a "basket" that is rotated about the vertical axis.

Ideally, a single vessel would be capable of laying a variety of different types of elongate articles by reel lay, and/or basket lay.

To reduce costs further it is also desirable to maximise the amount of material carried by the vessel. However, there are mechanical limitations on the amount that a single vertical reel (operating about a horizontal axis) can carry. For example, the taller a vertical reel, the higher its centre-of-gravity in the ship, and the greater the risk of capsize in adverse weather conditions.

To increase reel capacity safely the industry has progressed more towards "horizontal", vertical-axis reel-lay.

There are presently a variety of different vessels available for laying articles on the seabed, examples of which are provided below:

For rigid pipelay, the older vessel named "Chickasaw" uses a horizontal (vertical-axis) reel, the output of which feeds a pipe conditioning train and stinger, in a conventional manner. However, no provision is made for laying flexible pipe. See, for example, U.S. Pat. No. 3,712,100 and U.S. Pat. No. 3,630,461.

The vessel named "Seaway Falcon" has two separate lay systems, one for rigid, and one for flexible pipe. The flexible pipes are stored in 1500 ton capacity horizontal (vertical-axis) rotating baskets below the deck, while rigid pipe is stored in discrete lengths and welded together before laying over a stern ramp. Power cable is generally laid from large vertical-axis rotating baskets installed on the ship's upper deck. See U.S. Pat. No. 5,975,802 (Willis). Modifications of this general arrangement but using travelling clamps in place of a track-type tensioner on the ramp are known from GB2364758A and GB2370335A.

The vessel named "Apache" has a single lay system comprising a vertical (horizontal-axis) reel, and a pivotable stern lay ramp. The product is unreeled and deployed in a single, vertical plane and doing so plastically deforms the pipe twice in the same direction. See, for example, U.S. Pat. No. 4,345,855.

The more recent vessel named "Deep Blue" uses very large vertical (horizontal-axis) reels with a flange diameter of some 31 meters and capacity of 5000 tons. It also has separate rotating baskets of approximately 2000 ton capacity for the stowage of flexible pipe. The vessel uses the same lay tower for both rigid and flexible articles. However, separate track tensioners and travelling clamps are provided for the laying of continuous product and J-lay rigid pipe, respectively, and two separate radius controllers. The reels have to be sunk deep into the vessel to keep the centre-of-gravity low enough to allow adequate length of pipe to be carried within the stability limitations of the vessel. See, for example, U.S. Pat. No. 6,371,694.

Accordingly, it is an object of the present invention to provide improved methods and apparatuses for laying elongate articles from a vessel, particularly using a single convertible platform with low centre of gravity and maximum versatility.

The invention in a first aspect provides a sea-going vessel having pipe launching apparatus for laying continuous elongate product, the pipe launching apparatus comprising:

first product supply apparatus arranged substantially at deck level for supplying continuous elongate product into a first path along a deck at one side of the vessel;

second product supply apparatus arranged substantially at deck level for supplying continuous elongate product into a second path along deck at the opposite side of the vessel;

a tower structure mounted substantially on the vessel centreline and inclinable to a desired launch angle to align with a catenary curve of said product suspended below the vessel;

pipe handling means within said tower structure operable to receive said product at a central elevated position for gripping and supporting the weight of the suspended product while paying it out; and tower diverter means operable for receiving said product from deck level at one of two side elevated positions above said first path or said second path respectively according to whichever production apparatus is being used, and for supporting the product in a curved path from the side elevated position to said central elevated position and aligning it with said launch angle.

It will be seen from the following summary and from the detailed embodiments which are described herein, that such an arrangement provides unprecedented versatility in choice of operational modes and product types. It will be seen from what follows that an individual component such as a carousel or welding line can serve at different times as part of both the first and the second production apparatus. To ease understanding, therefore, it should be noted that the "first path" and "second path" mentioned above may be just short segments of an overall path of the product on each side, which may be convoluted in practice, and will vary according to the many possible modes of operation. In the terms of this aspect of the invention, however, these particular segments are used to define which of the first and second "production apparatus" is being used. The same could be explained in different terms by viewing one such component as a part of only the first or the second production apparatus, and explaining the different paths as features of different modes of operation. The choice of one particular terminology is merely for defining the invention clearly and consistently, and does not imply any limitation on the scope of the invention compared with any other choice of terminology.

Said first product supply apparatus may include at least one pipeline production facility for receiving sections of rigid pipe and joining them to produce said continuous product for supply directly to said pipe handling means via said first path.

In a preferred embodiment, an alternative production facility for a different process is arranged in parallel, on a deck above the other. One is rapid but inflexible, while the other is adaptable to a wider range of products.

Said pipeline production facility may be arranged toward the opposite side of the vessel from said first path and anti-parallel thereto, the product being diverted through a 180° curved path into said first path and thence to the tower diverter. It goes without saying that strict compliance with terms such as "anti-parallel" and "180°" is not necessary, and these terms represent the general direction of the respective components only.

In such a case, said second product supply apparatus may include the same pipeline production facility operable to supply continuous product onto a storage carousel via substantially the same curved path in a first phase of operation and then in a second phase of operation to unload the stored product via said 180° curved path substantially in reverse and thus into said second path and thence to the tower diverter.

Said 180° curved path may be defined by a diverter structure partially surrounding said carousel.

Said first product supply apparatus may include a horizontal pipe storage carousel for storing a length of pre-fabricated continuous product, the carousel being operable to unload said product into said first path and thence to the tower diverter.

The same carousel may be operable as part of said first product supply apparatus and as part of said second product supply apparatus, according to its direction of rotation during unloading.

The same carousel may be arranged to be loadable from an on-board pipeline production facility and alternatively from an off-board supply (e.g. reeling on at port or possibly at sea), the direction of rotation during unloading being different according to the source of supply.

A loading stinger may be provided on the vessel for receiving pipe from said off-board supply.

The carousel may be substantially surrounded by a large radius diverter structure, the product being diverted from storage on the carousel around the outside of this structure whether serving as part of the first or second production apparatus. This structure, which may be a curved wall according to the first aspect of the invention above, may serve for example to align the product with the direct production lines, and also to accommodate variations in winding height without requiring elevating support for pipe conditioning apparatus on said first and second paths. Elevating parts are not excluded by the invention, however.

The pipe launching apparatus may further include first and second vertical radius controllers mounted at deck level for receiving the product and diverting the product upward from said first path and said second path respectively toward said tower diverter means.

The first and second vertical radius controllers may include common components, these being transferable from the one side of the vessel to the other side of the vessel according to which production apparatus is being used.

The first and second vertical radius controllers may be mounted for fore-and-aft movement to adjust their position according to the inclination of the tower structure.

The pipe launching apparatus may further comprise a straightener associated with each vertical radius controller for removing a plastic bending introduced by the vertical radius controllers. The straightener may be mounted on a pivoting arm adjustable according to the inclination of the tower structure.

Said tower diverter means may comprise a radius controller mounted on the tower above said elevated position and movable between port and starboard operating positions for receiving said product at a side elevated position above whichever of said first path or said second path is appropriate.

The radius controller may be movable between said port and starboard positions by swinging it in an arc about a lay axis of the pipe handling means. The tower diverter means may further comprise a straightener supported so as to move together with the radius controller.

The radius controller may further be operable at a central position for receiving elongate article from a central product supply apparatus at deck level. This may be for example a supply of flexible pipe.

In a second aspect, the invention provides an apparatus for laying continuous rigid pipe from the deck of a vessel at sea, the apparatus comprising pipe supply apparatus arranged on said deck;
pipe launching apparatus for receiving the pipe from said supply apparatus and for launching the pipe into the sea at an angle greater than 60° to the horizontal;

wherein the pipe supply and launching apparatus together define a path for the pipe such that the pipe is subject to plastic bending sequentially in first and second planes prior to launch, the first and second planes being substantially perpendicular to one another relative to the orientation of the pipe at initiation of each bending.

By this means, the effects of bending, be they beneficial or detrimental effects, can be distributed evenly around the circumference of the pipe, rather than concentrated at certain "clock positions" and not others. Ovalisation of the pipe is also minimised by this arrangement.

The invention similarly provides a method of laying rigid pipeline wherein the pipe is subjected to plastic bending sequentially in first and second planes prior to launch, the first and second planes being substantially perpendicular to one another relative to the orientation of the pipe at initiation of each bending.

It is preferred to avoid twisting of the pipe, in which case the first and second planes will be perpendicular in space. However, if the pipe is twisted between the two bendings, this will not necessarily be the case, as the term "perpendicular" is with reference to the orientation of the pipe, rather than any absolute reference.

Where the pipe supply apparatus is arranged to release pipe in a horizontal direction, the first plane of bending may be a substantially horizontal plane and the second plane a substantially vertical plane.

Alternatively, the first bend may be in a substantially vertical first plane and the second plane may be substantially perpendicular to the first plane and inclined at an angle similar to the pipe launch angle.

A first straightener may be provided for removing the bending in the first plane. The first straightener may be arranged to act prior to bending in the second plane. Alternatively, bending in both planes may be followed by straightening in both planes.

In a preferred embodiment, said pipe launching apparatus includes:

an elevated structure for supporting the pipe at said launch angle above deck level;
upward diverting means for receiving continuous pipe from said pipe supply apparatus and imparting plastic bending to the pipe in said substantially vertical plane to direct said pipe to an upper part of said elevated structure;

an upper radius controller on the upper part of said elevated structure for receiving the pipe from the upward diverting means and diverting the pipe downward, substantially to said launch angle;

a straightener for receiving the downward directed pipe from the upper radius controller and removing at least the vertical component of said plastic bending prior to launch of said pipe into the sea.

The upper radius controller may be oriented so as to impart plastic bending in a plane substantially perpendicular to said vertical plane, or alternatively substantially in said vertical plane.

In the latter case, the form of the supply apparatus may be such as to impart to the pipe plastic bending in a substantially horizontal plane, prior to said upward diverting means.

The supply apparatus may include a pipe storage reel mounted on the vessel. The bending in the first plane may be part of the reeling process, or bending in said first and second planes may be performed, subsequent to unreeling.

The supply apparatus may include a welding production line for producing said pipe from pipe sections on board the vessel for supply to said pipe storage reel. The first bending can be imparted during reeling.

The reel may be mounted horizontally, that is, with a vertical axis. Horizontal reels help in lowering the centre of gravity of the arrangement when laden with pipe, increasing the safe load for a given hull.

The supply apparatus may be arranged to direct the pipe along a side deck of the vessel, the pipe being bent upward from said side deck then bent toward the centre line of the vessel at an elevated location to reach the launch angle.

In such a case, the upper radius controller will be oriented transversely to the centreline of the vessel. In accordance with another aspect of the invention set forth below, the upper radius controller may be operable alternatively at port and starboard sides, to suit different modes of production.

In a different embodiment, the invention of the second aspect provides pipe launching apparatus be arranged to direct the pipe from a supply at deck level from one side of the vessel toward the vessel centreline and then with bending in a horizontal plane substantially parallel to the centreline of the vessel at deck level, the pipe then being bent upward in a vertical plane to an elevated location and then downward in the same vertical plane to reach the launch angle.

This arrangement permits a horizontal reel to be combined with a central tower or stern ramp. The supply of pipe from a horizontal reel comes naturally from one side of the reel, even though the reel is generally mounted on or very close to the vessel centreline.

Where means are provided for performing said bending in the horizontal plane on pipe received directly from the reel, said means may be mounted on an elevating support to track the varying height of product windings on the reel. In one particular embodiment, pipe conditioning means for effecting horizontal bending and straightening and also said upward bending are mounted on a common elevating platform.

The supply apparatus may include a welding production line for producing said pipe from pipe sections on board the vessel for supply directly to said pipe launching apparatus.

The pipe launching apparatus may comprise a tower according to various further aspects of the invention as set forth below.

The invention in a third aspect provides apparatus for diverting a continuous pipeline for example during pipeline fabrication and/or laying operations, the apparatus comprising effectively a wall curved in one dimension and extended in another dimension, whereby pipeline can be drawn under tension around the wall so as to follow any one of many similar curved paths without moving the wall.

The wall may extend vertically, while curving horizontally, such that said pipeline can be drawn different paths having substantially the same curve horizontally but different elevations.

The wall may be formed by a plurality of parallel rollers arrayed along a curved path, to reduce friction. Alternatively the wall can be a simple smooth surface, for example of steel.

The apparatus may comprise at least one auxiliary guide means (typically a roller) movable in said other dimension parallel to the wall for constraining the pipeline to follow the desired one of said curved paths (rather than relying on tension alone). This is particularly a concern where the wall extends vertically, as the weight of the pipe may otherwise cause it to deviate from the desired path, and possibly cause damage.

There may for example be auxiliary guide means at one end of the wall to constrain the point of entry or exit of the pipeline to or from the wall.

There may be a plurality of adjustable guide means spaced around the wall and movable so as to constrain the pipeline at a number of points along the curved path. The plurality of guide means may be adjustable independently of one another, so that the position of said pipe can vary in said other dimension as the path progresses around the wall.

The apparatus may be arranged to feed said pipeline to or from a pipe storage reel, the selected path varying as winding/unwinding progresses in the axial direction of the reel.

The apparatus may in particular be arranged for interfacing between the reel, where pipe exits or enters the reel at varying axial positions as winding progresses, and pipe conditioning apparatus substantially fixed in the direction of the reel axis. Thus the conventional "level winder" mechanism is avoided or simplified. It may still be desirable for the pipe conditioning apparatus (for example a straightener) to be adjustable in orientation, to account or slightly different angles of pipe path.

All or part of the wall may be mounted so as to be movable to vary the selection of curved paths in a further dimension.

In a preferred embodiment, the curved wall of the pipeline diverting apparatus comprises a fixed curved wall portion and a movable curved wall portion pivoted about an axis adjacent an end of the fixed wall portion so as to vary curved paths available from the fixed wall portion. The movable wall portion may have a radius of curvature smaller than the fixed portion, the pivot axis of the movable portion being set back within the radius of the fixed wall portion. Guide means movable parallel to the reel axis may be provided at or near the extremity of the movable wall portion closest to the reel, so as to constrain the pipeline to an appropriate axial position for orderly winding.

Where the apparatus is arranged to feed said pipeline to or from a pipe storage reel, the part of the wall closest to the reel may be arranged to move radially relative to the reel as winding/unwinding progresses in the axial direction of the reel. The wall may for example be mounted to pivot about an axis parallel to the axis of the reel.

The wall may be arranged so as to be curved around the location of a pipe storage reel. This space-saving arrangement is possible, whether the wall is to function in association with the reel or is for unrelated operations.

The invention in this third aspect further provides a reeled pipe storage apparatus comprising a pipe storage reel and the diverting apparatus as set forth above, the curved wall of the diverting apparatus partially surrounding the reel.

The diverting apparatus may be arranged for receiving pipeline from the supply and guiding it to the reel during winding. The diverting apparatus may be arranged for receiving pipeline along either of two alternative paths during reeling, including a first reeling path running clockwise around the curved wall and onto the reel and a second reeling path running anticlockwise around the curved wall and onto the reel.

The diverting apparatus may be arranged for receiving pipeline from the reel during unwinding thereof and guiding it to pipe launching apparatus. The diverting apparatus may be arranged for guiding the pipeline along either of two alternative paths during laying, a first unreeling path running anticlockwise around the reel and onto the curved wall and a second unreeling path running clockwise around the reel and onto the curved wall.

The optional features of the diverting apparatus mentioned above apply equally in this context.

In a preferred embodiment, the curved wall of the pipeline diverting apparatus comprises a fixed curved wall portion and two movable curved wall portions, pivoted about respective axes adjacent opposite ends of the fixed wall portion so as to offer a bridge between the variable radius of windings on the reel and the fixed radius of the fixed wall portion, whether the reel is wound clockwise or anticlockwise.

Each movable wall portion may have a radius of curvature smaller than the fixed portion, the pivot axis of the movable portion being set back within the radius of the fixed wall portion.

The fixed wall portion may have a radius of curvature in excess of 15 m or 20 m.

The invention in a fourth aspect further provides a reeled pipe storage apparatus comprising a pipe storage reel having a vertical axis and at least one spooling arm comprising a movable curved wall, the movable curved wall being fixed vertically and extending over substantially the loadable height of the reel for supporting and diverting the pipe under tension between the reel and pipe handling apparatus, and being movable (for example pivotable about an axis parallel to the axis of the reel) such that one end of said wall is movable within the reel toward and away from the reel axis, according to the radius of wound pipe, while the other end maintains a substantially constant position for conveying the pipe to or from other apparatus.

Guide means (typically rollers) movable parallel to the reel axis may be provided at or near the extremity of the movable wall portion closest to the reel, so as to constrain the pipeline to an appropriate axial position for orderly winding.

In a preferred embodiment, first and second spooling arms are provided for guiding pipe along either of two alternative paths during reeling, the first spooling arm defining part of a first pipeline path running clockwise onto the reel and the second spooling arm defining part of a second pipeline path running anticlockwise onto the reel.

The fixed wall portion may have a radius of curvature in excess of 15 m or 20 m. It may have a height in excess of 5 m. These values allow a very large capacity reel, and also minimise damage to the pipe.

The invention further provides methods of fabricating, reeling, laying and otherwise processing pipe as suggested by the apparatus of the first, second and third aspects of the invention set forth above, and as exemplified in the detailed description of embodiments further below.

In a fifth aspect, the invention provides a pipe laying vessel having a carousel arrangement providing separate first and second storage means for respective stocks of continuous elongate articles (for example so-called rigid pipe, but also flexible pipes, cables, chains, rope or whatever) wherein the first and second horizontal pipe storage carousels are arranged on substantially a common vertical axis.

The carousel arrangement may provide means for driving each of said storage means to rotate around said axis for loading or unloading the respective article. The driving means may be adapted for driving both storage means at independently controlled rates of rotation.

The driving means and other apparatus on the vessel may be operable such that one of said storage means can be unloaded for launching its respective elongate article into the sea, while the other of the storage means is rotated to load it with new stock of elongate article.

The vessel may be further provided with pipeline fabrication means for fabricating continuous rigid pipeline from a store of pipe sections. The loading may alternatively be from auxiliary storage reels, for example in the case of flexible pipe, rope etc.

The second storage means may be positioned above the first storage means.

The second storage means may be nested at least partially within the first storage means.

The first storage means may comprise a reel, the reel having a hub surrounding the axis and being adapted for winding the respective elongate article onto the outside of said hub. The hub may be a right circular cylinder, or frusto-conical, for example.

In a first preferred embodiment, the first storage means comprises a reel having a hub surrounding the axis and being adapted for winding the respective elongate article onto the outside of said hub, while the second storage means comprises a containment for located in a space within the hub of the reel, the second storage means comprising a cylindrical containment wall and floor adapted to contain a coil for storing a flexible elongate article and means for loading and unloading the article from above.

The carousel arrangement of the fifth aspect of the invention may naturally be combined with the inventions of the first, second, third and fourth aspects, and further aspects below, or may be used independently.

The invention further provides methods of fabricating, reeling, laying and otherwise processing pipe as suggested by the apparatus of the fifth aspect of the invention set forth above, and as exemplified in the detailed description of embodiments further below.

The invention in a sixth aspect provides a sea-going vessel having pipe launching apparatus which comprises:
 pipe section supply apparatus for supplying lengths of pipe from a store on board the vessel;
 a first tower section mounted on the vessel and inclinable to a desired launch angle to align with a catenary curve of a continuous pipe suspended below the vessel;
 pipe handling means mounted on the first tower section for receiving pipe from said supply apparatus and for gripping and supporting the weight of the suspended pipe while paying it out;
 an upper work station mounted at the top of the first tower section for joining a new length of pipe supported above said work station to the suspended pipe; and
 a second tower section operable in an extended position above the first tower section for receiving said new length of pipe from said pipe section supply apparatus and supporting it during said joining at the first workstation, wherein said pipe section supply apparatus, upper work station and handling means are operable in cycles to add successive lengths of pipe to the suspended pipe, and wherein said second tower section is collapsible telescopically into a collapsed position within the first tower section when not in use.

There may further be provided a lower workstation near the bottom of the first tower section. Depending on the height of each tower section, such an arrangement enables rapid laying of double joints or preferably quad joints. By providing a work station elevated at the top of the first tower section, and also one at the foot of the first tower section (near deck level), two joints can be worked on in parallel. At the same time, the upper section can be relatively lightweight, and can be lowered to improve the stability of the vessel in poor weather, and in transit. The expression "within the first tower" is not intended to limit the invention to cases where the first tower section actually surrounds the second tower section to any set degree. The two structures may in practice rest alongside one another.

The pipe handling means may comprise at least one travelling clamp mounted to travel up and down the first tower section on a carriage to control paying out of the pipeline.

The carriage may be operable to elevate and lower the second tower section, while separate fixing means are provided for retaining the second tower section in said extended position.

There may be further provided an alternative supply apparatus for continuous elongate product, including means at an elevated position on the first tower section for receiving said continuous product from deck level, the pipe handling means mounted on the first tower section being adaptable for continuous paying out of said continuous elongate product.

The ability to use the same handling means for continuous and step-wise product adds considerably to the compactness, cheapness and versatility of the vessel.

In a preferred embodiment where said pipe handling means comprises a first travelling clamp mounted on a carriage as mentioned already, said handling means may further comprise a second travelling clamp mounted on a second carriage movable up and down within at least a lower part of the first tower section, the first and second travelling clamps being operable in a hand-to-hand sequence with both clamps moving reciprocally and alternately gripping the continuous elongate product to effect continuous paying out of said continuous elongate product.

The or each travelling clamp may comprise plurality of individual ram units arrayed around and along a length of the product path. Drive means may be provided in the form of an incompressible segmented rack. These features are the subject of earlier patent applications by the present applicant, for example GB 2 364 758 A and GB 2 370 335 A (agents' ref 63566GB and 63591GB), the contents of which are incorporated herein by reference.

The second travelling clamp need not travel up and down the first tower section during operation of the pipe section supply apparatus, where paying out is naturally step-wise and the ability to move the product continuously is not an advantage. For reeled pipe, however, the ability to lay at a continuous rate is very important because of the enormous inertia of the laden reel.

In the embodiments to be described, the travelling clamp carriage(s) is (are) trapped at the lower part of the first tower section while the second tower section is collapsed into the first tower section, but this limits operational flexibility and need not be the case. The second tower section may in any case be made demountable, leaving only one workstation at deck level. If the first tower section is quad joint length, then quad joints can still be laid, but at a reduced rate because all work steps must be carried out at the same work station.

Where a lower work station is provided near the bottom of the first tower section, it may be mountable on the carriage of the second travelling clamp. In this way, although the second carriage is normally fixed in J-Lay operations, the workstation can be moved to a different height to accommodate non-standard operations. Each of the clamps and the workstation may be retractable into the tower to allow passage of bulky accessories such as pipeline end terminations (PLETs), anodes and the like.

The lower workstation may be mounted on a platform inclinable relative to the second carriage, so as to maintain it horizontal at different launch angles.

As an alternative to travelling clamps, of course track-type tensioners or other handling means can be employed. Track tensioners for supporting very heavy loads tend to be very heavy compared with equivalent clamps, however.

The invention in a seventh aspect provides a sea-going vessel having pipe launching apparatus for launching an elongate product, the pipe launching apparatus comprising:
  a tower structure;
  product handling means within said tower structure operable to receive said product at an elevated position and to align it with said launch angle and for gripping and supporting the weight of the suspended product while operations are performed upon it; and
  a workstation comprising a platform for supporting machinery and personnel appropriate to said operations, wherein the pipe handling means includes at least one travelling clamp mounted to travel up and down at least a part of the tower structure on a carriage, and wherein said work station is mountable on the carriage of the travelling clamp to travel with the clamp.

In this way, although the second carriage is normally fixed in J-Lay operations, the workstation can be moved to a different height to accommodate non-standard operations.

The tower structure may be inclinable to a desired launch angle to align with a catenary curve of said product suspended below the vessel, the mounting of the platform on the carriage being adjustable to maintain the workstation in a horizontal attitude at a range of different launch angles.

The workstation may be retractable from the line of the product while remaining on the carriage. The clamp may be retractable from the line of the product independently of the work station.

The travelling clamp may be one of two travelling clamps mounted on independent carriages.

The invention in a eighth aspect provides a sea-going vessel having pipe launching apparatus which comprises:
  a tower structure mounted on the vessel and inclinable about a horizontal tower pivot axis to a desired launch angle to align with a catenary curve of a continuous elongate product suspended below the vessel; and
  pipe handling means mounted on the tower structure for receiving pipe from a supply apparatus and for gripping and supporting the weight of the suspended pipe while paying it out at said launch angle, wherein said tower structure is mounted above a moonpool of the vessel and said tower pivot axis is substantially below main deck level, for example 2 m, 2.5 m, 3 m or more.

It is advantageous to have the pivot point close to the neutral point of the vessel, while conventional tower designs do not achieve this. The claimed arrangement affords a lower centre of gravity and a better range of launch angle for a given size of moonpool. It will be understood by the skilled person that the main deck of a vessel is readily identified, even though higher decks (shelter decks, working platforms etc.) may be present in known vessels, which may be higher than the tower pivot axis.

The invention in an ninth aspect provides a sea-going vessel having pipe launching apparatus which comprises:
- a tower structure mounted on the vessel and inclinable about a horizontal tower pivot axis to a desired launch angle to align with a catenary curve of a continuous elongate product suspended below the vessel;
- pipe handling means mounted on the tower structure for receiving pipe from a supply apparatus and for gripping and supporting the weight of the suspended pipe while paying it out at said launch angle; and
- at least one extendable strut supporting said tower structure at a point above said pivot axis to control the inclination of the tower structure, wherein said extendable strut extends between said point on the tower structure and a fixed point on the vessel, said fixed point being provided by a raised structure substantially above main deck height.

The extendable strut may comprise an hydraulic ram operable to elevate the tower through its full range of inclination in a single stroke.

Auxiliary locking means may be provided to secure the tower at the desired angle in case of power failure.

The invention in a tenth aspect provides a sea-going vessel having pipe launching apparatus for laying continuous elongate product, the pipe launching apparatus comprising:
- product supply apparatus arranged substantially at deck level;
- a tower structure including pipe handling means for receiving said product at an elevated position on a launch axis and supporting the weight of the suspended product while paying it out along the launch axis; and
- tower diverter means including a radius controller mounted on the tower above said elevated position for receiving said product from deck level at another elevated position away from the launch axis and for supporting the product in a curved path to said elevated position and aligning it with said launch axis angle; and
- auxiliary diverter means in the form of an A-frame having legs arranged to pivot on either side of the radius controller and tackle for supporting a load between distal ends of the legs so as to describe an arc in the plane of said curved path but at a greater radius.

The auxiliary diverter can be used for passing non-uniform portions of the product over the radius controller, where they would otherwise cause damage to the product and/or the apparatus.

The pivoting of the A-frame may be controlled in operation by one or more extendable struts such as hydraulic rams.

The tackle on the A-frame may include a winch.

The A-frame need not have any particular shape. A rectangular form in which the legs are parallel and bridged by a boom provides good clearance for the accessories being handled.

The radius controller and auxiliary diverter may be movable between said port and starboard positions by swinging it in an arc about a lay axis of the pipe handling means. The tower diverter means may further comprise a straightener supported so as to move together with the radius controller.

The radius controller may further be operable at a central position for receiving elongate article from a central product supply apparatus at deck level. This may be for example a supply of flexible pipe.

The invention in a eleventh aspect provides a method of deploying or recovering an article from the seabed using a sea-going vessel having pipe launching apparatus for launching elongate products, the pipe launching apparatus comprising a tower structure including product handling means operable to receive said product at an elevated position and to align it with said launch angle and for gripping and supporting the weight of the suspended product while operations are performed upon it, the pipe handling means comprising at least one travelling clamp mounted to travel up and down at least a part of the tower structure on a carriage, the method comprising attaching the load to an elongate article of a type grippable by said travelling clamp and using the travelling clamp to hoist or lower the load.

In a preferred embodiment, where said pipe handling means comprises a first travelling clamp mounted on a carriage as mentioned already and a second travelling clamp mounted on a second carriage movable up and down within at least a lower part of the first tower section, the method comprises operating the first and second travelling clamps in a hand-to-hand sequence with both clamps moving reciprocally and alternately gripping the elongate article to achieve continuous hoisting or lowering.

The elongate article used to support the load may be a flexible pipe, drill pipe sections, wire rope, or even chain. The clamps may be fitted with adaptor shoes as appropriate.

The load being abandoned or recovered may be pipeline or other elongate product previously paid out using the same pipe handling means.

The invention in this aspect avoids the need to provide a crane of capacity equal to that of the product handling clamps in order to perform abandonment and recovery (A&R) operations with the largest loads. A smaller capacity crane can be provided for routine A&R operations which do not require the full capacity.

The invention in a twelfth aspect provides a method of adapting a vessel previously operated as a hydrocarbon production and storage vessel for operation as a pipe fabricating and laying vessel, wherein at least one storage tank is adapted for storing sections of pipe for pipeline fabrication.

The adaptation may be reversible, such that at least bottom and side walls of said tank remain intact after adaptation.

The invention in a thirteenth aspect provides a method of adapting a vessel previously operated as a hydrocarbon production and storage vessel for operation as a pipe laying vessel, wherein a raised deck is constructed to provide working space for said pipe laying operation while leaving substantial pipework associated with said production and storage operations intact beneath the raised deck.

Both of the twelfth and thirteenth aspects have the advantage that the conversion for pipelay operation is relatively cheap and reversible, and the capital risk of the project is reduced.

BRIEF DESCRIPTION OF THE DRAWINGS

Embodiments of the invention will now be described, by way of example only, by reference to the accompanying drawings, in which:

FIGS. 2a and 2b are a side and plan view respectively of a known reel laying vessel (Apache), showing a deck-mounted vertical reel deploying via a stern-mounted vertical lay ramp;

FIG. 4a is a more detailed plan view of a product carousel and loading/unloading apparatus of the vessel of FIGS. 3a and 3b.

FIG. 9c is a more detailed view of the bottom of the tower and a welding station within the tower, with the tower inclined;

FIG. 17 is a side view of a vertical radius controller and second straighter of said vessel;

FIGS. 22a and 22b are more detailed side and plan views of the elevating platform of the vessel of FIGS. 19a and 19b.

DETAILED DESCRIPTION OF THE EMBODIMENTS

Figure 1:
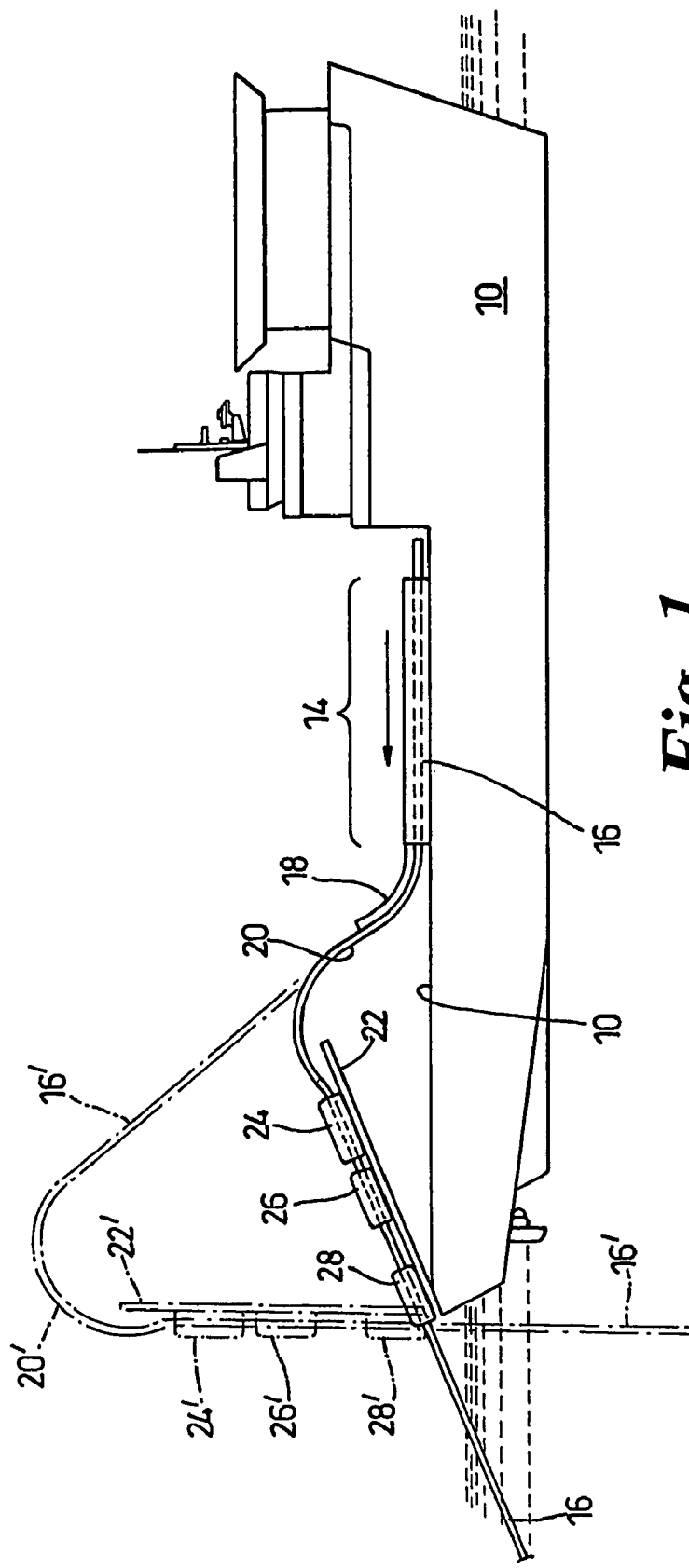
FIG. 1 is a side view of a known laying vessel (Seaway Falcon), showing a deck-mounted firing line deploying via a stern-mounted vertical lay ramp.

FIG. 1 shows schematically the arrangement of a known pipe laying vessel 10, known commercially as "Seaway Falcon", having a deck 12, on which is mounted a pipe line assembly arrangement 14, comprising various welding, coating and testing stations for assembling a continuous pipeline from a stock of pipe segments. Pipe 16 formed in this way progresses in the direction of the arrow, over first and second radius controllers 18, 20. A tiltable ramp 22 is provided for launching the pipe over the stern of vessel 10. In solid lines, ramp 22 and other equipment are shown in a near-horizontal orientation, appropriate to lower water depths. In chain-dotted lines, the same components are shown in a steeply elevated orientation, with the reference signs primed (22' etc.). The radius controllers 18 to 20 guide the pipe and restrict within set limits, according to the angle of the ramp 22. On ramp 22 there are mounted various pipe handling devices, namely: straightener 24, tensioning and paying-out device 26 and fixed clamp 28.

Seaway Falcon does not provide support for reel lay, and is therefore incapable of laying long continuous lengths of rigid product. The vessel is, furthermore, restricted in size and as a result not ideally suited for deep lay operation.

FIGS. 2a and 2b are side and plan views respectively of a known reel laying vessel/barge 40 as disclosed in U.S. Pat. No. 4,917,540, and known commercially as "Apache". The vessel has forward 42, midship 44 and stern 46 sections, and a reel 50 mounted at the midship section having a horizontal axis of rotation extending transversely of the ship, such that the load of the reel is distributed downwardly and outwardly substantially in the direction of the longitudinal axis of the ship. The ship further includes pipe conditioning apparatus 54 located at the stern section and a radius controller 56 after it is unspooled from the reel, both of which are mounted upon a lay tower 52. A straightener 58 imparts a reverse bending force to the pipe opposite to the curvature imparted to the pipe by the reel. The pipe entry angle at which pipe enters the sea is altered by varying the angle of the lay tower, as indicated by the hashed outline of the tower. The vessel is not easily converted for deployment of articles having different mechanical properties, such as flexible conduit, or power cable. Furthermore, the stages that involve bending of the pipe; that is loading to the reel, and unloading from the reel, and for guiding the pipeline through the guiding mechanism into the sea, all occur in substantially the same, horizontal plane. As a result, the size and weight of the reel is limited to the height of the centre of gravity of the vessel that can be tolerated without creating unacceptably high risk of instability, thereby limiting the lay length achievable with such a configuration.

A new design of pipelaying vessel is hereby presented (and variants), which overcomes many of the disadvantages and limitations of the aforementioned vessels.

Offshore construction systems are designed and specified to undertake deployment (and recovery) operations for projects expected in the foreseeable future. The systems are particularly targeted towards the deepest developments planned anywhere around the world, although pipe deployment in 150 m water depths (or less for smaller pipes) is equally desirable. One of the goals of the new vessel design is to provide increased payload capacity, allowing projects to be undertaken with the minimum number of intermediate mobilisations. The ship size and draft can inhibit the ability to visit certain ports and product manufacturing facilities. This has also been accommodated in the design.

The key requirements for the new vessel are to provide as a minimum the following in-field facilities:

On-board manufacturing of rigid pipe using a conventional firing line and/or a Radial Friction Welding process.
Deployment of rigid pipe up to quad-joint length by J-lay.
Deployment of rigid pipe by continuous lay from a Carousel.
Deployment of flexible pipe from a Carousel or standard reels.
Deployment of umbilicals.
Attachment and subsequent deployment of Pipeline Structures (PLET's, etc).
Deployment of 600 te seabed structures by heave compensated lowering.
Top tension capability of 1500 tonnes
Extensive pipe joint storage The design goal is to satisfy all of these requirements by designs involving many novel features.

The vessel's capabilities are summarised in the following table:

| Product | Operation | Product Source |
|---|---|---|
| Rigid Pipe | J-lay of quad-joints | on-board Firing Line |
| | J-lay of continuous pipe | on-board Firing Line |
| | Continuous lay | Carousel |
| Flexible Pipe | | Carousel Basket or standard 9.2 m reels |
| Pipeline Structures (PLET's, In-line 'T's, etc) Seabed Structures | Attachment to pipe and deployment Deployment to the seabed | |

Figure 3A:
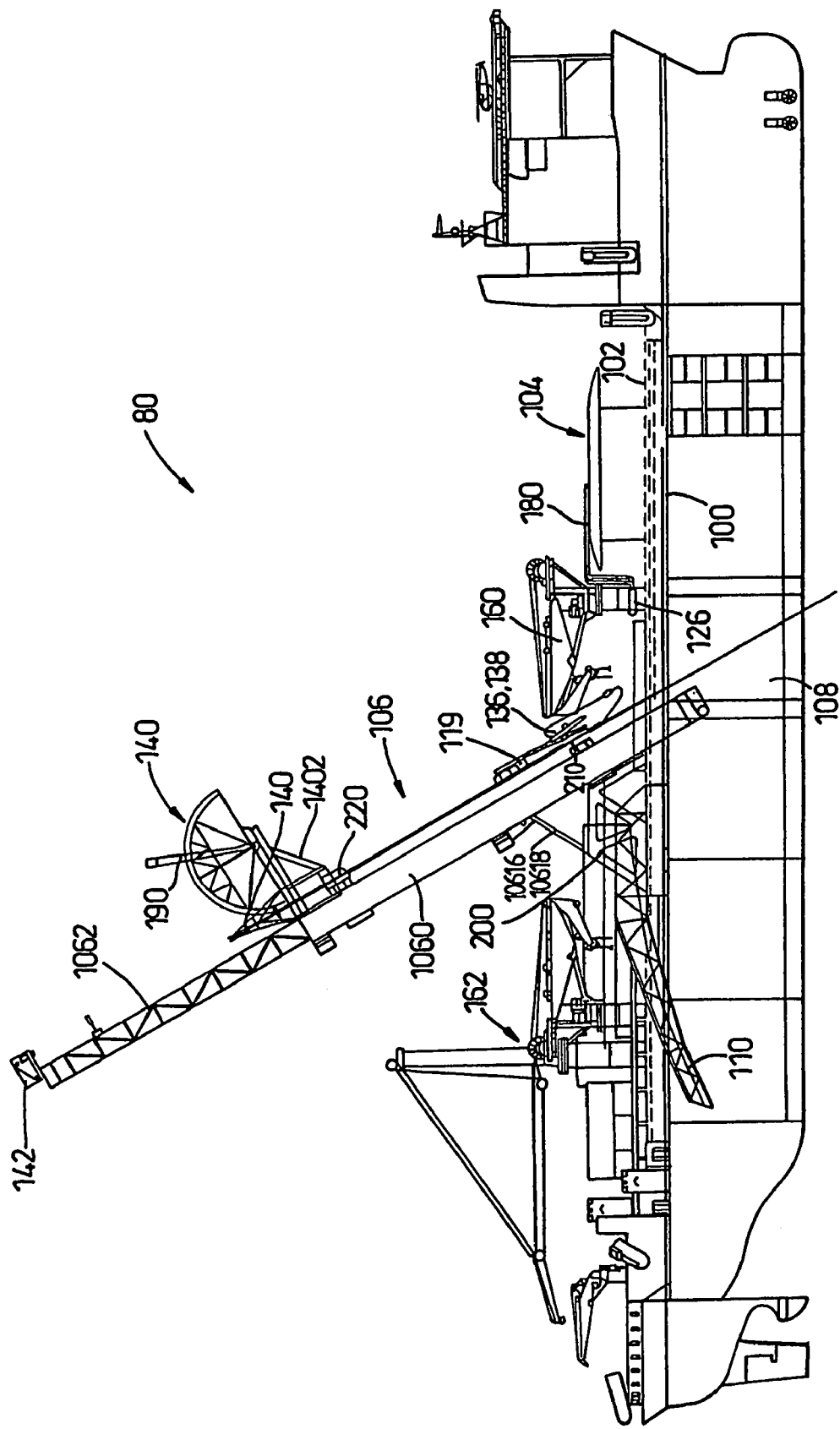
FIGS. 3a and 3b are side elevation (part cut-away) and plan view respectively of a novel pipelaying vessel, having a "horizontal" (vertical-axis) reel and an aft-leaning tower.
Figure 3B:
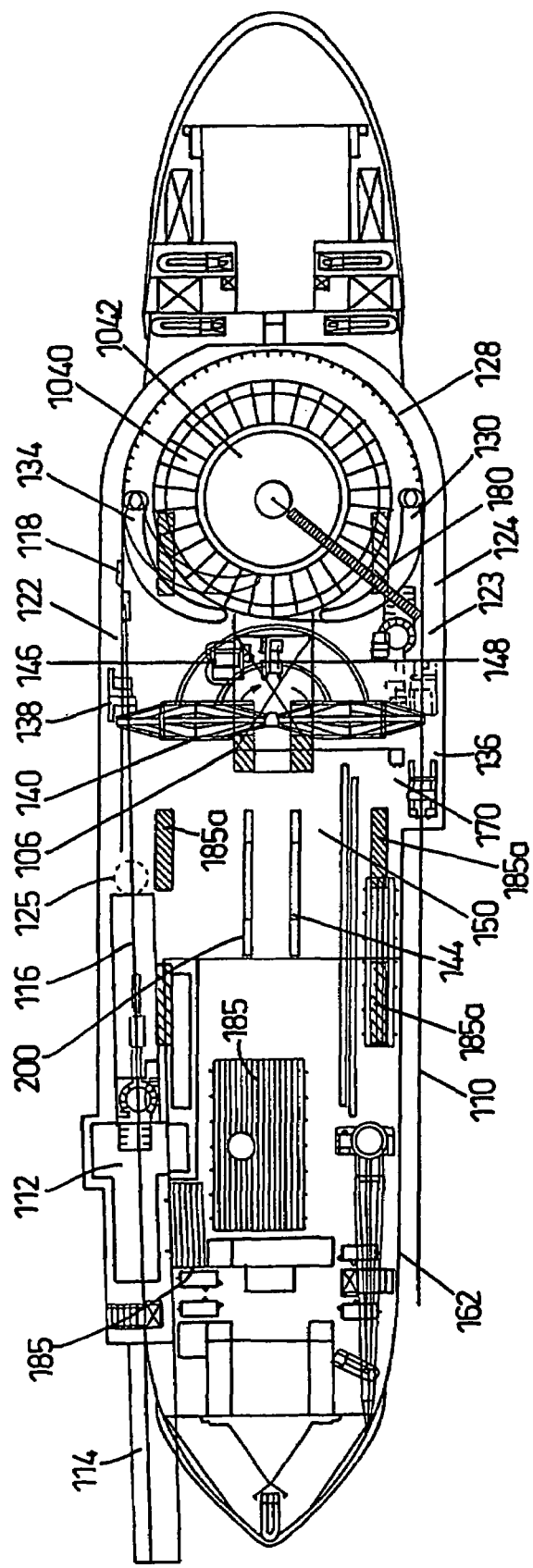

FIGS. 3a and 3b are side and plan view respectively of a first, preferred, embodiment of an improved pipelaying vessel 80, arranged to provide the required capability. The vessel comprises a lower deck 100, which is part of the original superstructure, upon which is mounted an upper deck 102, providing support for the majority of the pipelaying apparatus.

Equipment Summary

The following equipment is provided upon the upper deck 102, as illustrated in the accompanying figures, provided with the references as shown and described in detail later.

| System | Components |
|---|---|
| Lower Tower and tilt system | Lower Tower structure, tilt rams, support structure Deployment Clamps with associated carriage and drive systems Radius Controller Arch Straightener. Two enclosed workstations in the Tower providing welding, NDE and coating facilities Pipe-stock elevating system |

-continued

| System | Components |
|---|---|
| Upper Tower | Upper Tower structure, and pipe stock transfer apparatus |
| Loading/Deployment Stinger | Stinger structure and associated equipment Tensioner Straightener |
| Pull through Equipment | 300te Winch |
| A & R system | Rope Storage Drums Diverter Sheaves No specific components |
| Carousel | Carousel Reel(s) and Basket Rigid Product Spooling Arms Carousel Basket Basket Product Manipulators/Gantry |
| Pipe Bending | 23 m Horizontal Radius Controller 12 m Vertical Radius Controller 3 × straighteners |
| Pipeline Manufacture | Port firing line-6 stations (double joints) Tensioner |
| Radial Friction Welding | RFW Machine and associated equipment and structures |
| Standard Reels (project supply) Pipe Storage Racks Pipe Handling facilities in tanks | Dolly Bases Tensioner |
| Pipeline Structures | Handling Facilities |
| Craneage | 600t overboarding crane 2 × 70te knuckleboom deck cranes 1 × 30te stores crane (poop deck) |
| ROV systems Ship interface | Raised Deck |

The vessel employs a forward-located configurable product carousel 104 (comprising nested outer rigid product carousel 1040 and inner flexibles basket 1042), a rearward-leaning tower 106 (comprising a massive lower tower 1060, and a frame-like upper tower 1062) for deploying via a moonpool 108 and a side-mounted stinger 110 for loading and deployment. The centre of gravity of the carousel, and therefore the load, is low, while the capacity provided is high, with much less onerous effects on the stability of the ship than a horizontal axis reel providing the same capacity.

Elongate articles are laid from the vessel in a variety of ways, all of which use common pipe apparatus, which includes product firing lines 112, 114, 116, straighteners 118, 119, 120, tensioners 122, 124, 125, 126, reaction tracks 123, a forward-mounted radius wall 128, carousel reeling/unreeling arms 130, 134, one or more vertical radius controllers 136, 138, a tower-mounted rotatable vertical radius controller 140.

Support equipment for the laying operations comprises Abandonment and Recovery equipment 142, 144, 146, 148, a pipe elevator system 150 for translating large-diameter rigid pipe lengths from the deck into the tower, various cranes 160, 162, winches and product storage facilities 170.

FUNCTIONAL OVERVIEW

There follows a brief overview of the equipment. Further detailed is provided in the corresponding sections later within this document.

Deployment

The Lower Tower 1060 and its associated equipment forms the fundamental deployment medium. Product is deployed by the movement of Deployment Clamps (210, 220 not shown) within the Tower. The clamps are capable of moving in a "hand-to-hand" mode providing a continuous speed of deployment. For J-Lay deployment, where rigid pipe is joined on board, the lower clamp remains static at the Lower Tower base while the upper clamp travels over the full track height.

The Upper Tower 1062 is capable of extending, to enable a greater speed of deployment of quad joints. This is due to the ability to perform simultaneous execution of welding and NDE/coating operations by being able to hold quad joints in the Upper Tower.

Product up to ~45 cm (18") diameter can also be deployed or loaded using the stinger 110 configured to the side of the ship.

Pipe is joined either by a Radial Friction Welding (RFW) firing line 112 or in a conventional Firing Line 114, 116, both located on the port side of the ship. It can then be deployed (or stored) by either:

- as a continuous pipe routed around the 23 m radius wall 128 (aft of Carousel 104), along the starboard side to a deck-mounted vertical radius controller 136, over a Tower-mounted Arch 140 and to Deployment Clamps 219-220. Product is initiated and terminated using a 300 te winch, or
- as a continuous pipe spooled onto a Carousel 104 for later deployment, or
- as pipe stocks transferred over pipe racks to a Pipe-stock Elevator system. The pipe stock is raised to the top of the Upper Tower 1062. From there it is transferred to the deployment centreline where it is welded to the previous quad-joint length. The Deployment Clamps lower the new section (now forming the top of the catenary) into the Lower Tower 1060. Welding, NDE and coating are also carried out at a Tower work station (see later for detail).

Due to the flexibility of the pipe laying system, the skilled person will appreciate that each firing line could be located on separate sides of the ship, both firing aft. A port-located firing line would use a starboard-located vertical radius controller 138, and a starboard-located firing line would use a port-located vertical radius controller 136. The tower vertical radius controller 140 would be located to accommodate being fed from either vertical radius controller 136, 138, but would deploy down the same clamps 210, 220 and moonpool 108.

Seabed structures, such as suction anchors, manifolds, etc., are deployed to 200 m by an overboarding crane 162 where they are transferred to the rigging from the Tower 106. The Deployment Clamp drive system provides heave compensation control which allows the structures to be lowered safely to the seabed. The same drive system is adapted to lower the Upper Tower 1062 for transit and raise it again for operation.

Abandonment & Recovery (A&R)

Apart from specific A&R Rope, Storage Drum and diverter sheaves (see later for detail), the A&R system has no specific equipment associated with it. Abandonment and recovery operations are executed using the Deployment Clamps 210-220 in the Tower as the hold-back/driving device. It is anticipated that in shallow waters an Initiation Winch will have sufficient capacity to perform A&R without having to use the Deployment Clamps.

On-Board Storage

The layout indicates substantial pipe rack storage on deck (185 for example). Alternatively this space can accommodate standard 9.2 m reels on dolly bases 170, project equipment and containers or structures associated with the pipeline. The location of a 600 tonne crane 162 is selected so that the reels and the structures can be handled appropriately upon the deck.

Areas 185*a* shown hatched indicate areas where the deck can be opened to permit storage of rigid pipe sections, flexible product and/or tools and other associated components in the existing storage tanks. Suitable racking and the like can be installed within the tanks, which can be removed if the vessel should be returned to its original function.

Pipeline structures are handled into the Lower Tower 1060, and after fine adjustment, welding, etc., they are deployed on the pipe catenary by the Deployment Clamps 210, 220 to the seabed.

Carousel Reel and Basket

Product of all product types up to ~45 cm (18") diameter can be loaded onto the carousel 104 using the stinger 110 mounted on the starboard side of the ship. A tensioner 124 is provided to generate the required back-tension in rigid pipe product to properly spool onto the Carousel.

Rigid product is paid off the Carousel using an Offspool Arm 134. This allows pipe from any wrap on the Carousel to be aligned with the straightener (straightener 118 is transferred to the appropriate side of the vessel to accommodate the carousel wrap direction) and deck-mounted vertical radius controller 136. The deployment route is the same as for the continuous lay process.

Umbilicals are placed into the carousel's inner basket 1042 using a Manipulator Arm 180 mounted on a gantry over the basket. A tensioner 126 pulls the product to the basket. Payout of the product from the basket is a reverse process. The product is routed directly to the Radius Control Arch 140 at the top of the Tower 106. The product is initiated and terminated using the combined action of an A-frame 190 mounted on the arch and a deck crane 160. A&R of heavy loads is executed by the Tower equipment.

Other Systems

Pipelay departure monitoring systems.
Seabed positioning equipment.
ROV's, and the like, are provided as usual.

The apparatus is now described in more detail, with reference to the relevant Figure(s).

STANDARD FIRING LINE

The onboard production of pipeline welds is undertaken by a firing line (112 or 114, 116) (as shown in FIG. 3*b*) performing radial friction welding or by utilising the known 'SERIMER™ Welding System' (for example SATURNAX™ orbital welders from Serimer DASA, France). Pipes are welded together and deployed from the vessel in several manners, such as "continuous lay mode" where the product is routed to the tower 106, or by joining sections (not shown) to form double or quad-joints for deployment using the tower configured for J-Lay (using the upper tower 1062). Whichever option is selected there is provided a welding firing line (112 or 114, 116) that contains all the equipment needed to handle, line up, weld, inspect and coat each completed welded joint.

Pipe is supplied to the vessel in various lengths ranging from 12 to 18 m as single joints and up to 28 m in double joints, and the welding stations as described above are established in specific, configurable locations dependent on the pipe lengths being utilised. Pipe handling is undertaken using dedicated deck mounted pipe handling equipment (for example, crane 162). Once at the weld station the pipe ends are aligned using pipe alignment machines and internal clamps are employed to hold the pipe ends together during pipe welding. Conventional stick welding could be employed to complete the welds but the known Serimer orbital welding system is the preferred method of welding. Once welded the joint is subjected to NDE inspection before having a field joint coating applied. The application of the field joint coating tends to be the limiting speed factor in producing completed joints due to the lengthy application and cure times involved. The number of work stations available combined with the pipe specification determines the optimum number of stations that are allocated to each process, and is configurable between projects. The vessel facilitates six work stations 112 to be located on the port side and allows the welding, NDE and field joint coating to be completed prior to the product passing the radius control wall en route to the deployment tower 106 or for loading onto the Carousel 104.

The J-lay arrangement is readily accommodated by reconfiguring the workstations into a different arrangement (not shown) to allow the completed pipe joints to be transferred to the product loading elevator system.

RADIAL FRICTION FIRING LINE

The known Radial Friction Welding (RFW) System, as disclosed in the applicant's granted United Kingdom Patent GB2329603, is used to join two pipe lengths together using friction of rubbing surfaces to generate the heat required to form a homogeneous weld. The overall system developed attaches a single pipe length of 6" to 12" pipe, of any considered metallic pipeline material, to another pipe or pipestring. It also machines both the inside and the outside of the completed weld and undertakes a Non Destructive Examination of the weld using an ultrasonic technique prior to completion of field joint coating and stress relieving activities. The whole process is undertaken very rapidly in a fully automatic mode, although it is not so adaptable as the standard firing line to different types of product.

As described earlier, the standard and RFW firing lines are illustrated as being mounted one above the other, but could equally well be located on either sides of the vessel, due to the flexibility of the pipe handling system.

CAROUSEL

Figure 4B:
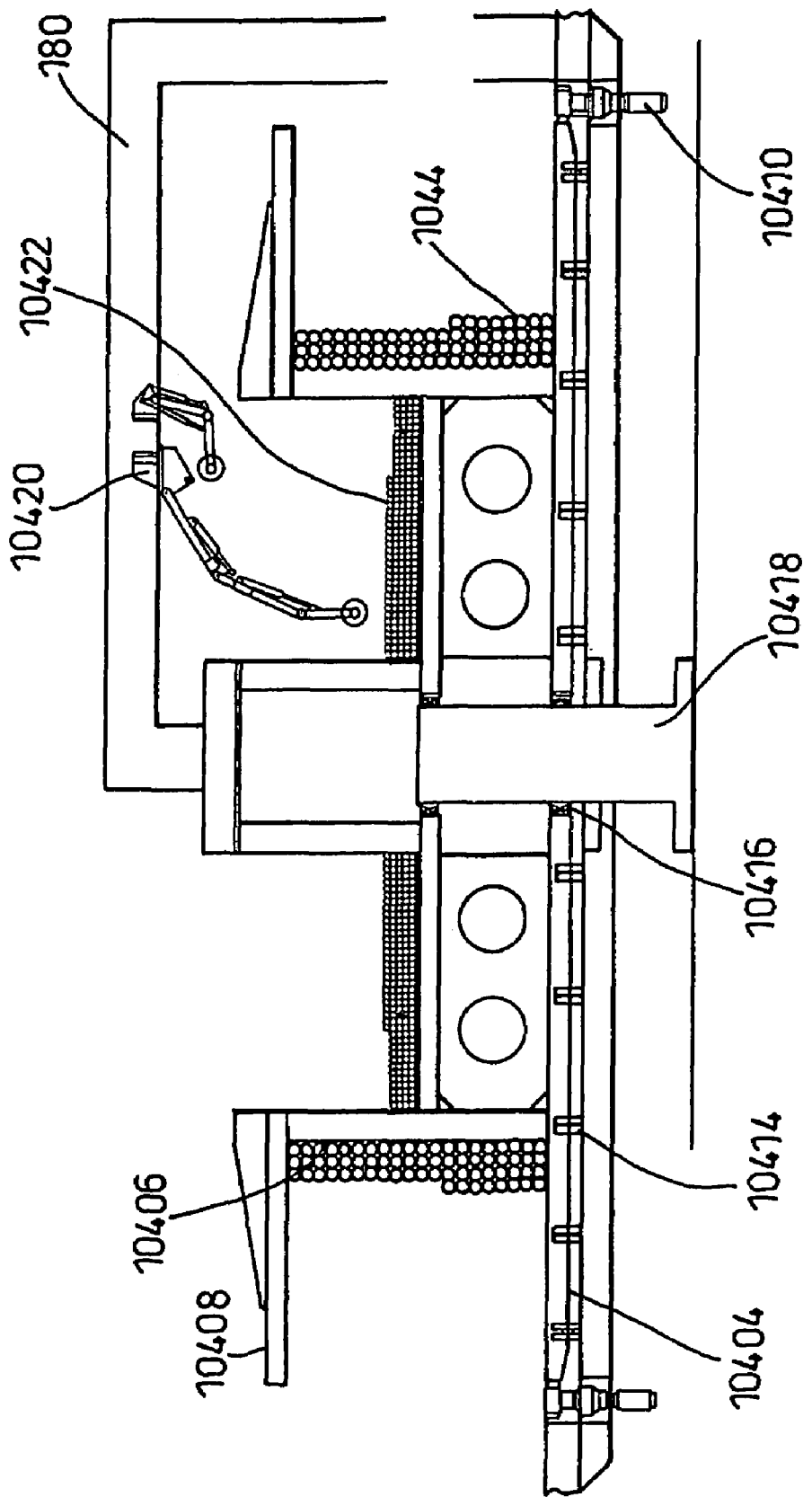
FIG. 4b is respectively a cross-sectional elevation of the product carousel FIG. 4a of said vessel.
Figure 4C:
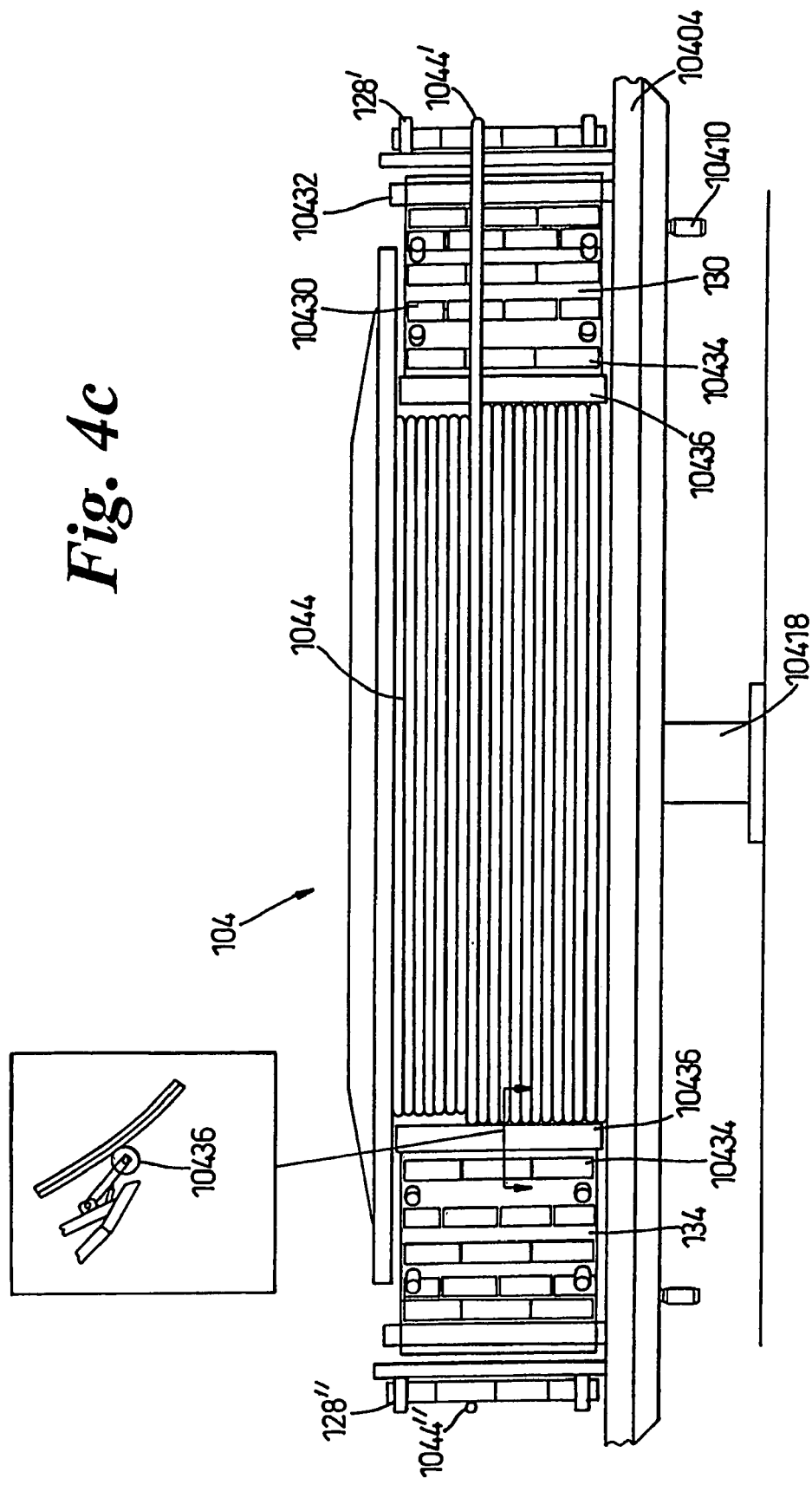
FIG. 4c is a side elevation of the carousel, with spooling arms.

FIGS. 4a, 4b and 4c are a detailed plan, cross-sectional elevation and side elevation view respectively of the vessel's Carousel 104, which is a large, horizontally mounted reel 1040 for the storage of continuous lengths of rigid and flexible pipe product 1044, and in which is mounted an independently driven basket 1042 for holding particularly flexible product 10422 such as umbilicals, or rope.

The assembly comprises:

An independently rotating reel 1040 with a base 10404 having an outer diameter of 39 m.

A 24 m diameter hub 10406.

Upper keeper beams 10408 attached to the top level of the hub required for maintaining product spooling.

An independently driven product basket 1042 located within the hub.

Two independent drive systems 10410, 10412 (not shown), each comprising four 200 kW six pole vector electric motors and gearboxes and braking systems, controlled to enable fine adjustment of product tension and deployment speed.

Vertical bearings 10414 and horizontal bearings 10416.

Two unspooling arms 130, 134 to guide the product from a given wrap on the carousel hub 10406 to a constant departure point over a series of acceptable bending radii.

The storage weight capacity of the Carousel 104 is 10,000 tonne of product. This may be apportioned between rigid pipe on the reel 1040 and umbilical spooled into the basket 1042.

The Carousel reel 1040 and basket 1042 are positioned around a centre core (king pin) 10418 and are rotated for spooling on and reeling off product. Both the drum and the basket rotate independently.

Rigid and flexible pipes are wrapped onto the reel's hub 10406 in a similar controlled manner to wire rope on a winch drum. A tensioner 122, 124, is required to provide the necessary product back tension to enable tight spooling onto the Carousel reel.

Spooling Arms 130, 134 (regions "D" and "A" respectively on FIG. 4a) are located in conjunction with a large radius controller wall (regions "B" and "C" on FIG. 4a) 128, located 3 or 4 meters outside of the Carousel rim. Their function is to guide rigid pipe product onto or off the Reel 1040 at the required turn or wrap, and align product to a straightener 118 or tensioner 122, 124 fixed in position. There are two arms provided, one for each wrap direction. The curvature of the rigid pipe in the horizontal plane is maintained greater than that of the Reel hub 10406 and the curvature of the rigid pipe in the vertical plane maintains the product within its elastic strain limits, i.e. without imposing any plastic deformation upon the pipe. The radius controller wall 128 and the spooling arms 130, 134 also provide restraint, and therefore protection, in the event that tension is lost in the product pipe and the pipe springs upon the carousel. As a result flailing action of the product pipe is prevented.

FIG. 4c is a side elevation of the carousel 104, looking in the direction towards the bow of the vessel, showing the carousel reel 1040, and two offspool/spooling arms 130, 134, which are used to load product to, or unload product from, the reel. A pivotable arm 130, 134 is provided for each product wrap direction (clockwise, or anticlockwise wrap, as dictated by the configuration of the pipe bending and straightening system).

The carousel 104 is mounted upon a central kingpin 10418, and vertical bearings 10410.

Each pivotable arm 130, 134 comprises a series of vertical-axis rollers 10430, arranged on a chassis to form effectively a curved wall extending from the reeled product to a pivot point 10432. The tip of each arm has a tip roller 10434 and reel contact rollers 10436. The arm is sprung or driven such that the contact roller contacts the spooled product. This ensures that the gap between the reeled product 1044 and the tip roller is as short as possible, minimising the risk of undesirable bending of the product as it is spooled or unspooled. The reel contact rollers 10436 minimise the friction between the arm 130, 134 and the reeled product 1044, as it is rotated past the arm. In alternative embodiments, the rollers may not be needed, and a smooth steel surface could suffice.

The product is kept from falling by gravity by being maintained under constant tension. The tension force is provided by the drive systems 10410, 10412 of the carousel and the first tensioner 124, 125 through which the product passes. It is possible that for larger diameter product tension alone may be insufficient to support the product as it passes around the radius wall, in which case vertical support rollers 10450 may be employed to provide additional support and guidance for the product between arm 130, 140 and the first tensioner 124, 125. The vertical support rollers 10450 also help to reduce twisting on the pipe, as the pipe passes around the radius wall 128.

The unspooled product 1044' passes forwards towards the bow of the ship and around the 23 m radius wall 128 (the ends of which are visible in the diagram and identified as 128' and 128"), reversing its direction of travel substantially 180° and back towards the stern of the vessel (as indicated by 1044").

The large volume enclosed by the hub 10406 of the carousel is utilised as a product storage basket 1042 in which long lengths of Umbilicals and Flexibles and their associated termination assemblies are stored. Umbilicals and Flexibles are laid into the basket using a Product Manipulator 10420 which guides the product into its stored spiral wraps without infringing the Minimum Bend Radius (MBR) for each product.

Carousels have a successful track record in the offshore construction industry, however the size and storage capacity is greater than any other currently in use.

Fine control and quick response to required speed and back tension changes in the carousel are possible by the use of 6 pole vector motors and an accurate control system, using a consistently low friction factor bearing arrangement 10414, 10416 for the rotating Carousel reel and Basket. Large bearing packs are located between the king pin and the Carousel 104, and low friction bearings are selected to minimise the deadweight drag.

The Off-Spooling Arms 130, 134 are to follow the product spooling level on the Carousel and the pivot point of the arm moves in conjunction with the product wrap level.

For the required storage capacity, structural and equipment weight and centre of gravity height is minimised to minimise adverse effects on ship stability.

A rigid foundation grillage (not shown) is provided to ensure uniform load distribution from the vertical bearings, upon which the grillage rides.

The Carousel reel 1040 is driven by four variable speed motors 10410 through reduction gearboxes. The speed of rotation is determined by a control system referencing against pipe tension payout sensors.

The Basket 1042 is driven by four variable speed motors (not shown) through reduction gearboxes. The speed of rotation is determined by a control system.

Mechanical brakes are used to hold the Carousel reel and Basket in position should the power be removed from the Drive Motors.

To achieve the accurate control required for the Carousel rotation the latest technology in Vector and Servo Drive systems is used.

It is also possible, as an alternative, to deploy flexible product by spooling onto industry standard 9.2 m diameter reels 170 and deploying directly from these. This does, however, limit the length of continuous umbilical that can be deployed.

It is also possible, as an alternative, to continuous ⅔ bend J-Lay using the on-board Firing Line.

PIVOTING TOWER

Figure 5A:
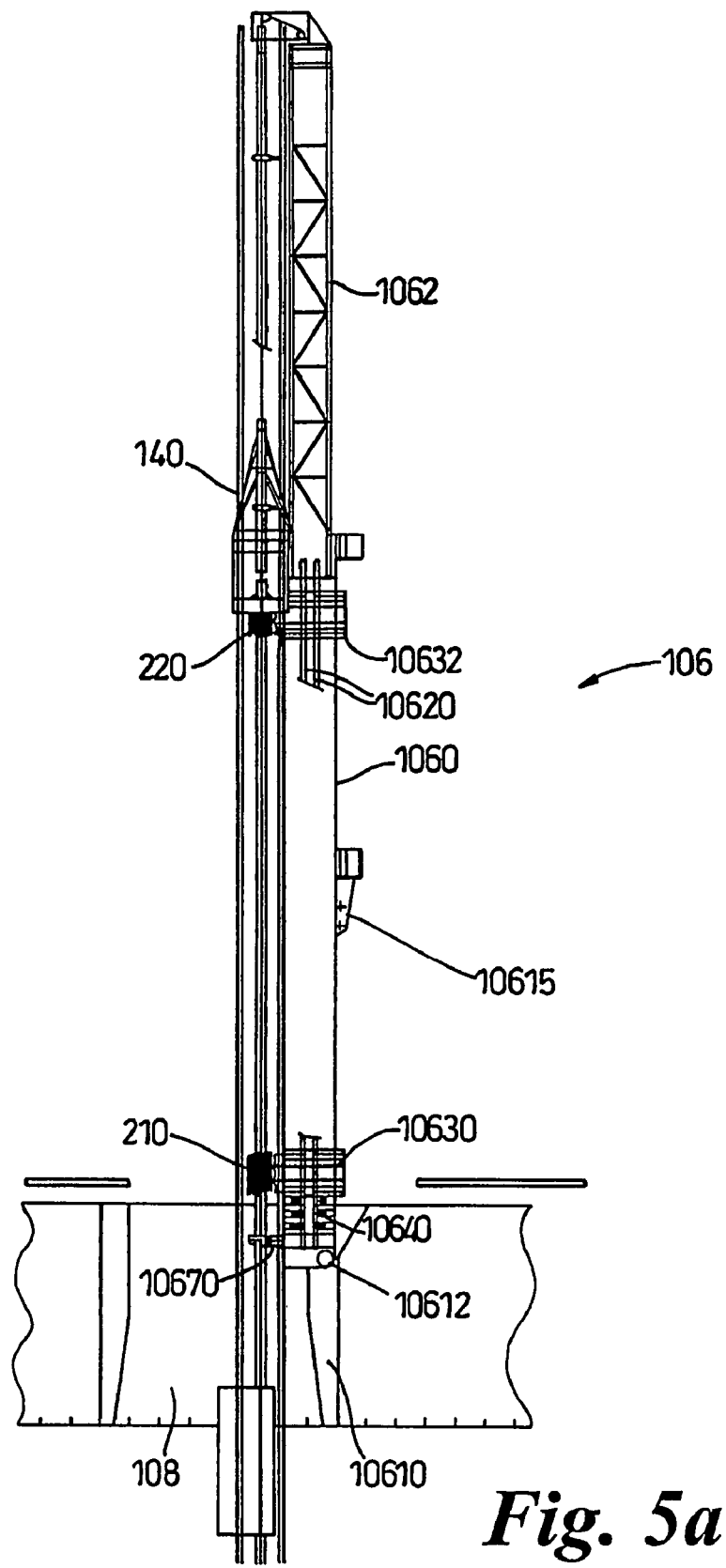
FIGS. 5a and 5b are more detailed views of the tower of said vessel looking from port and from forward, respectively.
Figure 5B:
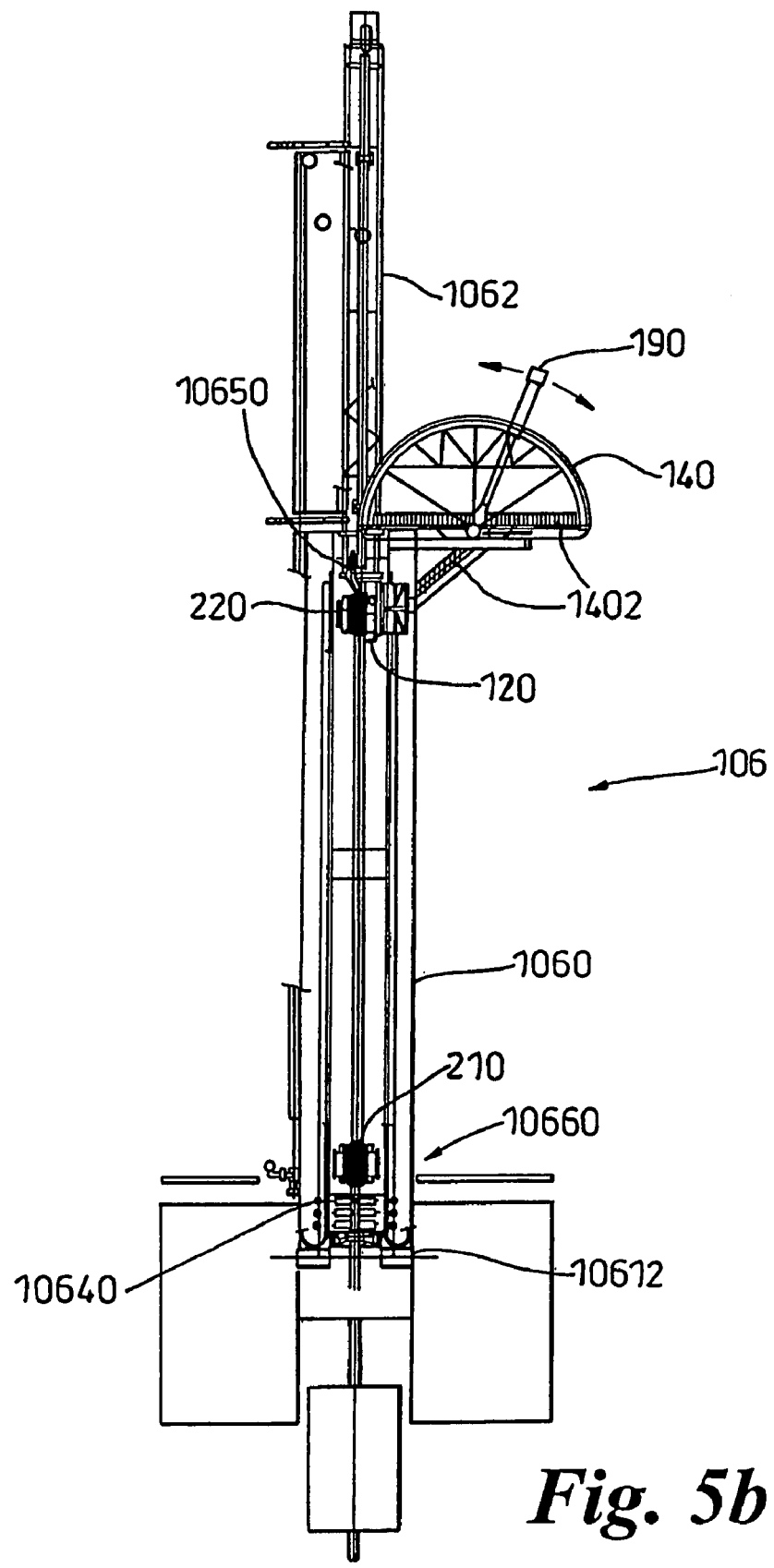

FIGS. 5a and 5b are respective port-facing and forward-facing views of the vessel's tower 106.

The Tower Structure comprises lower section 1060 and upper section 1062, each rising to 73.5 m and 126.5 m above the main deck respectively.

Foundations 10610 are formed between the aft bulkhead and cofferdam of the construction moonpool 108. The Tower 106 is mounted on a pivot 10612 supposedly by these foundations and is held in place by a tilt mechanism 10614 which acts against a mount 10615, located on the tower. It will be seen that the tower pivot axis is substantially below main deck level.

Figure 5C:
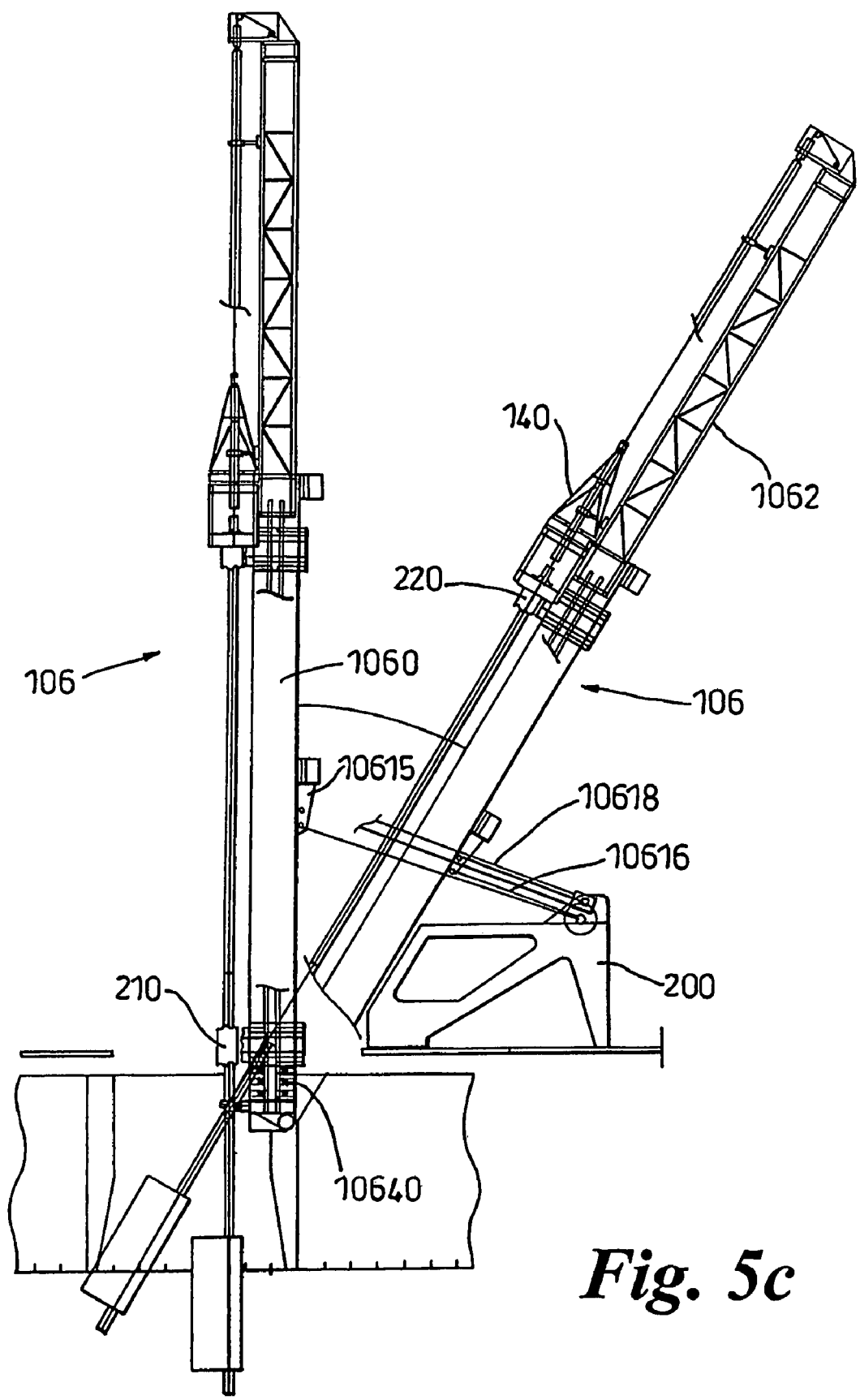
FIG. 5c is a view looking port of the tower and the angle through which it operates.

FIG. 5c is a side view looking port of the tower raising tilting system 10614, allowing the tower to be tilted from 90 degrees (vertical) to 60 degrees to allow the deployment of product in varying (shallower) water depths. The Tilt Mechanism incorporates hydraulic rams 10616 and locking struts 10618. The locking struts 10616 allow the Tower to be supported with the rams 10618 relieved of hydraulic pressure. The capability requirement for the Tilt Mechanism 10614 is optimised by the use of a deck-mounted support structure 200 limiting the length, stroke and load capacity requirement of the hydraulic rams.

Figure 8A:
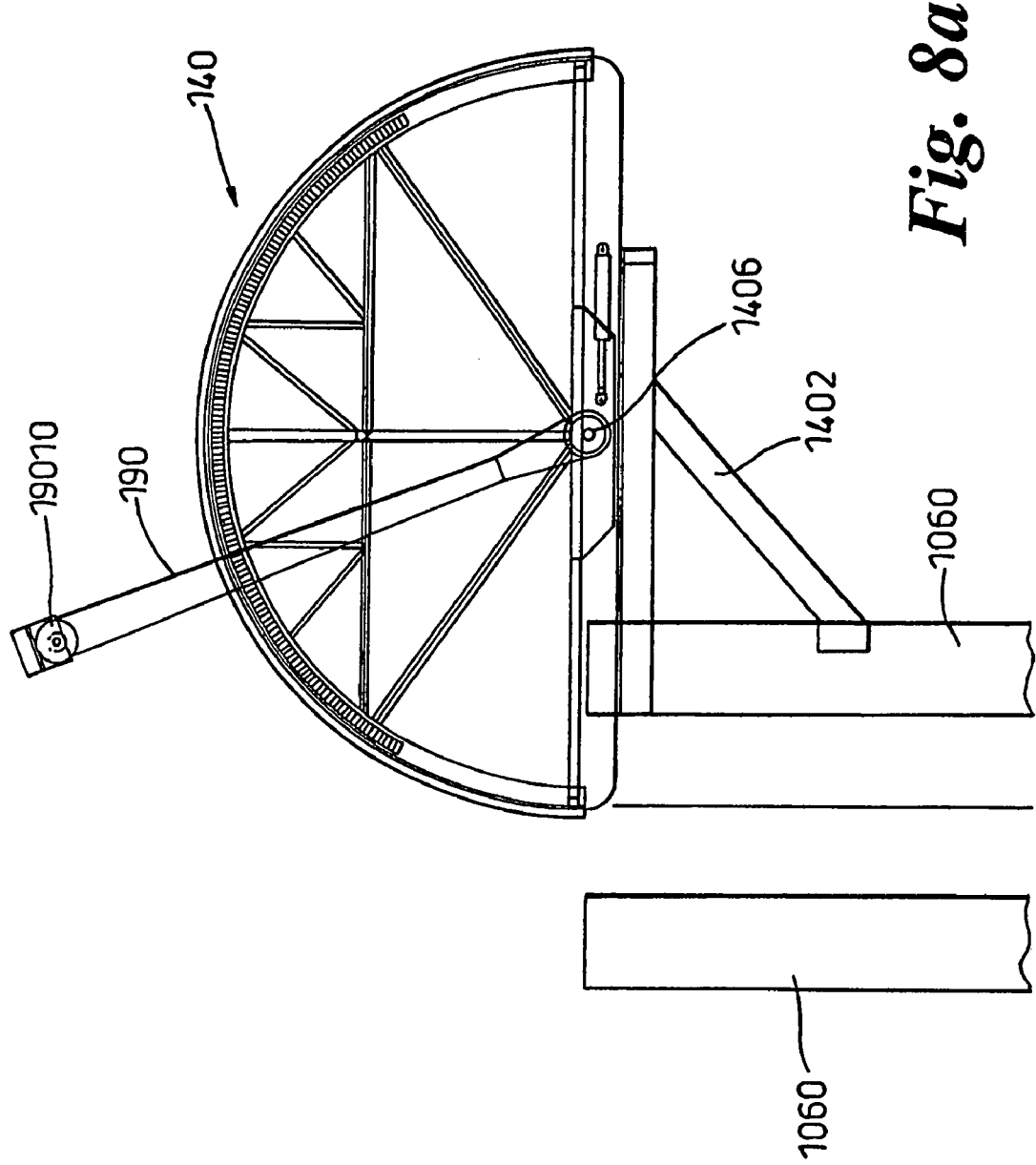
FIGS. 8a and 8b are a detailed side elevation and plan view respectively of an A-frame arrangement on the tower radius controller, for passing large bodies over the radius controller and for Abandonment & Recovery (A&R) operations.

A Radius Controller Arch 140 is located at the top of the Lower Tower 1060 (shown in further detail in FIG. 8a). Its function is to route the product from the deck mounted equipment to the product centreline in the Tower whilst maintaining a bend radius of 12 m. The arch is supported by a transverse box girder 1402, on which the Arch is able to rotate so that product can be directed to the Tower from either side of the ship. Umbilicals are directed into the Tower with the Arch at a 90 degree position.

Tracks 10620 for the Deployment Clamp Carriages 10630, 10632 are integrated into the Lower Tower 1060 column structures.

The overall dimensions of the Tower are governed by the following design goals:

To accommodate a track length for the Deployment Clamp Carriage to deploy 56 m long quad-joints using a single stroke of the Deployment Clamps. Similarly, the Upper Tower 1062 accommodates a quad-joint to be held over the product held in the Clamps.

To accommodate, within the box columns, the Deployment Clamp drive motors 10640 at the base of the Lower Tower 1060 and personnel access up the Tower.

To allow space for the Deployment Clamps 210, 220 and Carriages 10630, 10632 to travel between the box columns and to retract the Clamps clear of the product deployment centreline.

To found the columns within the width of the moonpool where maximum local strength can be developed in the ship steelwork.

The Tower is designed to accommodate loading of:

1500 te top tension from the product catenary.

250 te pipe initiation tension around the Radius Controller Arch.

600 te package for deep sea lowering.

In association with deadloads, environmental loads and the effects of ship motions.

The purpose is to allow deployment (and A&R) of:

Rigid and flexible products.

By J-Lay or Reel-Lay methods.

Attachment of pipeline structures (e.g. PLET's, in-line 'T's, etc).

Deployment of 600 te seabed structures using a heave compensated lowering system.

The following equipment is accommodated by the Tower:

Deployment Clamps 210, 220 and associated drive system.

Product Departure systems 10670.

Product Straightener 10650.

Pipe-stock elevation and transfer (to product centreline) systems 150.

Materials handling facilities.

Enclosed work stations 10680 and personnel access.

The structures used in the tower construction are either box-section girders and columns 1060 or lattice frame 1062 using tubular sections, both of which are standard construction forms. High tensile steel plate is used for the box sections, and is material widely used for special applications in offshore structures. The weight and associated high centre of gravity has a significant effect on the product storage weight capacity due to vessel stability. The risk of capsize is reduced by the use of the high tensile steel plate and box section construction for the Lower Tower 1060, reducing the structural weight, while maintaining structural integrity and stiffness. Stability is also improved by the use of permanent ballast in the ship.

The loads applied from the Tower to the ship structure are substantial. The ship structure is strengthened local to the Tower foundation 10610 to resist the high loading and to accommodate tilt of the Tower. Location of the Tower at the stern end of the moonpool allows the best use of the ship structure for support.

The load transfer system 10660 from the Deployment Clamps 210, 220 to the Lower Tower 1060 is optimised to minimise the compression forces on the tower, and as a result, minimise the thickness and strength of materials required in the tower's construction. The use of incompressible segmented racks for elevating the Deployment Clamps 210, 220, avoids the weight of the suspended product being transferred through the tower itself. The arrangement of the carriages and clamps within the structure of the tower ensures that the weight of the carriages and clamps, and any catenary, are shared between both sides of the tower.

It is possible, as an alternative, to deploy rigid pipes using Steep 'S' lay. The associated stinger may also be used to deploy flexible flowlines and umbilicals. Steep 'S' has the advantage of lower weight and centre of gravity of the deployment equipment and structures (Tower versus Stinger). However with steep 'S', the skilled person will appreciate that other measures may need to be added to enable deep sea lowering of seabed structures; increase the specification of the 600 te crane to include heave compensation and deep sea lowering capability or use a smaller version of the Tower.

MOVEABLE CLAMPS

Figure 6A:
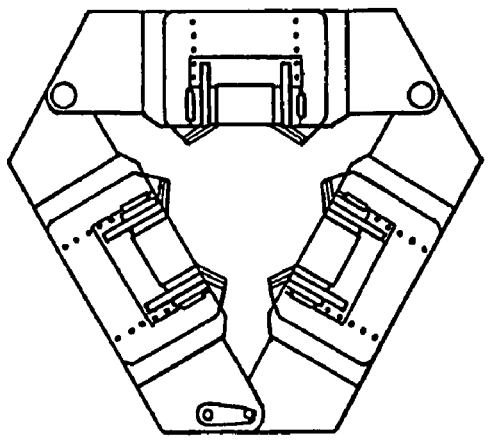
FIGS. 6a to 6c comprise more detailed isometric plan and cross-sectional views of a pipe handling clamp arrangement used in the tower of said vessel.
Figure 6B:
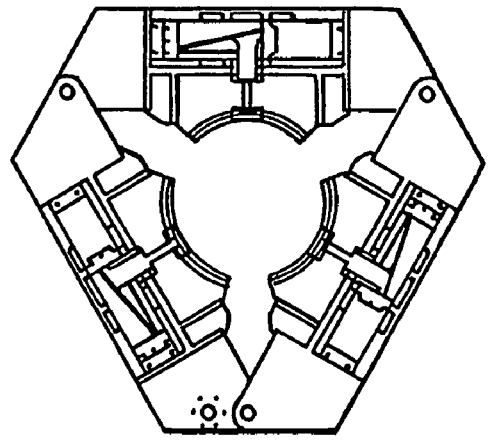
Figure 6C:
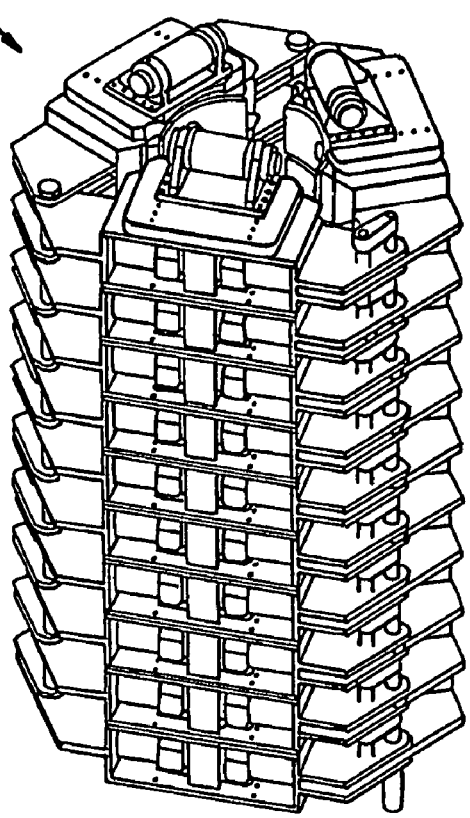

FIGS. 6a to 6c are more detailed plan and isometric views of the tower's pipe handling clamp arrangement.

The clamps are the subject of earlier patent applications by the present applicant, for example GB 2 364 758 A and GB 2 370 335 A (agents' ref 63566 GB and 63591 GB). A lower friction grip moving clamp 210, and an upper similar clamp 220, each rated to 1500 tonnes holding capacity, are provided to grip the product and deploy it to/from the seabed. This is in either a continuous moving "hand to hand" mode of operation for reel lay or in a "lower clamp fixed, upper clamp moving" mode of operation for J-lay, as illustrated in FIGS. 8c and 8d, described in detail later. Each clamp is mounted on a carriage 10630, 10632 that is connected to an electrically driven rack and pinion system 10640 located within each leg of the tower. The drive system is based upon incompressible segmented racks, which ensure that the weight of the clamps and catenary is presented to the base of the tower, rather than hanging off the top of the tower, which would be the case for more typical systems, such as a pulley or chain system. By exchanging pad sizes within each clamp, pipes ranging from ~10 cm to ~45 cm (4" to 18" NB) in spooled reel lay mode, or up to ~90 cm (36" NB) in J-lay mode, can be laid. The clamps are also able to grip J-lay collars, and can be configured to grip wire for Abandonment and Recovery operations.

For reel lay, both clamps 210, 220 move relative to each other, in a sequential manner to and from the middle of the tower, to hand over the grip on the product from one clamp to the other. The PLC controlled sequence will enable the minimum required continuous rate of deployment or recovery of 12 meters per minute to be achieved. In this mode of operation to achieve the optimum lay rate with the smoothest continuous operation neither clamp need travel more than half the distance of the tower. The PLC controlled sequence will ensure that while the product is being lowered by a gripping clamp, the other released clamp is travelling back to its starting point, where it is commanded to regrip the product, the tension being handed over from one clamp to another.

For J lay, the lower clamp remains at the base of the tower whilst the upper clamp travels the full length of the tower 1060 to hand over the grip on the product in a stop-start manner. This PLC controlled method of deployment enables quad joints of pipe to be laid at the minimum required rate of 3.5 km/day.

The moving clamp concept has been selected in preference to conventional tensioners primarily due to required space and weight considerations. The moving clamps 210, 220 are controlled by the same PLC systems that control tensioners. The tensioner control systems are now well established offshore, using the same technology for the moving clamps does not generate any technical problems. Of course, track type tensioners could be used within the tower as an alternative or additional pipe handling means, if the application requires it.

PRODUCT DEPARTURE SYSTEM

Figure 7:
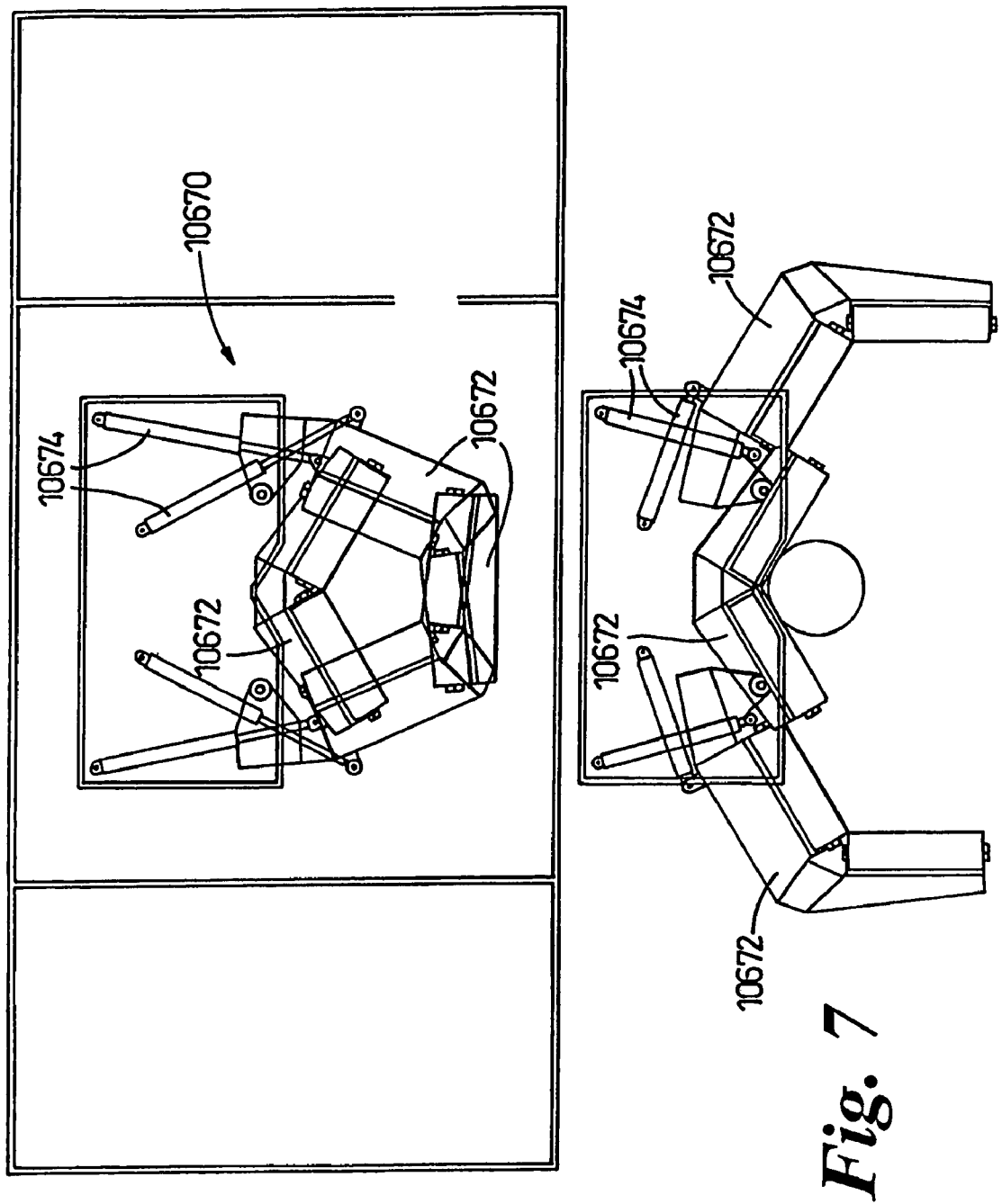
FIG. 7 is a more detailed plan view of a departure roller arrangement mounted at the base of the tower of said vessel, showing both engaged and disengaged configurations.

FIG. 7 shows a detailed plan view of the product departure roller box 10670 at the base of the tower, with three sets of actuated rollers 10672 operated by independent hydraulic rams 10674 that can extend and open out into the moonpool area 108 to capture pipes ranging from ~10 cm to ~90 cm (4" to 36"). Once captured and dependent on the outside diameter of the pipe, the PLC controlled hydraulic cylinders are activated to pull the pipe into a central position below the clamps. For deployment of large articles, such as PLETs, the roller box is retracted and stowed between the tower columns to allow the articles to pass.

RADIUS CONTROLLER A-FRAME

Figure 8B:
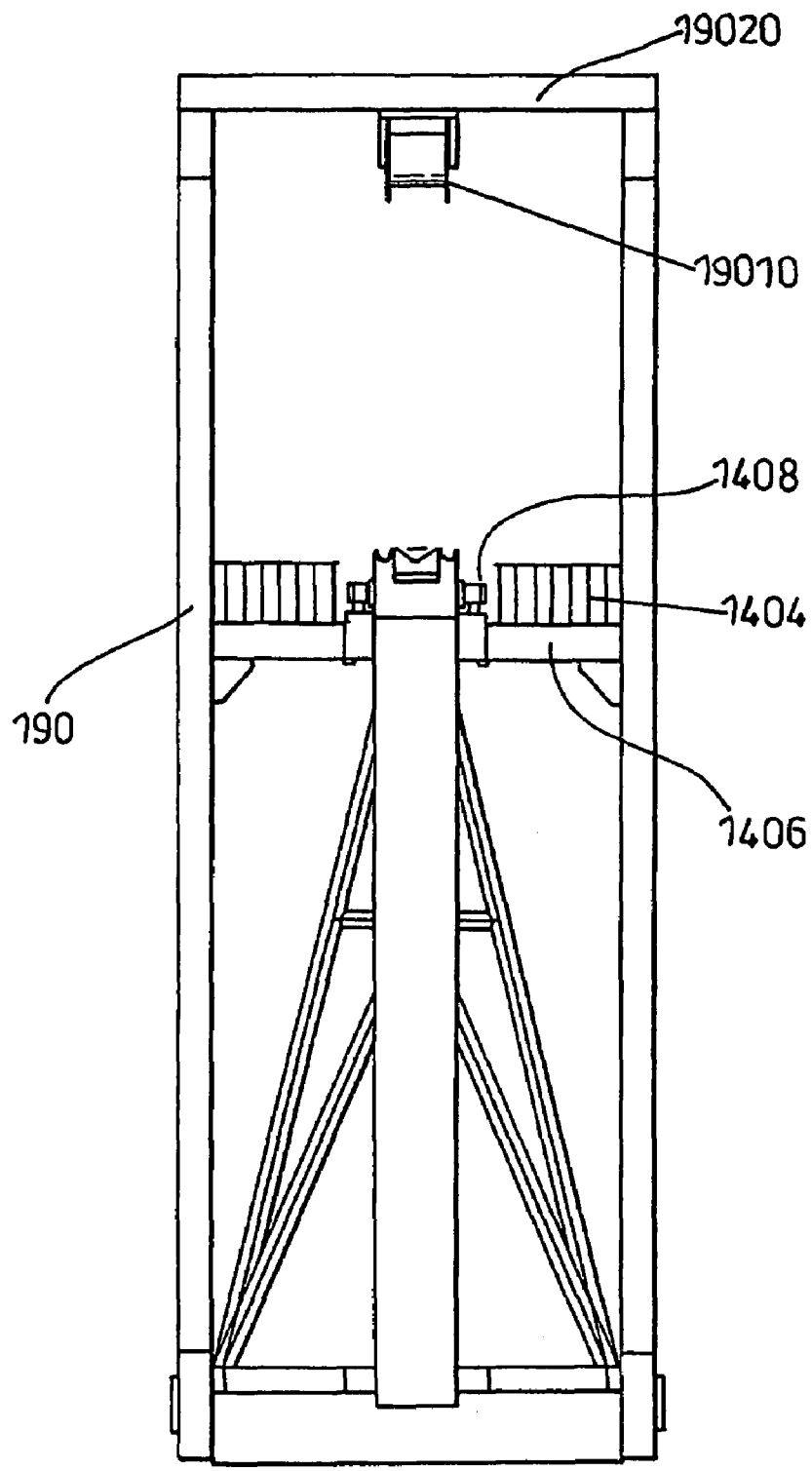
Figure 8D:
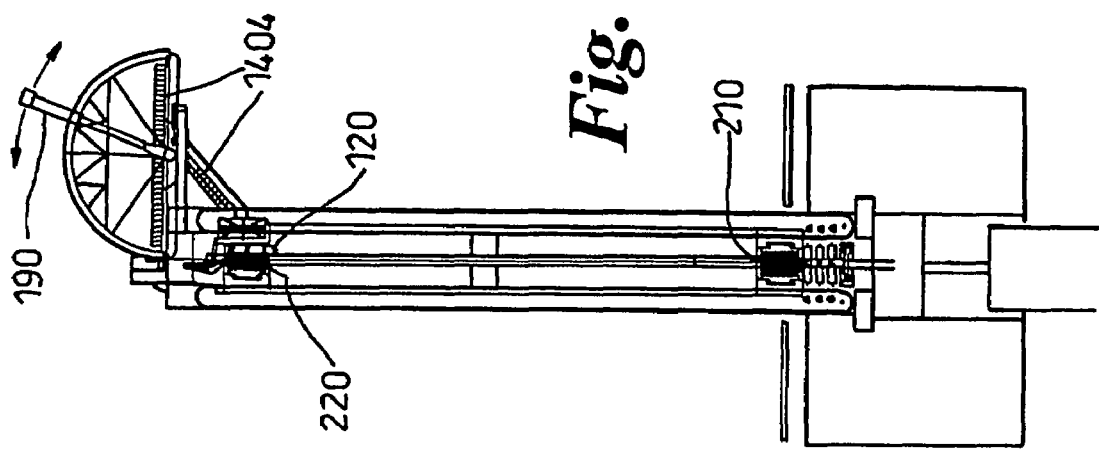
FIGS. 8c and 8d are a side and plan view respectively of the tower clamp drive system and radius controller.
Figure 8C:
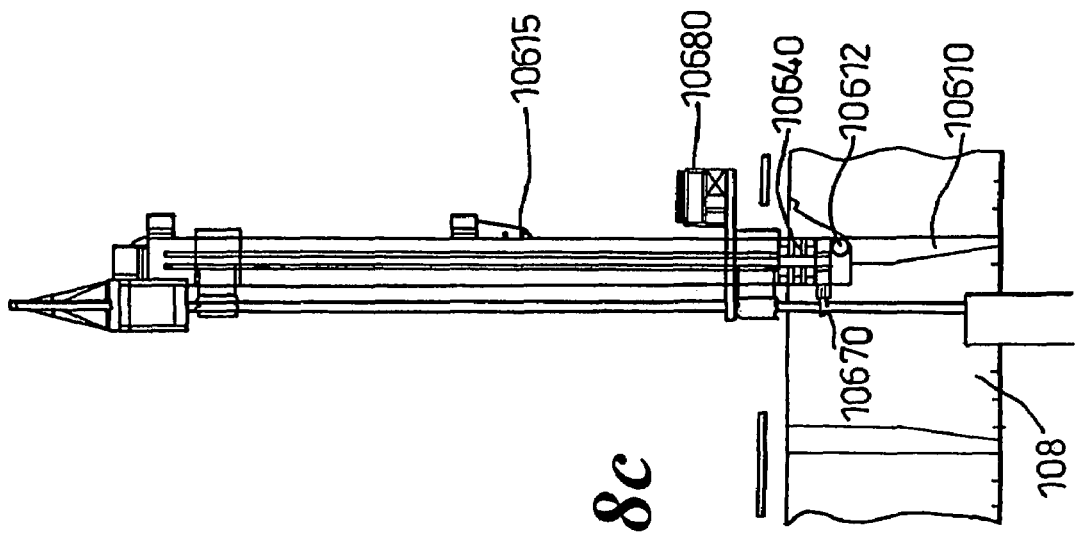

FIGS. 8a and 8b show a detailed side elevation and plan view respectively of the tower radius controller 140, on which is mounted an "A-Frame" 190, capable of driven rotation about the same plane as the radius controller 140 by being mounted upon a pivot 1406.

The A-frame is driven at the pivot point by pinioned drive motors 1408.

To enable wire connections and any flexible end terminations to be passed over the tower radius controller 140, the A-Frame 190 is provided with a small winch 19010 mounted upon its cross member 19020 and connected to the radius controller wheel structure.

In addition to Pipe Line End Terminations (PLETs), rigid products and flexibles may have a lay down head or other type of end termination. For product deployment to the seabed, an A&R rope is connected to the product end termination at deck level. To assist in taking this end termination around the tower radius controller arch 140, the A-frame 190 with underslung winch 19010 at the top of the arch is used. Access walkways 1404 are provided at the top of the radius controller to allow the wire from the A-frame winch to be connected to the product end termination to lift it away from the arch. As the tower clamps 210, 220 deploy the product down and through the moonpool, the radius controller A-frame 190 will guide the end termination around the arch. Once around the arch, the A-frame winch wire is disconnected and the tower clamps 210, 220 are used to lower the product to the seabed using the A&R rope.

PIPE STOCK ELEVATOR

Figure 9A:
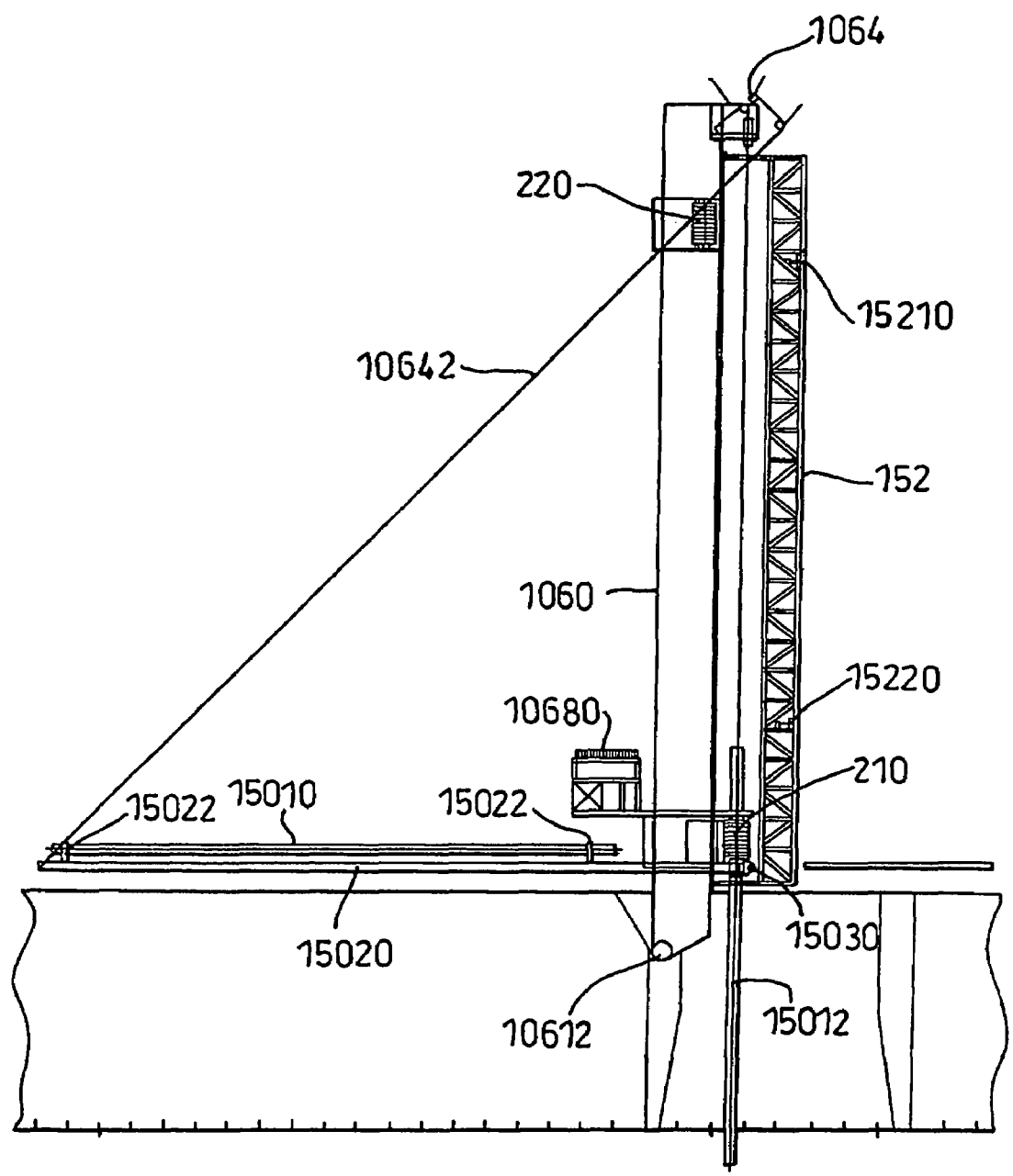
FIGS. 9a and 9b are side and plan views of the tower pipe elevator system in use at different stages of J-Lay operation.
Figure 9B:
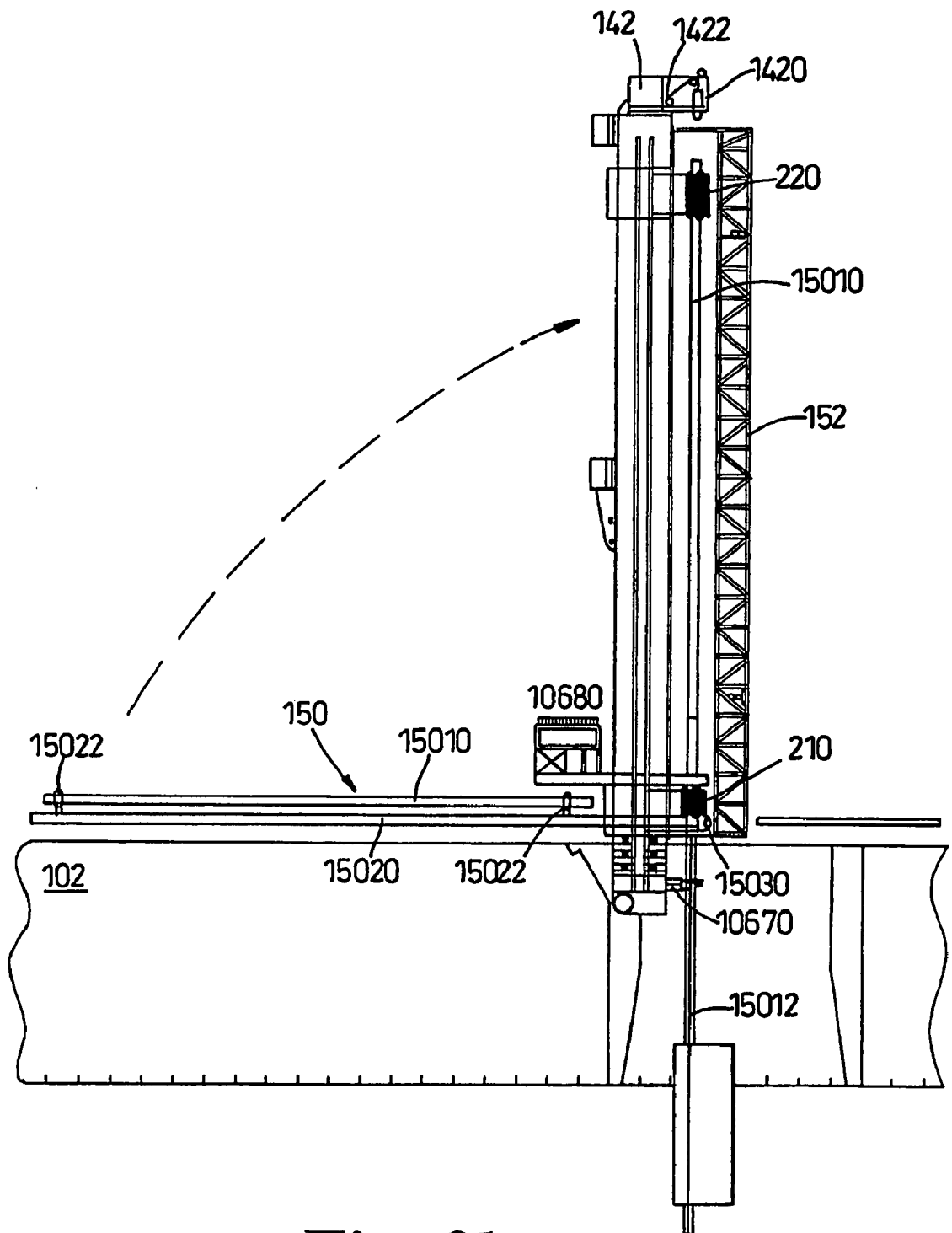

FIGS. 9a and 9b are side views of the tower pipe elevator 150 system in use for J-Lay operation.

Quad lengths or double lengths of pipe 15010 are transported to the top of the tower for welding to the pipe string held within the moonpool by the lower tower clamp 210. To achieve this, a pipe stock elevator system is provided on the starboard side leg of the tower.

FIG. 9a shows the pipe stock elevator system preparing to receive a new section of pipe. Deck mounted walking beams are used to move fabricated quad lengths or double lengths of pipe onto a deck mounted "strong back" 15020. The pipe is secured to the strong back using hydraulic clamps 15022 and the strong back 15020 is connected to a deck mounted pivot point aft 15030 of the starboard side tower leg. A wire 10642, fed from a winch 1064 located on the top starboard side of the tower and mounted adjacent the pipe alignment tool 142, is attached to the aft end of the pipe strongback and is used to pull the pipe and strongback assembly 15020 to a position parallel to the starboard side tower leg. To accommodate tower deployment angles of between 60° and 90° from the horizontal, lateral compliance is provided in the position of the deck mounted pivot point 15030.

Attached to the starboard side tower leg is a hinged frame 152 which houses upper pipe alignment clamp 15210 and lower pipe alignment clamps 15220. As the pipe elevator system 150 is raised to its position parallel to the starboard side tower leg, the pipe mates with and is gripped by the upper and lower pipe alignment clamps 15210, 15220. Once fully gripped by the alignment clamps, the clamps 15022 on the strongback release their grip on the pipe and the strongback is lowered back down to deck level to accept the next length of pipe. The pipe alignment clamp frame 152, complete with pipe 15020, is then rotated into position above the suspended catenary pipe 15012 within the moonpool.

FIG. 9b illustrates the translation of a length of pipe from the deck 102 to its location in the tower 106, clamped by the upper clamp 220, and awaiting insertion of the pipe alignment tool 1420 and subsequent welding.

A garage 142, located at the top of the tower, houses a Serimer internal pipe alignment tool 1420 and its umbilical winch 1422 to supply all the necessary services for internal pipe clamping and Argon gas shielding.

With the pipe swung into location, the internal pipe alignment tool 1420 is lowered down the new pipe 15010 to partially emerge at the lower end of the pipe. The lower alignment clamp 15220 provides centralisation and the upper alignment clamp 15210 provides rotation and movement in the x, y and z directions. These clamps, in conjunction with the internal pipe alignment tool 1420, provide the necessary adjustments to enable the new pipe 15010 to be lined up with the previously welded pipe 15012.

Once the two pipes have been fully lined up with each other, a Serimer automatic welding head is clamped to the outside of the pipes to carry out the circumferential weld to join the two pipes together. The welding is carried out from a workstation 10680 located on top of the lower tower clamp 210. To optimise its position relative to the weld, the workstation is able to move independently from the lower clamp in the vertical direction, forward/aft and in attitude to accommodate the various tower angles, as shown in more detail FIG. 10.

Pre welded joint lengths for J-lay and for RFW rigid reel manufacture are loaded onboard using the vessel cranes. Once onboard, the pipe lengths are moved around the deck using deck craneage and pipe conveyor systems.

PIPE BENDING AND STRAIGHTENING SYSTEM

Rigid Pipe product is deployed from the pipelaying vessel in three ways, namely
- From a Firing Line, 112, or 114, 116 with the product manufactured into a continuous length on the vessel.
- From a Carousel reels 1040, 170, or basket 1042, where the product has been prefabricated at a remote site and then taken onboard and stored on the vessel, or has been fabricated by a firing line.
- From a J-lay system, where up to quad joint lengths of pipe are manufactured onboard and then introduced into the water in up to quad lengths.

Both the Firing Line 112, or 114, 116 and the Carousel 104 methods require the use of a Pipe Bending and Straightening System to allow the product to initially be stored and finally to be deployed with no bends in the pipe. The bending of rigid pipe is undertaken under a controlled tension around set radius structures and is then straightened before being bent into another plane by pipe straighteners. The bends are performed about distinct planes to minimise strain damage to the pipe as a result.

The method of manufacture and method of deployment of the pipe from the vessel determines the pipe routing on the vessel and hence how many bend and straightening operations are required. Tests have shown that the greatest amount of strain damage is caused by the first bend made on a pipe; thereafter subsequent bends are less damaging. The configuration of the apparatus on the vessel has been selected to ensure that the first bend performed on a straight pipe, be it directly manufactured on board by a firing line, or loaded onto the carousel via the stinger, occurs around the radius controller with the largest radius. This is achieved by performing the first bend using the large radius controller 128, at the front of the vessel.

The following Figures illustrate the route of products during the construction and deployment modes, as well as indicating the product handling and bending equipment required to achieve each process.

Figure 10:
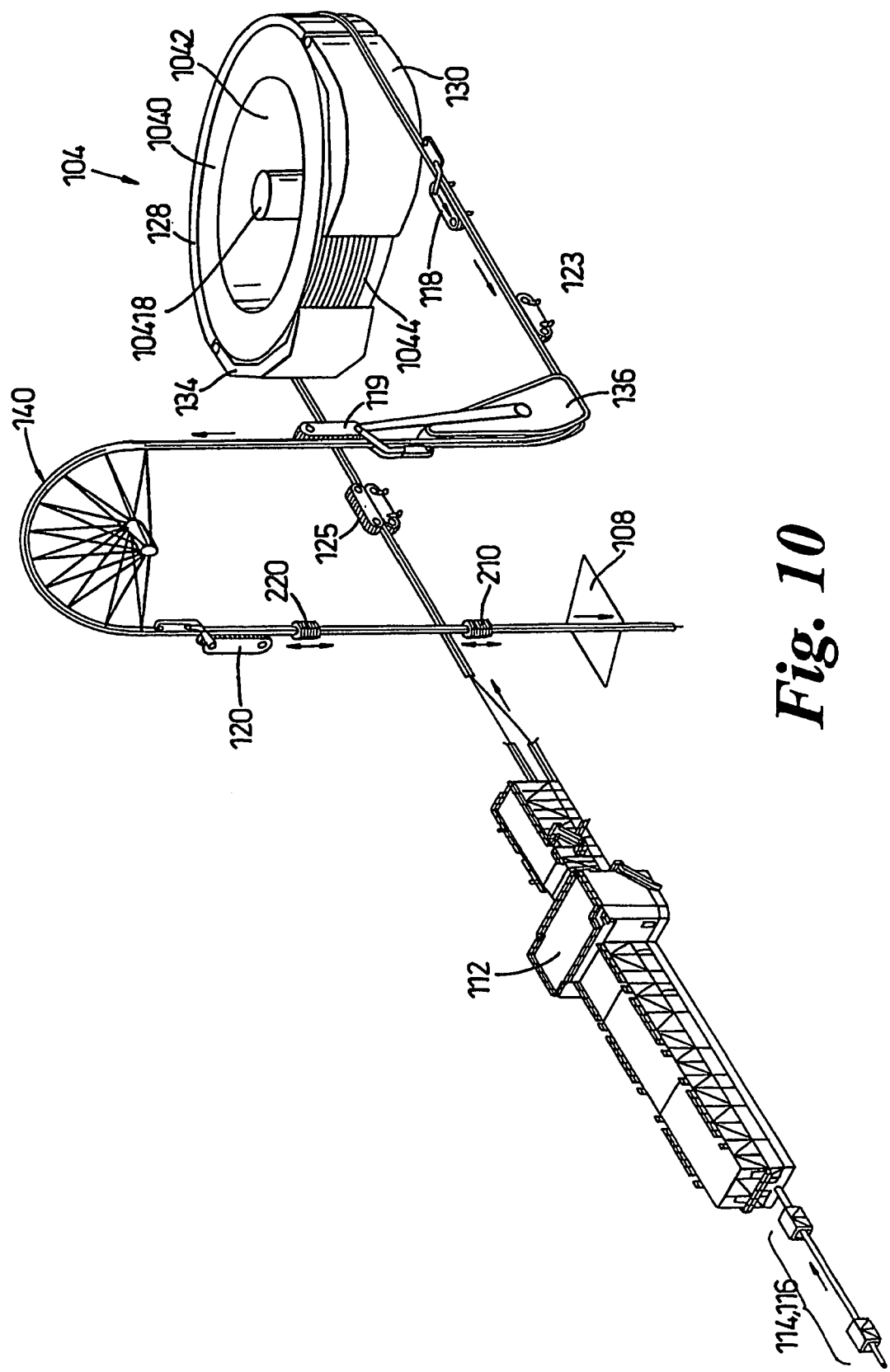
FIG. 10 is an isometric view of the pipe train of said vessel, configured for the direct deployment of on-board welded product via a moonpool, including two alternative welding lines.

FIG. 10—Deployment of onboard welded rigid product, from either the manual firing line 114, 116 or from the RFW machine 112, directly overboard through the deployment tower 106.

Figure 11:
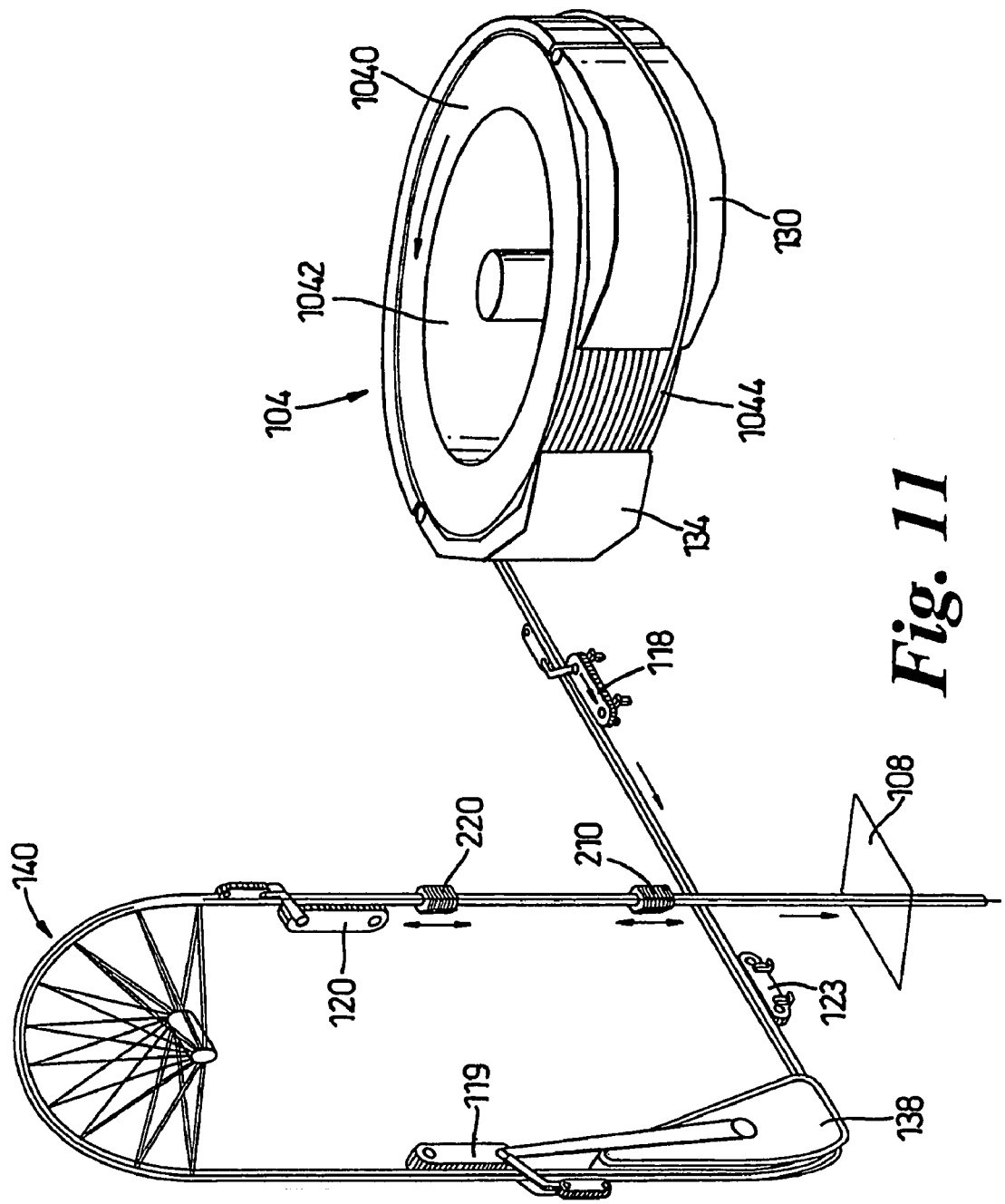
FIG. 11 is an isometric view of the pipe train of said vessel, configured for the deployment of on board welded rigid product from the carousel via the moonpool.

FIG. 11—Deployment of stored rigid product from the Carousel 104, produced from either the manual firing line 114, 116 or from the RFW machine 112, directly overboard through the deployment tower 106.

Figure 12:
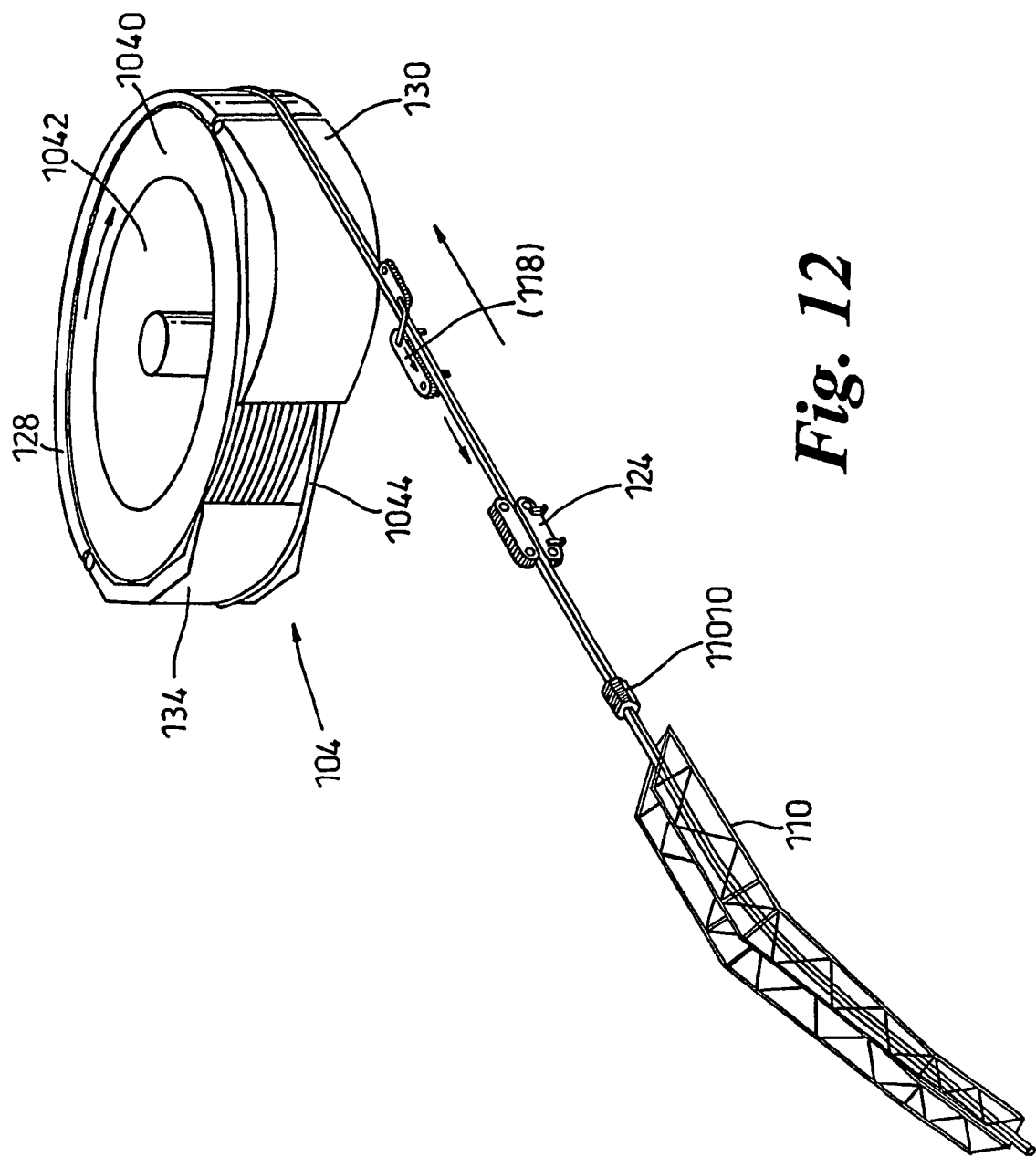
FIG. 12 is an isometric view of the pipe train of said vessel, configured for the carousel reeling or deployment of pre-welded rigid product via a side-mounted stinger.

FIG. 12—Loading or deployment of rigid/flexible product onto the Carousel 104 from the loading/deployment stinger 110.

Figure 13:
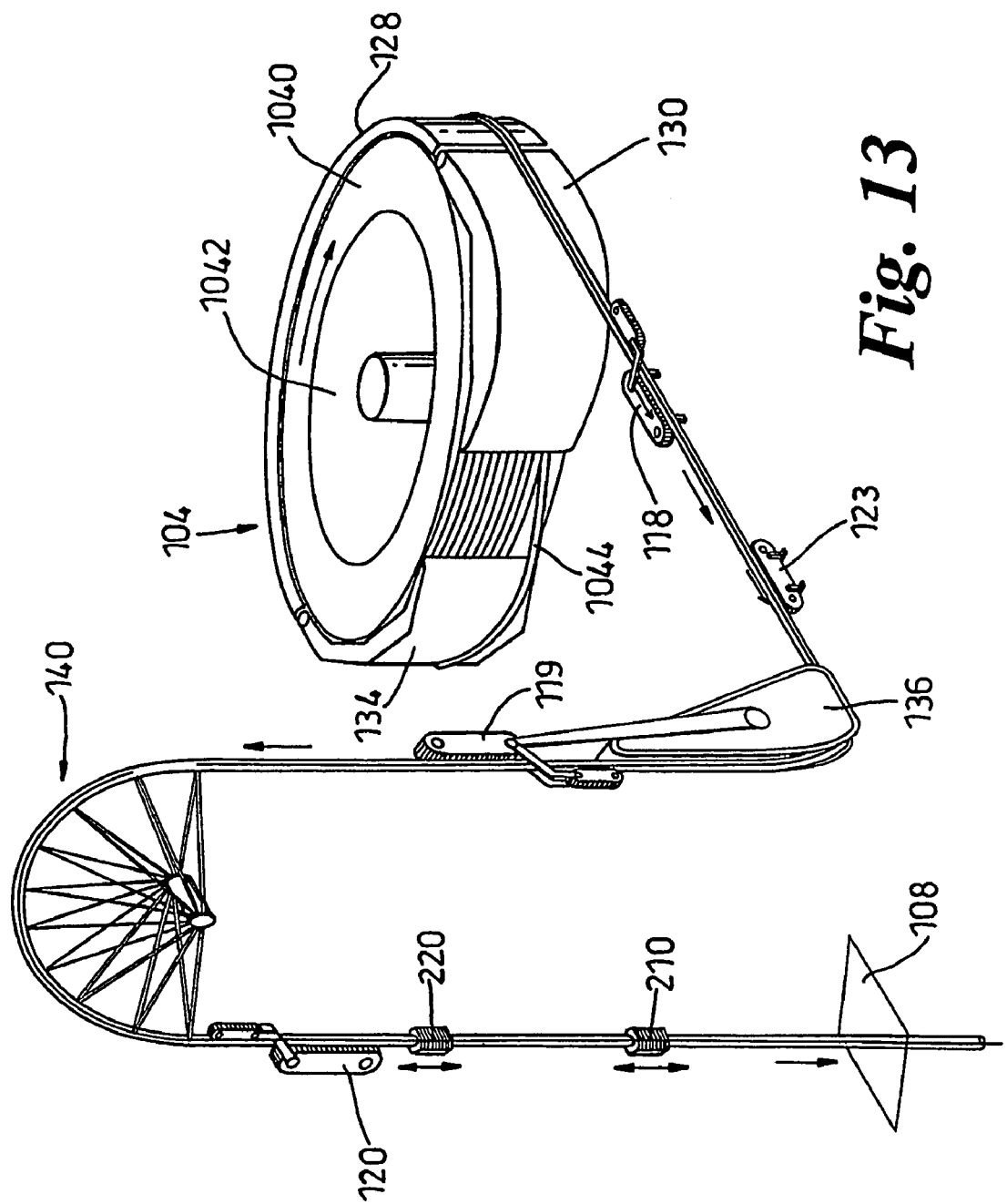
FIG. 13 is an isometric view of the pipe train of said vessel, configured for the deployment of stinger-loaded rigid product from the carousel via the moonpool.

FIG. 13—Deployment of rigid/flexible product, loaded from the loading/deployment stinger, from the Carousel 104 overboard via the deployment tower 106.

Figure 14:
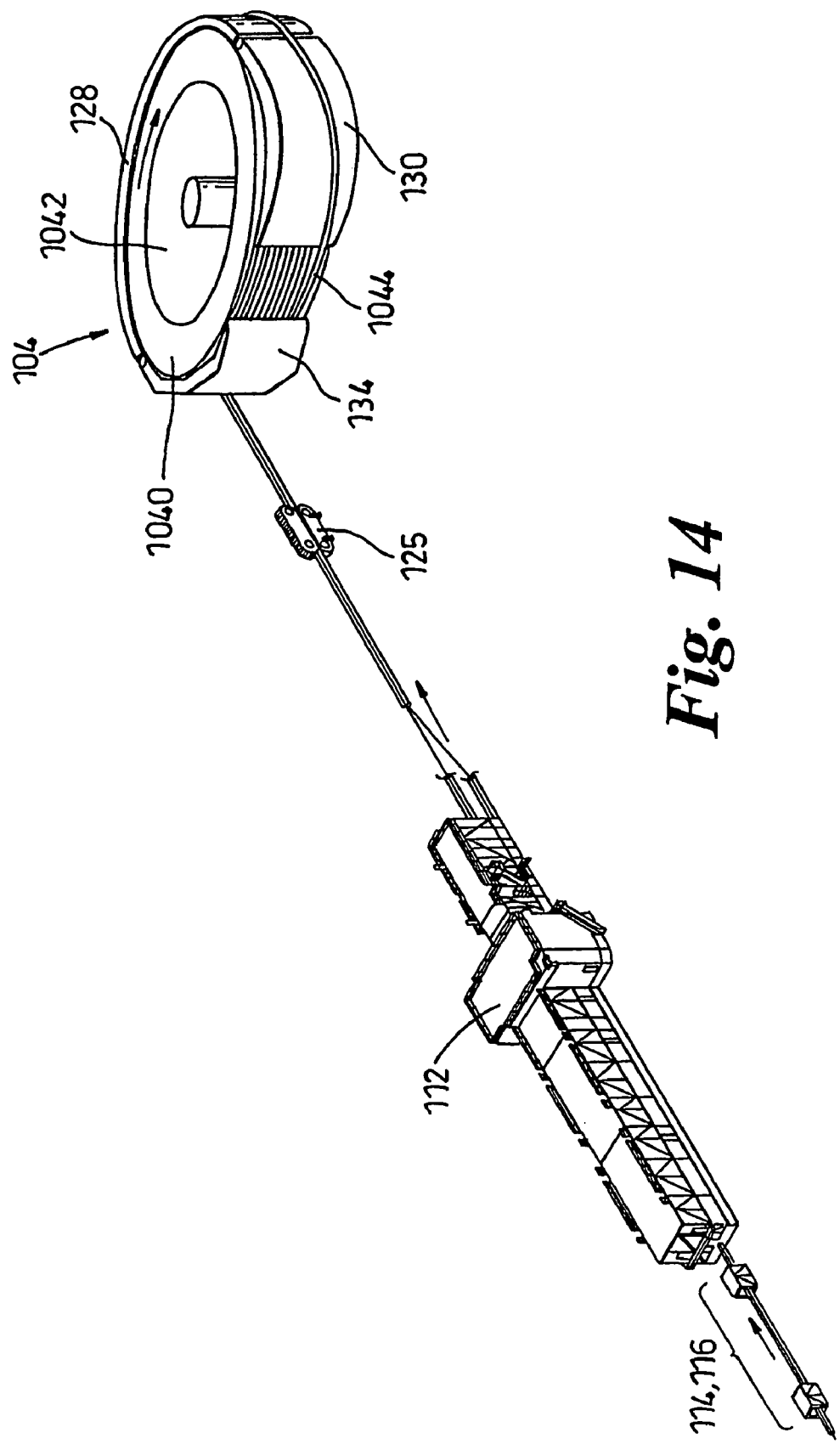
FIG. 14 is an isometric view of the pipe train of said vessel, configured for the carousel reeling of on-board welded products including two alternative welding lines.

FIG. 14—Deployment of onboard welded rigid product, from either the manual firing line 114, 116 or from the RFW machine 112, onto the Carousel 104.

Figure 15:
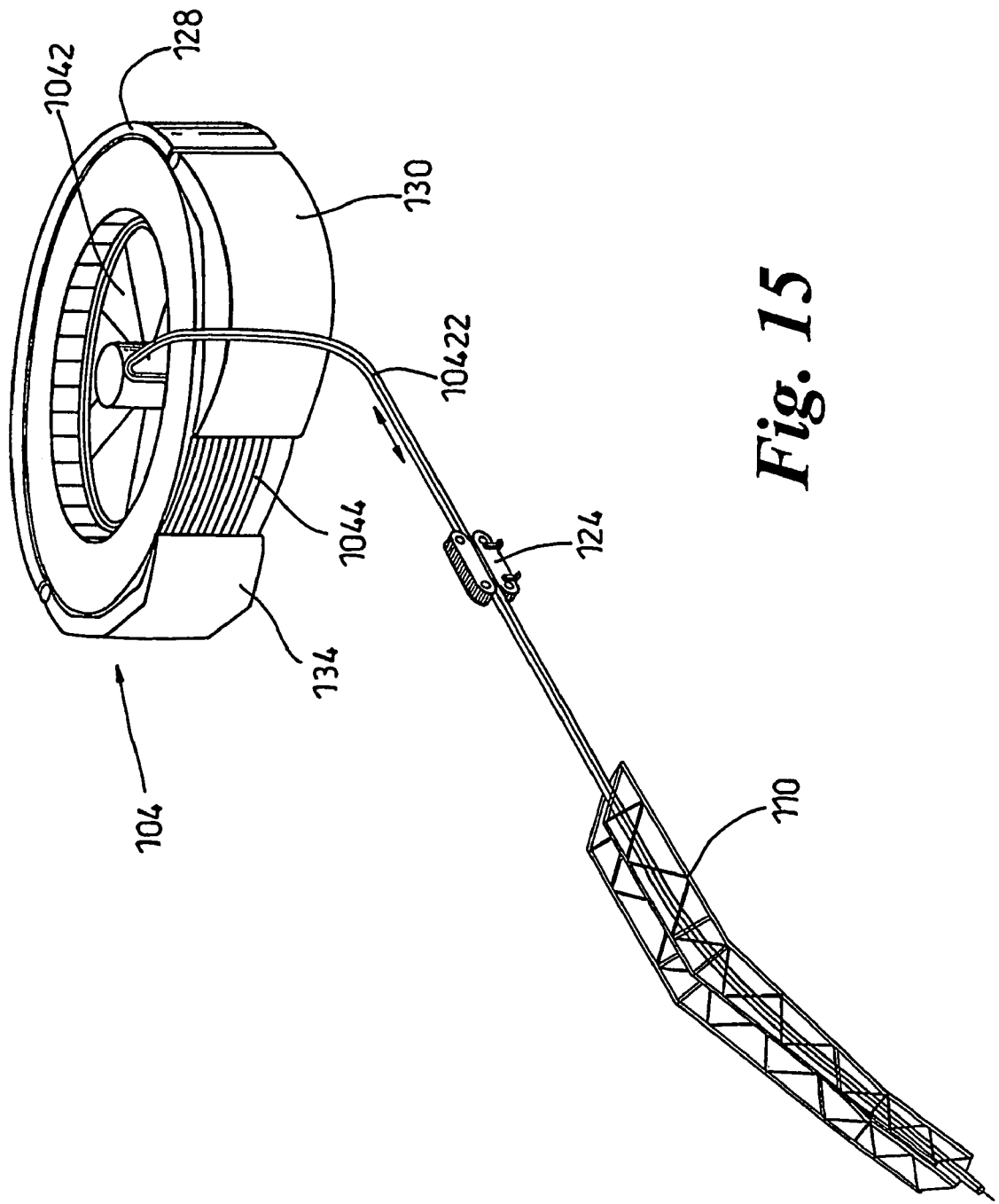
FIG. 15 is an isometric view of the pipe train of said vessel, configured for the loading/deployment of flexible product to/from a central carousel basket via a side-mounted stinger.

FIG. 15—Loading of flexible/umbilical product into the Carousel Basket 1042 from the loading/deployment stinger 110.

Figure 16:
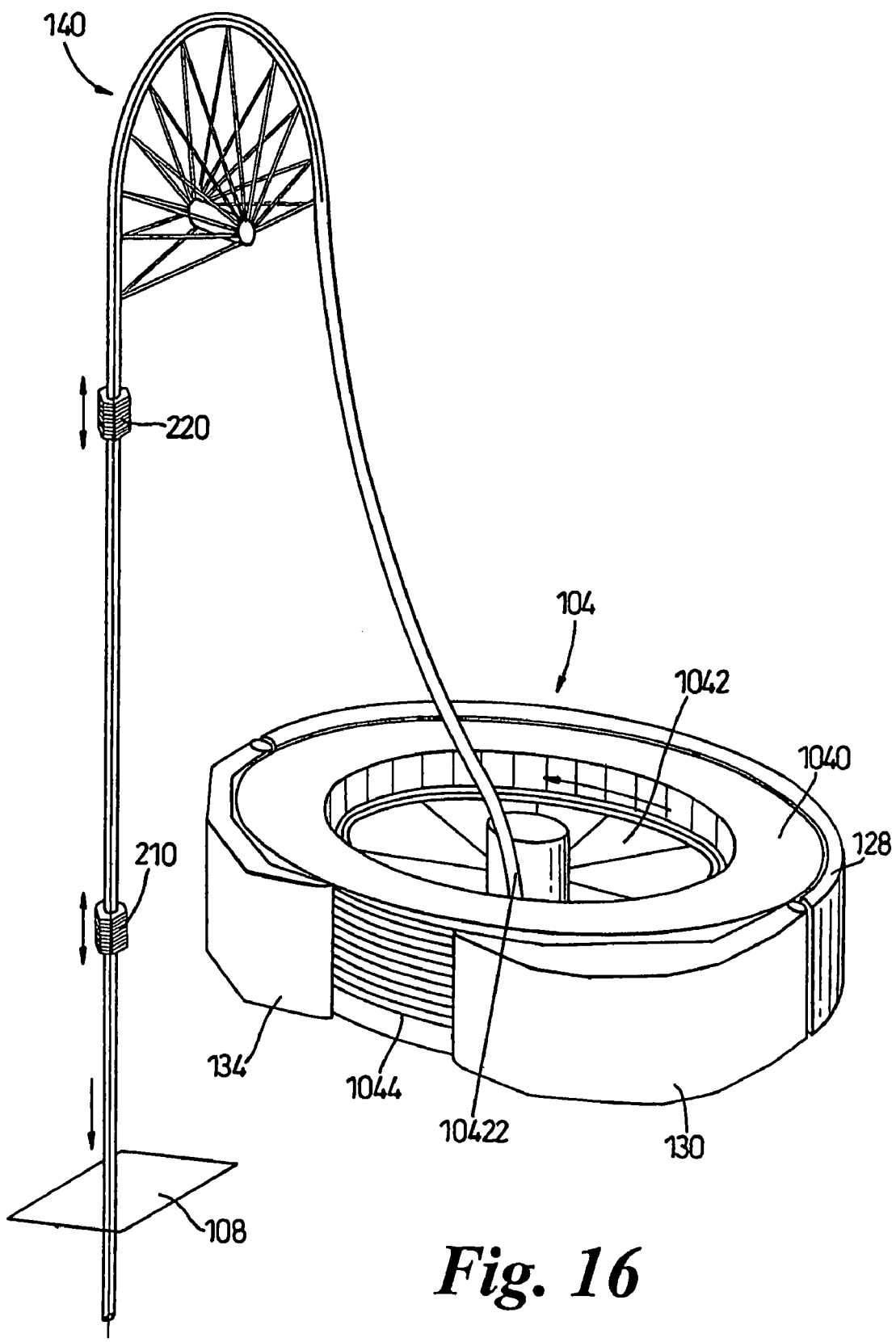
FIG. 16 is an isometric view of the pipe train of said vessel, configured for the deployment of flexible product from a central carousel basket via the moonpool.

FIG. 16—Deployment of flexible/umbilical product from the Carousel Basket 1042 to the deployment tower 106.

When manufacturing the pipe using the Firing Line technique the pipe is manufactured on the port side of the vessel by continuously adding pipe lengths onto one another. As each length is added the pipe is pulled around a series of radius controller 128 and pipe straightener 118, 119 combinations before being deployed to seabed using the Deployment Tower Clamping System 210, 220 et al. The completed product can also be spooled directly onto the Carousel 104 for storage and later deployment. A predetermined back tension is maintained on the pipe at all times by using a pipe tensioner 125 located before the first bend radius controller 128, as illustrated in FIG. 10.

During direct lay operations as illustrated in FIG. 10, the route taken by the product passes through the following apparatus:

- A 22 m radius wall 128. This wall directs the pipe from the port side of the vessel to the starboard side and the pipe is supported in a conveyor arrangement that will reduce the risk of buckling of the pipe during the bending operation. The elevation of the conveyor arrangement is fixed for all operations.
- A first pipe straightener 118. This straightener is located immediately after the pipe exits from the 22 m radius wall and will remove the bend introduced in the pipe from passing the wall. The straightener is mounted on a pivotable table (not shown) that alters its angle to match the angle of attack of the pipe being deployed, although for direct lay operations the angle will be substantially horizontal.
- A 24 m radius Vertical Radius Bend Controller 136, as shown in a detailed side view in FIG. 17. This item of equipment is used to direct the pipe to the Deployment Arch 140 located on the Deployment Tower 106. This item will also utilise conveyor segments 13625 to support the pipe as it passes to reduce the opportunity for buckling. The Vertical Bend Radius Controller 136 is mounted on a platform 13630 capable of being positioned laterally along the platform to accommodate the tower position when the tower is angled between the 60 and 90 degree positions. The Vertical Radius Bend Controller is a passive unit and no back tension control is applied at the unit.
- A second pipe straightener 119. This pipe straightener is used to remove the bend introduced in the Vertical Radius Bend Controller 136 and the straightener is pivotably mounted on to the top of the Vertical Radius Bend Controller. The Straightener angle is adjusted to match the pipe angle throughout the associated Tower angle range. The skilled person will appreciate that instead of using the straightener alone to direct the straightened pipe at the appropriate angle, either or both of the Vertical Radius Bend Controller and straightener may be pivotable to perform the same function.
- A Tower Radius Control Arch 140. This arch provides a 12 m radiused bend controller that accepts the pipe from the Vertical Radius Bend Controller 136 and directs the pipe to the Deployment Clamps 210, 220 located in the tower 106, again conveyor sections are used on the arch. As the Arch is mounted on the Tower any change in angle of the Tower will change the angle at which the Arch operates.
- A third pipe straightener 120. This pipe straightener is used to remove the bend introduced in the Tower Radius Control Arch 140 and the straightener is mounted upon the arch, in line with the deployment line extending through the Pipe Deployment Clamps 210,220. The third straightener 120 can be moved out the way, so as not to interfere with J-lay of rigid sections of pipe.

When using the Carousel 104 in the system, pipe must first be stored on the Carousel. Pipe is either loaded from the stinger 110 (FIG. 12) or from the firing line 112 or 114, 116 on the port side (both Serimer 114, 116 and RFW 112 produced welds) (FIG. 14).

FIG. 12 illustrates pipe being produced at a location remote from the ship (for example, either a shore base facility or from_"wet storage"_on the seabed), whereby the lengths are recovered up the loading stinger 110 and then wrapped onto the Carousel reel 1040 by passing around an off-spooling arm 134. A tensioner 124 mounted on the elevating platform located adjacent to the Carousel 104 is used to provide the holdback tension required during spooling operations. Tie-in welds 11010 (joining the two sections together) are completed on an elevating platform before continuing with the next pipe section recovery operation. When the end of the product is brought onboard, a hold back winch is connected to the product and tensioned prior to opening the tensioner for final storage on the carousel. The illustrated straightener 118 is not required for loading operations, but is used to straighten the pipe when deploying from the reel.

FIG. 14 illustrates long pipe lengths being produced onboard by a firing line 112 or 114, 116 and their subsequent loading onto the Carousel reel 1040 by passing around the outer wall 128 to the starboard side and spooling onto the Carousel reel 1040, in a wrap direction opposite to that for stinger-loaded product.

When deploying pipe from the Carousel 104, as illustrated in FIG. 11 the pipe is routed off the Carousel, and:

- Around the Offloading Arm 130. The Offloading arm 130 is a pivoting large radius arm which is used to direct the pipe from the Carousel reel 1040 to a common deployment line on either side of the vessel. The arm pivots relative to the Carousel to take account of the amount of pipe stored on the Carousel.
- Through a first pipe straightener 118. This straightener is located immediately after the pipe exits from the Offloading Wall 128 and will remove the bend introduced in the pipe from being stored on the Carousel and in passing the Offloading Arm 130. The straightener is mounted on a pivotable table (not shown) that alters its angle to match the angle of attack of the pipe being deployed, as it unspools. The long distance between the point of the product being unspooled and the straightener (the path between the tip of the arm, and the whole of the offloading wall 128, marked as "B", "C" and "D" on FIG. 4*a*) negates the requirement for some arrangement for matching the height of the pipe train to the product as it is being unspooled. The pivoting first pipe straightener and long path length achieve the same function, in a more simple manner.
- Through the Vertical Radius Bend Controller 138. The Vertical Bend Radius Controller 136 is mounted on a platform 13630 capable of being positioned laterally along the platform to accommodate the tower position when the tower is angled between the 60 and 90 degree positions. The Vertical Radius Bend Controller is a passive unit and no back tension control is applied at the unit. All back tension is controlled at the Carousel.
- A second pipe straightener 119. This pipe straightener is used to remove the bend introduced in the Vertical Radius Bend Controller 138 and the straightener is mounted on to the top of the Vertical Radius Bend Controller. The Straightener angle can be adjusted to match the pipe angle throughout the associated Tower angle range. The skilled person will appreciate that instead of using the straightener alone to direct the straightened pipe at the appropriate angle, either or both of the Vertical Radius Bend Controller and straightener may be pivotable to perform the same function.

A Tower Radius Control Arch 140. This arch provides a 12 m radiused bend controller that accepts the pipe from the Vertical Radius Bend Controller and directs the pipe to the Deployment Clamps 210, 220 located in the tower, again conveyor sections are used on the arch. As the Arch is mounted on the Tower any change in angle of the Tower will change the angle at which the Arch operates.

A third pipe straightener 120. This pipe straightener is used to remove the bend introduced in the Tower Radius Control Arch 140 and the straightener is mounted upon the arch, in line with the deployment line extending through the Pipe Deployment Clamps 210,220. The third straightener 120 can be moved out the way, so as not to interfere with J-lay of rigid sections of pipe.

Flexible product is installed onto the Carousel in the same manner or can be delivered to the vessel on reels 170. Flexible product is deployed from the vessel using the Flexible Product Platform.

FIG. 15 illustrates loading of Flexibles and Umbilicals into the Carousel basket 1042 where the Carousel Basket Drive Motors 10412 are driven to provide rotational power to the basket.

Flexibles and Umbilicals are loaded into the carousel basket 1042 via the loading stinger 110 from either a shore base facility or from a supply boat at sea. In each case the product is routed up the stinger 110, through the tensioner 124, over the manipulator arm 180 and into the basket 1042. As the tensioner hauls the product up the stinger, the carousel is rotated and the manipulator arm driven to lay the product into the basket in as space-effective a manner as possible.

FIG. 17 shows the Vertical Radius Bend Controller 136, 138 in further detail. The associated straightener 119 is arranged on a pivot 13610 and driven by a hydraulic ram 13620 to facilitate the different angles that the tower 106 can be set at. Such an arrangement negates having to alter the pitch of the vertical radius controller 136, 138 with respect to the tilt of the tower. The pitch of the straightener 119 is adjusted to match the angle of the product as it passes down the tower. Furthermore, the longitudinal position of the vertical radius controller is varied to match the effective translation of the point of product on which the straightener acts, with respect to the deck of the vessel.

The third deployment system for rigid pipe product, where sections are welded together for J-lay, has been previously described under the section entitled "Pipe Stock Elevator".

ABANDONMENT AND RECOVERY

Figure 18A:
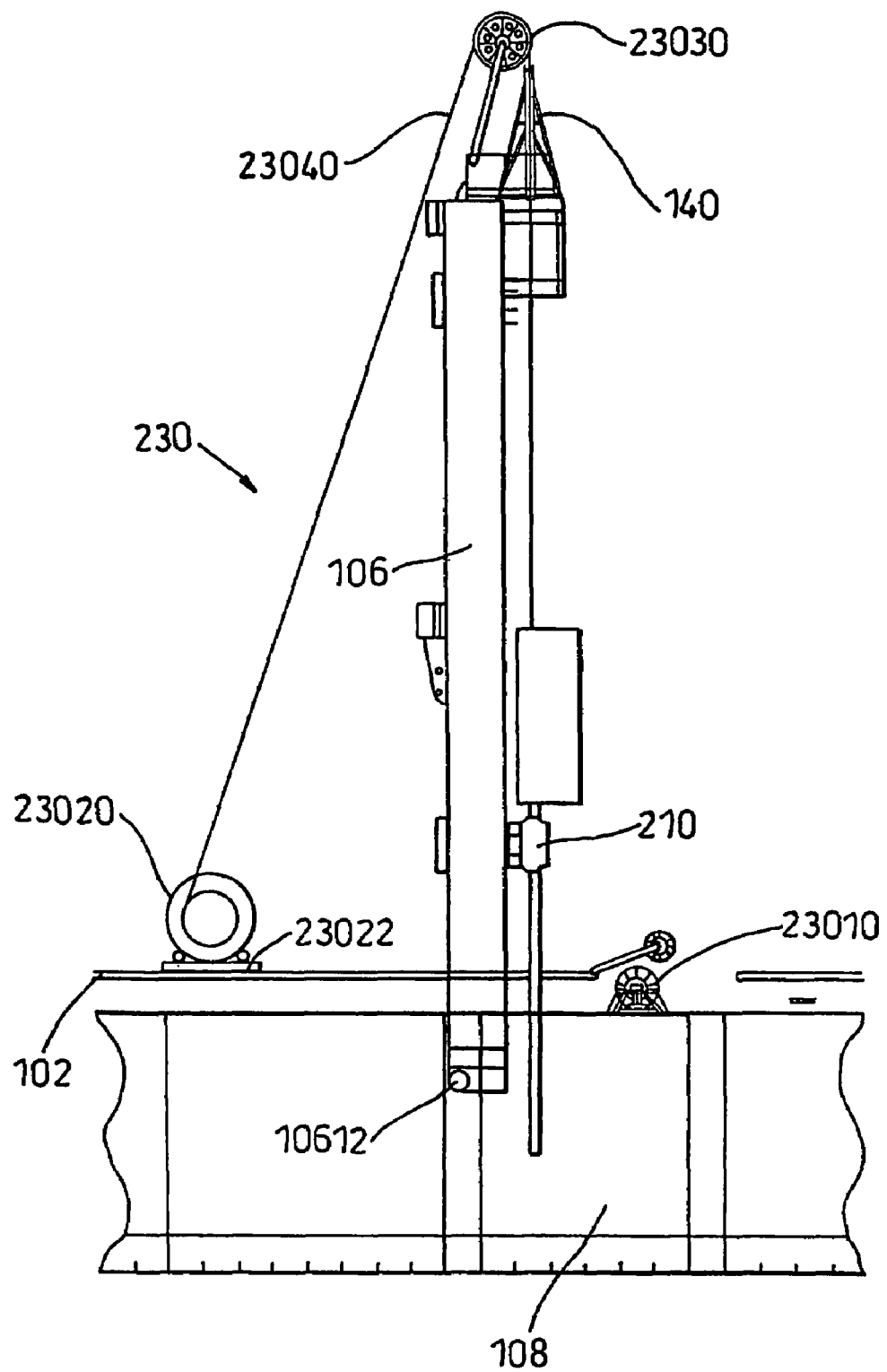
FIGS. 18a and 18b are a side and plan view respectively of an Abandonment and Recovery (A&R) system of said vessel, configured for deep A&R.
Figure 18B:
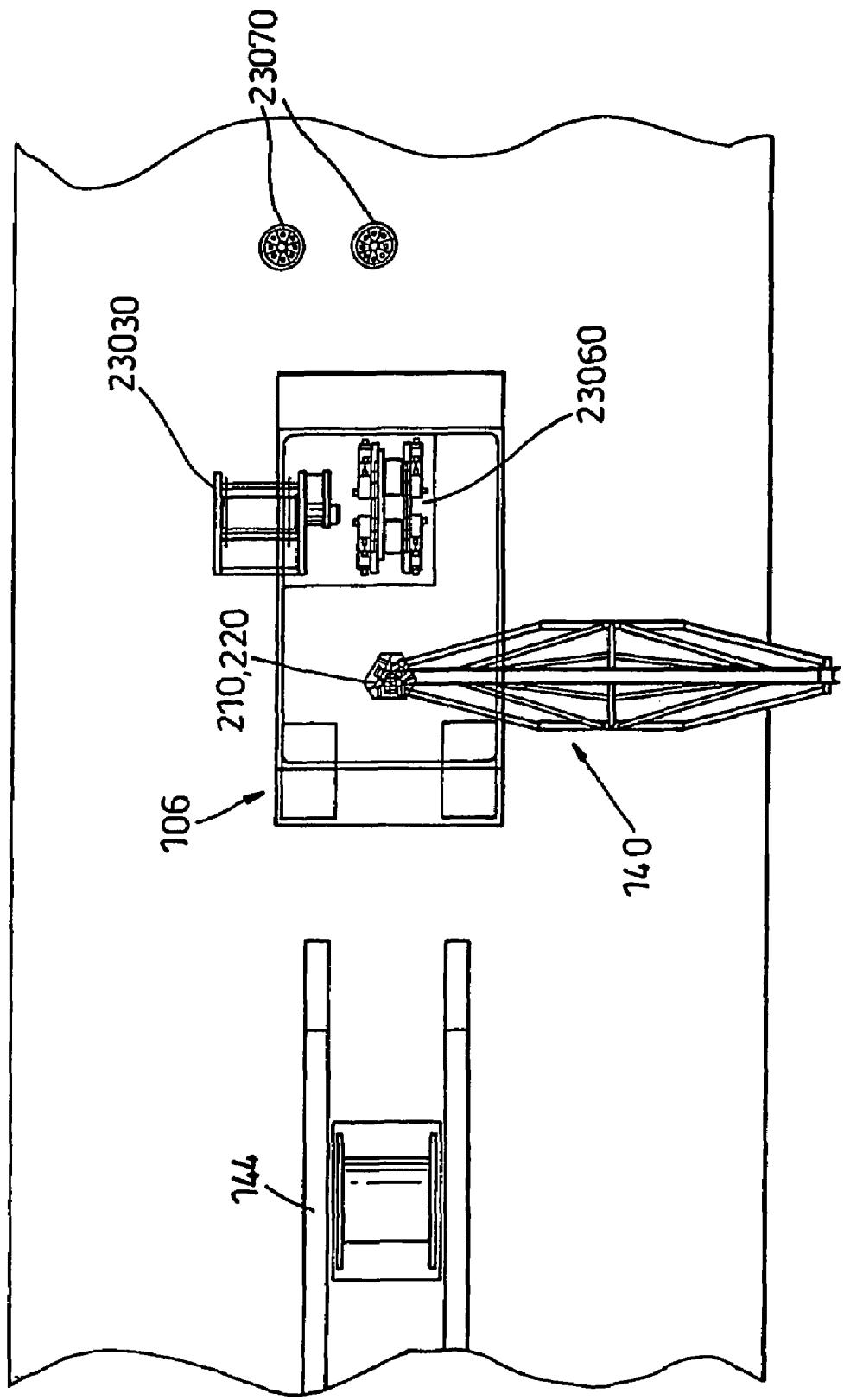
Figure 18C:
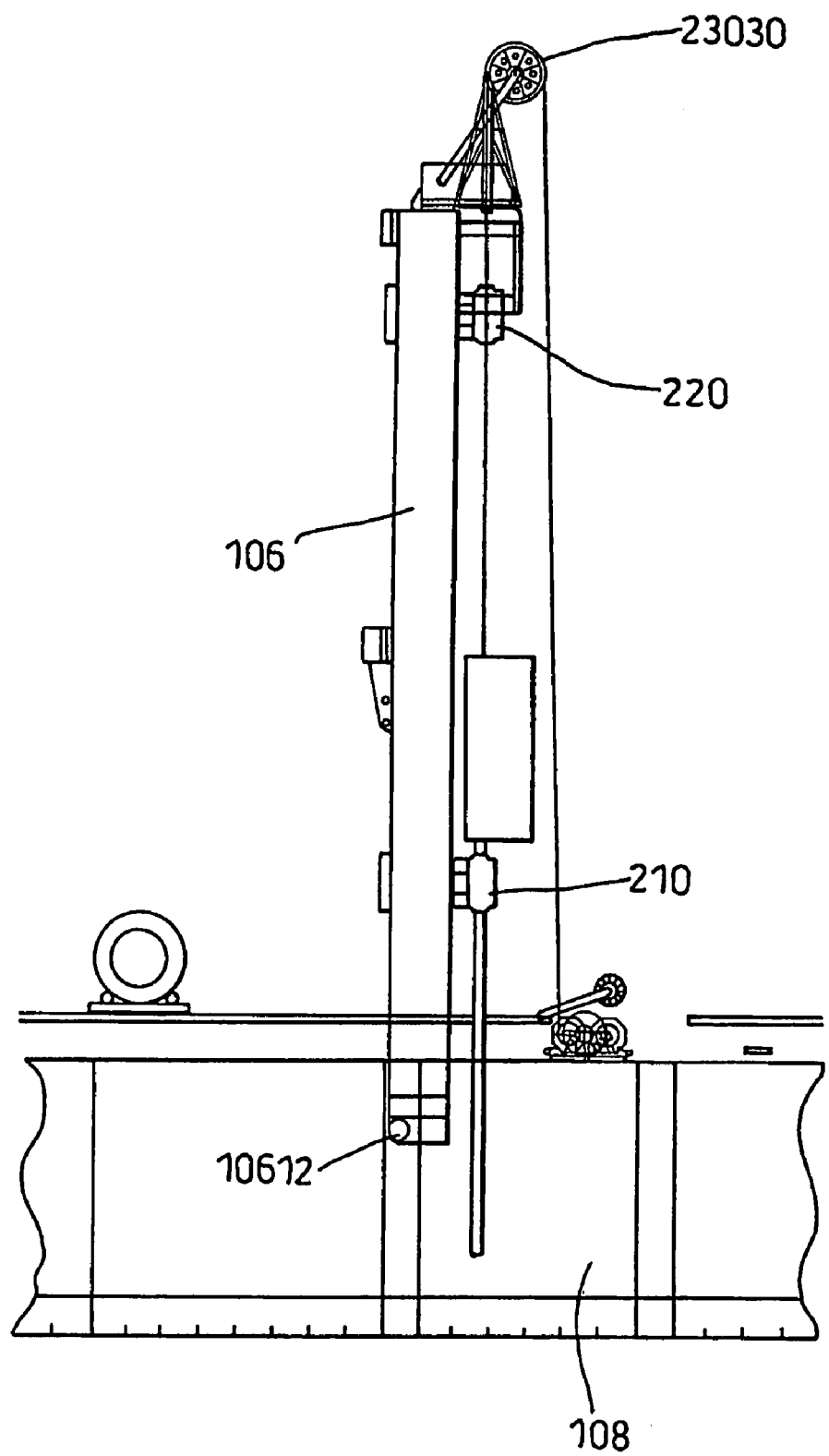
FIG. 18c is a side view of the Abandonment and Recovery (A&R) system configured for shallow A&R.

FIGS. 18a, 18b and 18c show the Abandonment and Recovery (A&R) system 230 in side and plan views, configured for deep and shallow A&R activities.

The A&R equipment comprises a fully heave compensated deep water lowering system, rated to 1000 tonnes working load, and a product initiation winch 23010, rated to 300 tonnes working load.

The deep A&R system can also be used to lower a specified 600 tonnes deck package to the seabed, in a fully heave compensated manner, whilst the initiation winch 23010 can also be used as a shallow A&R winch.

The deep A&R system (FIG. 18a) comprises an individual storage reel 23020 and a dolly base 23022 located on the aft side of the moonpool for use in conjunction with the tower's two moving clamps. The storage reel is normally stored on the dolly base and holds 3000 meters of 160 mm OD, spiral wound, 2,500 tonnes minimum breaking load wire.

To use the deep A&R system for deploying product to the seabed, the product is held within the tower using the lower moving clamp 210. A messenger wire from a deck mounted utility tugger is routed from the moonpool area, up through the upper moving clamp 220, over a sheave 23030 at the top of the tower and down to the deck adjacent to the A&R dolly base. The messenger wire is then connected to the open spelter socket at the end of the A&R wire 23040 and the utility winch is used to pull the A&R wire back through the system to allow the connection of the A&R wire to the product. With the upper clamp 220 gripping the A&R wire 23040, the clamp is then raised to take the full catenary load to unload the lower clamp 210. Under a no load condition, the lower clamp releases its grip on the product to allow the upper clamp 220 to start lowering the product through the moonpool. The upper and lower moving clamps will then work together, alternately gripping the A&R wire 23040, to lower the product to the seabed.

Structures of up to 600 tonnes can also be deployed to the seabed using the deep A&R system in conjunction with a deck mounted over boarding crane 160. Prior to overboarding the structure, a messenger wire is routed from the aft deck, over the side of the vessel and up through the moonpool for connection to the open spelter socket on the end of the deep A&R wire 23040. The messenger wire winch then pulls the deep A&R wire down through the moonpool and up onto the aft deck for connection to the structure. As the deck crane 160 overboards the structure and lowers it into the water, the A&R wire is also paid out using the tower clamps 210, 220. At an appropriate depth below the vessel, the load is transferred from the crane wire to the A&R wire and the crane wire disconnected from the structure using either an acoustic shackle or an ROV. The heave compensated deep A&R system is then used to lower the structure to the sea bed where the wire is disconnected by either a second acoustic shackle or an ROV.

FIG. 18c illustrates the product initiation winch and shallow A&R system, comprising skid mounted storage drum 23050, traction winch 23060 and A-frame mounted sheave located on an extension to the existing main deck on the forward side of the moonpool. Two deck mounted horizontal deflection sheaves 23070, located forward of the skid and underneath the carousel, route the wire from the storage drum onto the winch.

To use the initiation winch in product pull through mode, a messenger wire is routed around the system for connection to the wire on the winch. The messenger wire pulls the initiation wire from the winch, around the extended A-frame mounted sheave, through the lower and upper clamp 210, 220, around the tower radius controller arch 140 and down around the deck mounted vertical radius controller 136, 138 for connection to the product on the carousel 104. The messenger wire is then disconnected, the winch wire connected to the product and the traction winch 23060 is used to pull the product through the system. Once through the lower clamp 210, the lower clamp grips the product and the winch wire is disconnected. The upper and lower tower clamps 210, 220 then work together, in a hand to hand mode, to lower the product to the sea bed.

The initiation winch 23060 can also be used in the shallow A&R mode. In this mode, the winch wire is routed from the traction winch, around the retracted skid mounted A-frame sheave, up and over the sheave mounted at the top of the tower, through the upper clamp 220 and down for connection to the product held by the lower clamp 210. With the catenary load taken by the winch, the lower clamp is opened under a no load condition and the winch is used to lower the product to the seabed.

As an alternative to using moving clamps to grip a rope for the deep A&R system, a conventional 1000 tonnes A&R winch could be used.

CONTROL SYSTEM

It is essential that all products are loaded and deployed in a controlled fashion and the lay operation is integrated with the ship positioning and movements.

There is provided a flexible and expandable, Integrated Control System (ICS) for the lay equipment. The system is used to control all of the pipelay and RFW processes. The ICS solution offers a robust and reliable architecture, extensive inherent functionality and advanced programming languages.

The control system is developed around the following architecture:
  Fieldbus interface, (for example Profibus™).
  Redundant Controllers.
  Redundant Control Network.
  Dedicated high performance motion controllers for the demanding motion control requirements.
  Global, scaleable open database.

The system is capable of simple expansion, simple to use integration tools and advanced programming languages. The Profibus™ interface is used to communicate with remote I/O, motion controllers and other third party sensors, such as encoders and MCC devices. Redundant controllers and a redundant network provide an increased level of reliability, whereby a dual failure of power supply, network or controller is required to render the system inoperable.

The dynamic performance requirements of many of the machine movements require fast, accurate and complex control algorithms. This is achieved by using dedicated motion controllers and servo amplifiers. This functionality may be provided by using UnidriveSP™ or Unidrive™ devices for the electrical drives and Bosch Rexroth HNC (TM) devices for the hydraulic servo valves.

The operator interface is provided by dual headed operator workstations whereby the pipelay and RFW processes are controlled and monitored. An advanced alarm management system is used to alert the operator to abnormal situations and provide advice on fault diagnosis. A hierarchical display structure allows easy navigation around the various displays that are grouped by function eg. RFW, Pipe Loading, Post Weld Operations, Pipelay etc.

Engineering and maintenance displays are also provided within the system accessed via password protected environments. Workstation locations are as a minimum located at the RFW, Deployment Tower and on the Bridge.

Quality management information is recorded and tracked by the ICS. An external individual data logger is used to gather data during the welding operations and transferred to the ICS for analysis and storage. Thus, the quality information for each weld and pipelay operation is stored centrally within the ICS. Backup and long term storage, archive and retrieval facilities are also provided.

An advanced simulation package is provided. This thoroughly tests all I/O, graphical interfaces, alarming and sequences off-line away from the target hardware. The simulation can also be used in conjunction with a duplicated operator interface, to provide extensive operator training.

The existing vessels control system does not require amendment, however a link to the vessels Integrated Computer Management System is provided. This link will be established under a 'request permission' mode that can be removed at any time by a bridge command. This means that operations on the product lay control system can be performed remotely from the vessel system.

Safety interlocks are provided for safety critical functions and implemented using either hardwired interlocks or a dedicated safety critical PLC.

FURTHER EMBODIMENTS

Figure 19A:
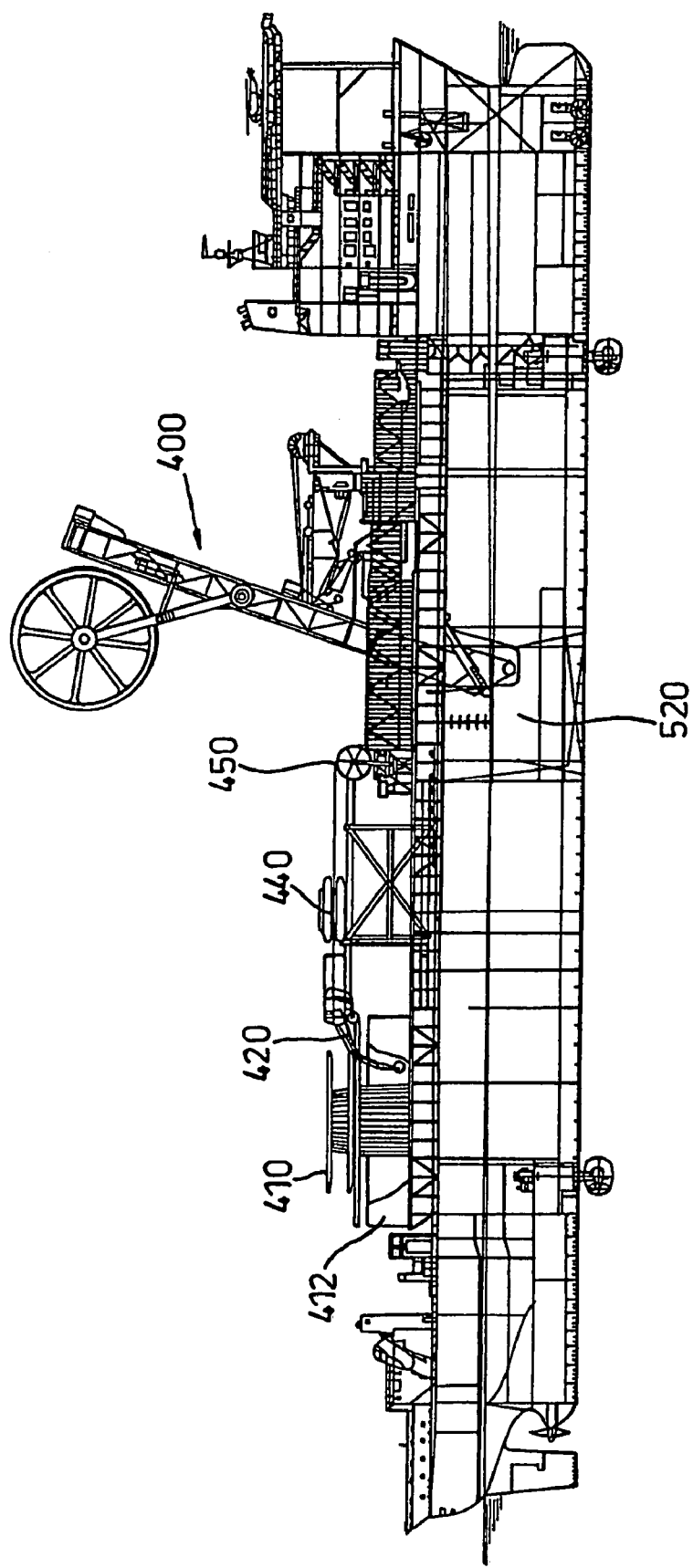
FIGS. 19a and 19b are a side (part cut-away) and plan view respectively of second novel pipelaying vessel, having a stern-located multiple spool carousel, a mid-line pipe train and a forward-leaning tower.
Figure 19B:
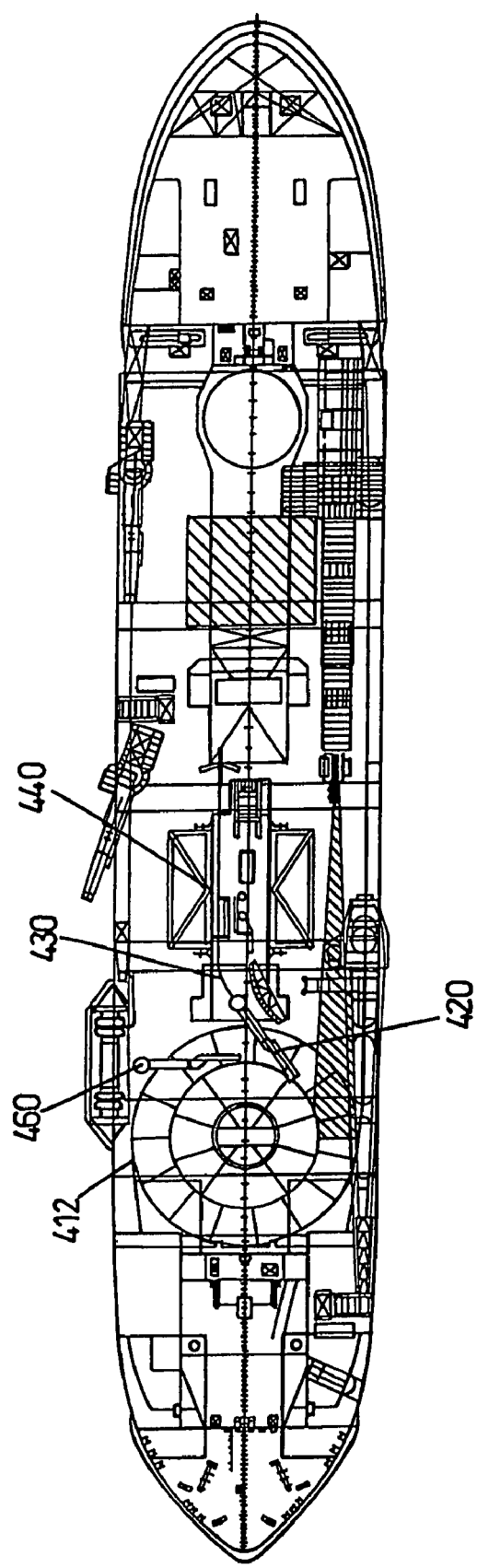

FIGS. 19a and 19b show a side elevation and plan view respectively of alternative configurations of key components of the vessel.

A forward-leaning tower 400 is used for product deployment. Product is handled mid-line to the ship.

As an alternative to a nested carousel, an independently driven twin spool carousel is adopted. An upper spool 410 is used for rigid pipelay, and an independently driven lower spool 412 for flexible product. The skilled person will appreciate that the relative sizes of the two spools may be different, according to the activities the vessel is being designed for. Furthermore, three spools may be employed, the top two for example being driven together, independently from the lower spool. The top spool could be used for shallow-water A&R operations, for example.

A product deployment manipulator arm 420 is used to extract product from the lower spool 412. A small horizontal radius controller 430 is used to ensure the product is fed squarely into a tensioner 440, which is used to grip the product, and lower it into the sea at a controlled rate. A radius control wheel 450 is used to translate the product from a substantially horizontal plane to a vertical plane for feeding into the sea via the moonpool.

The forward-leaning tower 400 is shown in a retracted position during deployment from the lower spool.

FIG. 19b also shows a side-mounted product loading manipulator arm 460, which is used for loading the lower spool with product.

Figure 20A:
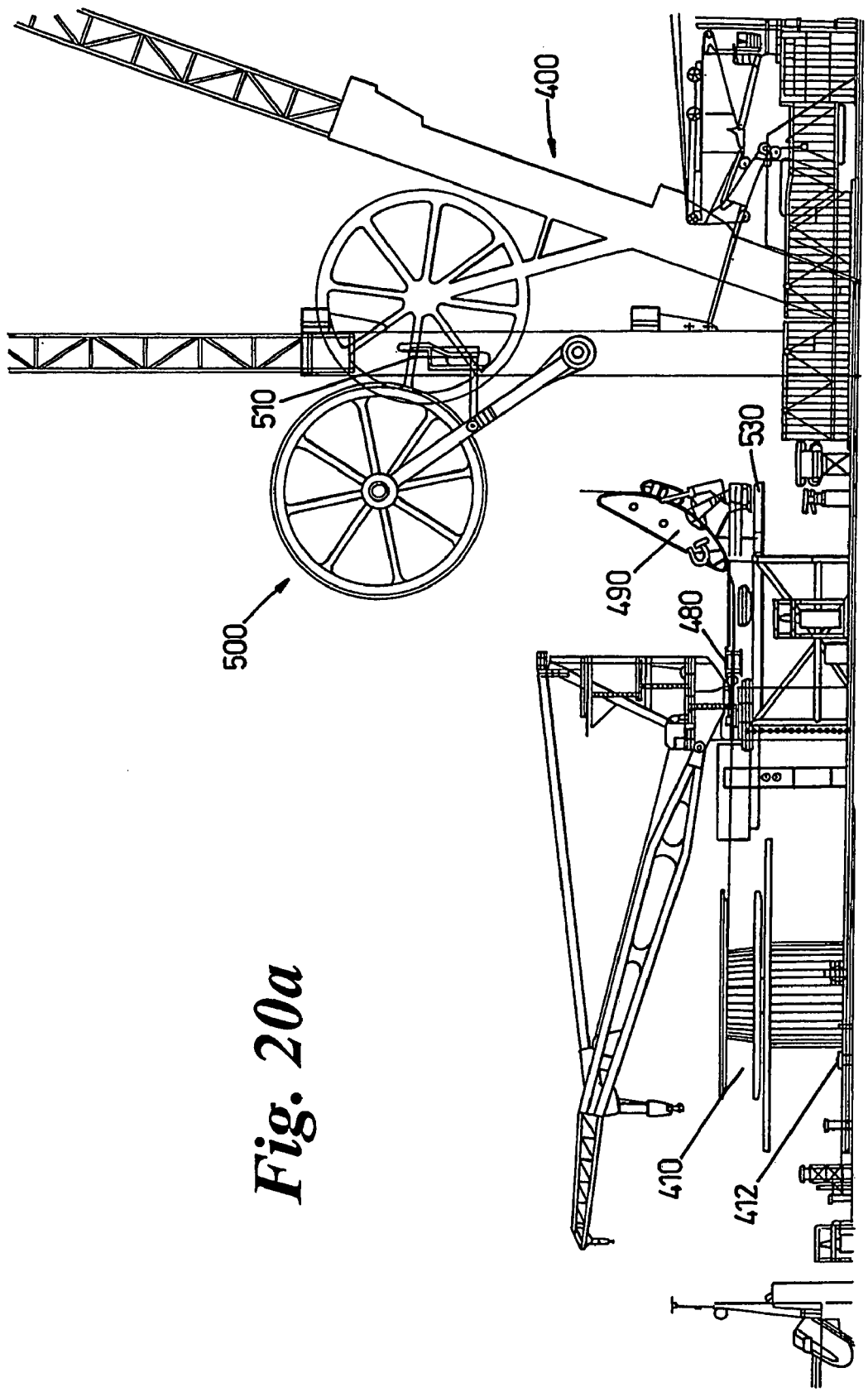
FIGS. 20a and 20b are more detailed side and plan views of the elevating platform of the vessel of FIGS. 19a and 19b.
Figure 20B:
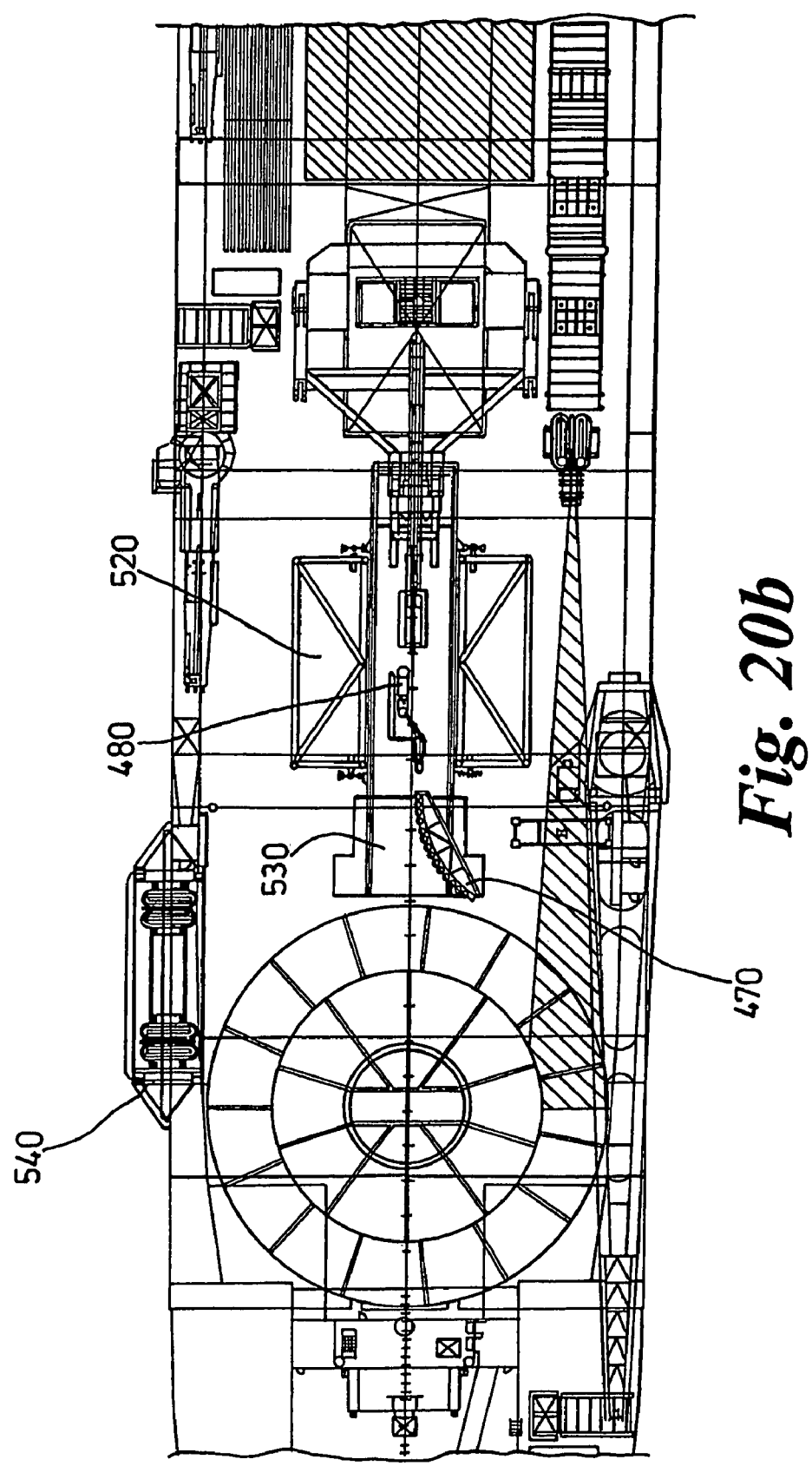

FIGS. 20a and 20b are a more detailed side and plan view respectively of the vessel of FIGS. 19a and 19b, and where the upper spool 410 is being used to deploy rigid product.

Rigid product is unspooled from the upper spool 410, and drawn past a horizontal radius controller 470 and through a first straightener 480 to ensure the product is fed squarely and as a straight pipe into a vertical radius controller 490. The product is bent in a controlled fashion by the vertical radius controller and is directed upwards and towards a tower-mounted driven wheel 500, around which the product passes. The product is redirected substantially 180° by the wheel, and passed through a second straightener 510, before being directed downwards into the moonpool 520. As with the previous configuration, a roller box (not shown) is used at the base of the tower, to maintain the product within the deployment centre line.

The horizontal radius controller 470, first straightener 480, vertical radius controller 490, product deployment manipulator arm 420, small horizontal radius controller 430, tensioner 440 and radius control wheel 450 are located upon an elevating platform 530. The tower is raised or lowered to match the unspooling of rigid product from the upper spool.

FIGS. 19b and 20b also show a side-mounted platform/tensioner 540 for spool loading. Rigid product is loaded onto the spool by passing the product through the apparatus, which provides back tension to ensure the product is tightly wound onto the spool, and also provides horizontal and vertical translation to match the spooling height and width.

Figure 21A:
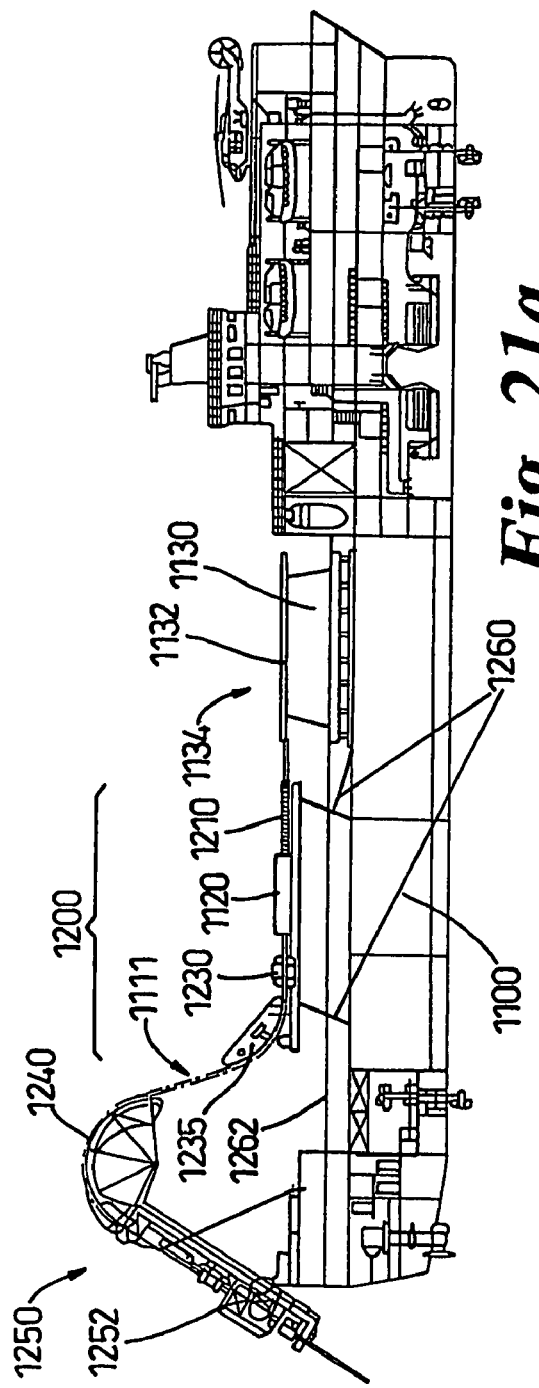
FIGS. 21a and 21b are a side (part cut-away) and plan view respectively of a third novel pipelaying vessel having a forward-mounted carousel, a mid-line pipe train and a stern lay ramp.
Figure 21B:
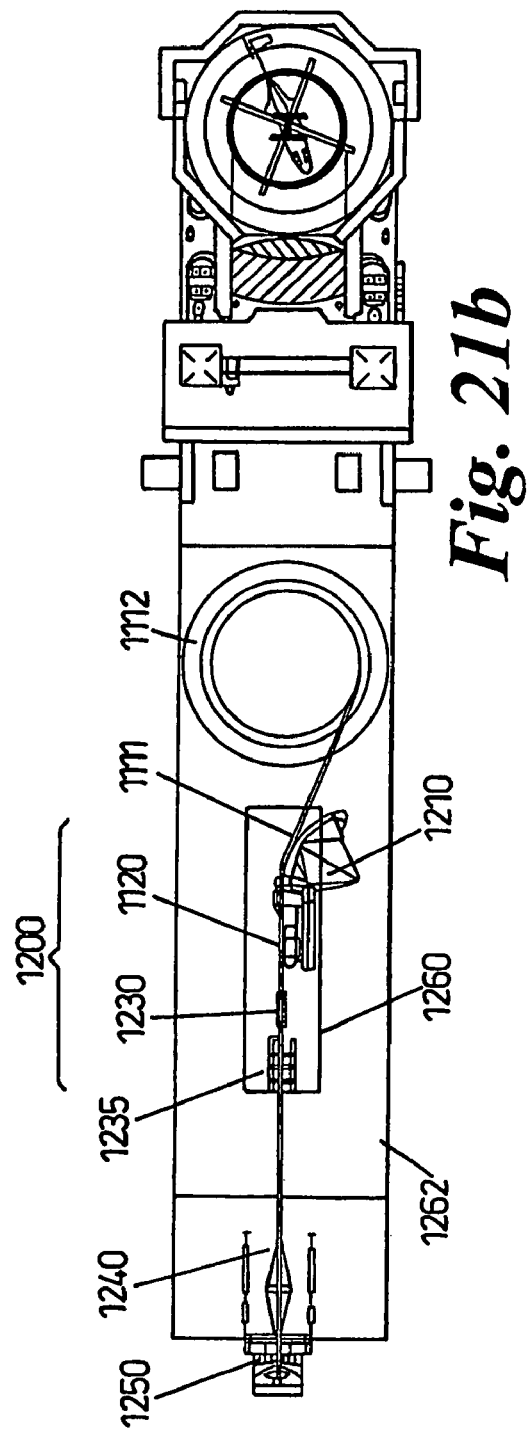

FIGS. 21a and 21b are a side and plan view respectively of different arrangement for unspooling product from a rotating carousel.

A pipe or umbilical is discharged via a pipe conditioning train 1200, which comprises 1) a horizontal radius controller 1210 operating in the same horizontal plane as the carousel 1130 such that it applies a reverse curvature of constant radius, 2) a straightener 1120 for straightening the pipe as it exits the horizontal radius controller, 3) a tracked tensioner 1230 for drawing the pipeline off the carousel and feeding it through the rest the pipe conditioning train 1200 and beyond, and 4) a first vertical radius controller 1235 that by bending directs the pipe from the horizontal plane up towards the top vertical radius controller 1240 and straightener 1252 of a stern-mounted pipelay ramp 1250.

The pipelay ramp 1250 is of conventional design, and comprises at its top a second vertical radius controller 1240 which takes the pipeline from the pipe conditioning train 1200 and directs it into the sea by bending and subsequently straightening. The illustrated stern lay ramp 1250 is similar to that used for the known vessel "Seaway Falcon", and is adjustable to vary its position with respect to the stern of the vessel and the pipelaying method being adopted, such as S-Lay or J-Lay. On the ramp, the pipe is bent and straightened before passing through a tensioner, moving clamp system, or other means for holding the weight of the catenary of pipe between the ship and the seabed. The ramp illustrated could equally well be mounted over a moonpool, according to the configuration of the pipe laying apparatus upon the vessel.

The whole pipe conditioning train 1200 is mounted upon a lift 1260 that can be raised and lowered, thereby allowing adjustment of the vertical alignment of the first horizontal radius controller 1210 with respect to the carousel. This facility is used to avoid riding turns or excessive gaps between successive turns during unspooling (or spooling, where applicable) of the carousel 1134. A portion 1262 of the deck is not part of the lift. The boundaries of the lift are shown in the plan views (FIGS. 21b and 22b) of the vessel.

FIGS. 22a and 22b are zoomed side and plan view respectively of the lift-mounted apparatus in the vessel of FIGS. 21a and 21b.

The lift 1260 supporting the pipe conditioning train 1200 is recessed into the shelterdeck with its drive mechanism beneath the deck. The operational range of the lift provides translation in the vertical plane between the bottom and top surfaces of the carousel 1134. The skilled person will appreciate that any alternative form of adjusting the height of the lift could be used, such as screw jacks or electromagnetic actuators.

The side view, FIG. 22a, shows the "Caterpillar™" track 1320 of the horizontal radius controller 1210. This can be more clearly seen in the plan view, FIG. 22b, where a continuous track is looped and tensioned to retain a preset radius 1330. The radius controller is dimensioned to accommodate all anticipated angles of entry from the reel as the pipe unwinds from a full reel to an empty one. The horizontal radius controller is pivotably moveable about pivot 1340, to ensure that for all angles of entry the pipe is always smoothly guided into the straightener 1220.

The invention claimed is:

1. A sea-going vessel having opposed sides, a centerline and a deck, and having pipe launching apparatus for running continuous elongate product, the pipe launching apparatus comprising:
   a product supply apparatus arranged substantially at a deck level, said product supply apparatus being selectively configurable from a first configuration for supplying continuous elongate product into a first path having a generally horizontal component along a deck on one side of a centerline of said vessel and a second configuration
   for supplying continuous elongate product into a second path having a generally horizontal component along a deck at the opposite side of said centerline;
   a tower structure mounted substantially on the vessel centerline and inclinable to a desired launch angle to align with a catenary curve of said product suspended below the vessel;
   a pipe handler within said tower structure to receive said product at a central elevated position for gripping and supporting the weight of the suspended product while paying it out; and
   a tower diverter for receiving said product from deck level at one of two side elevated positions above said first path or said second path, respectively, depending on whether said product supply apparatus is in said first configuration or said second configuration.

2. A sea-going vessel as claimed in claim 1, wherein said first product supply apparatus includes at a first pipeline production facility for receiving sections of rigid pipe and joining them to produce said continuous product for supply directly to said pipe handler via said first path on a first deck.

3. A sea-going vessel as claimed in claim 2, wherein said product supply apparatus includes a second production facility for a different process arranged in parallel, on a second deck above said first deck.

4. A sea-going vessel as claimed in claims 2 or 3, wherein said first pipeline production facility is arranged toward the opposite side of the vessel from said first path and anti-parallel thereto, the product being diverted through a 180° curved path into said first path and thence to the tower diverter.

5. A sea-going vessel as claimed in claim 4, wherein said first pipeline production facility is operable to supply continuous product onto a storage carousel via substantially the same curved path in a first phase of operation, said product supply apparatus in its second configuration being operable in a second phase of operation to unload the stored product from said carousel via said 180° curved path substantially in reverse and thus into said second path and thence to the tower diverter.

6. A sea-going vessel as claimed in claim 5, wherein said 180° curved path is defined by a diverter structure partially surrounding said carousel.

7. A sea-going vessel as claimed in claim 1, wherein said product supply apparatus includes a horizontal pipe storage carousel for storing a length of pre-fabricated continuous product, the carousel being operable to unload said product into said first path and thence to the tower diverter.

8. A sea-going vessel as claimed in claim 7, wherein said carousel is operable as part of said product supply apparatus in both its and second configurations, according to its direction of rotation during unloading.

9. A sea-going vessel as claimed in claim 8, wherein said carousel is substantially surrounded by a large radius diverter structure, the product being diverted from storage on the carousel around the outside of this structure whether serving as part of the product supply apparatus in said first or second configurations.

10. A sea-going vessel as claimed in claim 7, wherein said carousel is arranged to be loadable from an on-board pipeline production facility and alternatively from an off-board supply, the direction of rotation during unloading being different according to the source of supply.

11. A sea-going vessel as claimed in claim 10, wherein a loading stinger is provided on the vessel for receiving pipe from said off-board supply.

12. A sea-going vessel as claimed in any one of claims 1, 2 or 3, wherein said pipe launching apparatus further includes first and second vertical radius controllers mounted at a deck level for receiving the product and diverting the product upward from said horizontal components of first path and said second path respectively toward said tower diverter means.

13. A sea-going vessel as claimed in claim 12, wherein said first and second vertical radius controllers include common components, these being transferable from the one side of the vessel to the other side of the vessel according to which configuration of the product supply apparatus is being used.

14. A sea-going vessel as claimed in claim 12, wherein said first and second vertical radius controllers are mounted for fore-and-aft movement to adjust their position according to the inclination of the tower structure.

15. A sea-going vessel as claimed in claim 12, wherein said pipe launching apparatus further comprises a straightener associated with each vertical radius controller for removing a plastic bending introduced by the vertical radius controllers.

16. A sea-going vessel as claimed in claim 15, wherein said straightener is mounted on a pivoting arm adjustable according to the inclination of the tower structure.

17. A sea-going vessel as claimed in any one of claims 1, 2 or 3, wherein said tower diverter means comprises a radius controller mounted on the tower above said elevated position and movable between port and starboard operating positions for receiving said product at a side elevated position above whichever of said first path or said second path is appropriate.

18. A sea-going vessel as claimed in claim 17, wherein said radius controller is movable between said port and starboard positions by swinging it in an arc about a lay axis of the pipe handling means.

19. A sea-going vessel as claimed in claim 18, wherein said tower diverter means further comprises a straightener supported so as to move together with the radius controller.

20. A sea-going vessel as claimed in claim 17, wherein said radius controller is further operable at a central position for receiving elongate article from a central product supply apparatus at a deck level.

21. A method of laying continuous elongate product from a sea-going vessel as claimed in claim 1, comprising:
operating the pipe launching apparatus in a first mode to lay continuous elongate product supplied via said first path, said tower diverter receiving said product from deck level at said one side elevated position above said first path to support the product in a curved path to said central elevated position and align it with said launch angle;
at a different time operating the pipe launching apparatus in a second mode to lay continuous elongate product supplied via the second path, said tower diverter receiving said product from deck level at the other side elevated position above said second path to support the product in a curved path to said central elevated position and align it with said launch angle.

22. A method of laying continuous elongate product from a sea-going vessel as claimed in claim 21, wherein the operation in a first mode includes receiving sections of rigid pipe and joining them to produce said continuous product for supply directly to said pipe handler via said first path.

23. A method of laying continuous elongate product from a sea-going vessel as claimed in claim 21, including providing a radius controller on said tower diverter above said elevated position and moving said radius controller between port and starboard operating positions for receiving said product at a side elevated position above whichever of said first or second paths is appropriate.

24. A sea-going vessel having pipe launching apparatus which comprises:
pipe section supply apparatus for supplying lengths of pipe from a store on board the vessel;
a first tower section mounted on the vessel and inclinable to a desired launch angle to align with a catenary curve of a continuous pipe suspended below the vessel;
a pipe handler mounted on the first tower section for receiving pipe from said supply apparatus and for gripping and supporting the weight of the suspended pipe while paying it out;
an upper work station mounted at the top of the first tower section for joining a new length of pipe supported above said work station to the suspended pipe; and
a second tower section operable in an extended position above the first tower section for receiving said new length of pipe from said pipe section supply apparatus and supporting it during said joining at the first workstation, wherein said pipe section supply apparatus, upper work station and handling means are operable in cycles to add successive lengths of pipe to the suspended pipe, and wherein said second tower section is collapsible telescopically into a collapsed position within the first tower section when not in use.

25. A sea-going vessel as claimed in claim 24, wherein a lower workstation is further provided near the bottom of the first tower section.

26. A sea-going vessel as claimed in claim 24, wherein said handler comprises at least one travelling clamp mounted to travel up and down the first tower section on a carriage to control paying out of the pipeline.

27. A sea-going vessel as claimed in claim 26, wherein said carriage is operable to elevate and lower the second tower section, while a retainer is provided for maintaining the second tower section in said extended position.

28. A sea-going vessel as claimed in claim 26, wherein either or both of said travelling clamps comprises a plurality of individual ram units arrayed around and along a length of the product path.

29. A sea-going vessel as claimed in claim 26, wherein a carriage drive is further provided in the form of an incompressible segmented rack.

30. A sea-going vessel as claimed in claim 24, wherein there is further provided an alternative supply apparatus for continuous elongate product, including a receiver at an elevated position on the first tower section for receiving said continuous product from deck level, the pipe handler mounted on the first tower section being adaptable for continuous paying out of said continuous elongate product.

31. A sea-going vessel as claimed in claim 24, wherein said pipe handler comprises a first travelling clamp mounted on said carriage, said pipe handler further comprising a second travelling clamp mounted on a second carriage movable up and down within at least a lower part of the first tower section, the first and second travelling clamps being operable in a hand-to-hand sequence with both clamps moving reciprocally and alternately gripping the continuous elongate product to achieve continuous paying out of said continuous elongate product.

32. A sea-going vessel as claimed in claim 31, wherein a lower work station is provided near the bottom of the first tower section, and is mountable on the carriage of the second travelling clamp.

33. A sea-going vessel as claimed in claim 31, wherein each of the clamps and the workstation are retractable into the tower to allow passage of bulky accessories such as pipeline end (PLETs), anodes and the like.

34. A sea-going vessel as claimed in claim 31, wherein said lower workstation is mounted on an incline relative to the second carriage, so as to maintain it horizontal at different launch angles.

35. A sea-going vessel as claimed in claim 24, wherein said second tower section is demountable, leaving only one workstation at deck level.

36. A sea-going vessel as claimed in claim 24, wherein track type tensioners are provided as an alternative to travelling clamps.

* * * * *